United States Patent
Di et al.

(10) Patent No.: US 12,436,610 B2
(45) Date of Patent: Oct. 7, 2025

(54) DISPLAY METHOD AND ELECTRONIC DEVICE

(71) Applicant: Honor Device Co., Ltd., Shenzhen (CN)

(72) Inventors: Haoxuan Di, Shenzhen (CN); Danhong Li, Shenzhen (CN); Xiaowu Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/701,325

(22) PCT Filed: May 19, 2023

(86) PCT No.: PCT/CN2023/095379
§ 371 (c)(1),
(2) Date: Apr. 15, 2024

(87) PCT Pub. No.: WO2023/222128
PCT Pub. Date: Nov. 23, 2023

(65) Prior Publication Data
US 2025/0076975 A1    Mar. 6, 2025

(30) Foreign Application Priority Data

May 20, 2022 (CN) .......................... 202210549604.6
Jun. 30, 2022 (CN) .......................... 202210764445.1

(51) Int. Cl.
*G09G 5/00* (2006.01)
*G06F 3/01* (2006.01)
(Continued)

(52) U.S. Cl.
CPC .......... *G06F 3/013* (2013.01); *G06F 3/04812* (2013.01); *G06F 3/0487* (2013.01);
(Continued)

(58) Field of Classification Search
CPC .... G06F 3/013; G06F 3/04812; G06F 3/0487; G06F 2203/04803; G06T 7/74; G06V 40/18; G06V 40/193
See application file for complete search history.

(56) References Cited

U.S. PATENT DOCUMENTS 5,614,967 A      3/1997  Ishikawa et al.
7,401,920 B1 *   7/2008  Kranz ................ G02B 27/0093
                                                    382/117
(Continued)

FOREIGN PATENT DOCUMENTS

CN    103324290 A    9/2013
CN    105335066 A    2/2016
(Continued)

*Primary Examiner* — Joe H Cheng
(74) *Attorney, Agent, or Firm* — Slater Matsil, LLP

(57) ABSTRACT

Embodiments of this application provide a display method and an electronic device. This method can be applied to a terminal device such as a mobile phone or a tablet computer. After detecting an operation of successfully unlocking or returning to a main interface, the terminal device may determine an eyeball gaze position of a user through a camera module, and then determine whether the user is gazing at a notification bar. When recognizing an action of the user gazing at the notification bar, the terminal device may display a notification interface for displaying a notification message.

20 Claims, 42 Drawing Sheets

(51) Int. Cl.
*G06F 3/04812* (2022.01)
*G06F 3/0487* (2013.01)
*G06T 7/73* (2017.01)
*G06V 10/82* (2022.01)
*G06V 40/18* (2022.01)

(52) U.S. Cl.
CPC ...... *G06T 7/74* (2017.01); *G06F 2203/04803* (2013.01); *G06T 2207/20084* (2013.01); *G06T 2207/30201* (2013.01); *G06V 10/82* (2022.01); *G06V 40/193* (2022.01)

(56) References Cited

U.S. PATENT DOCUMENTS

| | | | |
|---|---|---|---|
| 9,185,196 | B2 * | 11/2015 | Guitteaud ............ H04M 1/0264 |
| 9,727,130 | B2 * | 8/2017 | Onuki ..................... G06T 7/246 |
| 2010/0053555 | A1 * | 3/2010 | Enriquez ................ G06V 40/19 |
| | | | 351/210 |
| 2012/0300061 | A1 | 11/2012 | Osman et al. |
| 2013/0235169 | A1 | 9/2013 | Kato et al. |
| 2014/0049452 | A1 | 2/2014 | Maltz |
| 2014/0195918 | A1 | 7/2014 | Friedlander |
| 2014/0201833 | A1 | 7/2014 | Wang |
| 2017/0285737 | A1 | 10/2017 | Khalid et al. |
| 2017/0293352 | A1 | 10/2017 | Todeschini |
| 2019/0212815 | A1 | 7/2019 | Zhang et al. |
| 2019/0258788 | A1 | 8/2019 | Hyun et al. |
| 2020/0237256 | A1 | 7/2020 | Farshad et al. |
| 2021/0409588 | A1 | 12/2021 | Dong |
| 2022/0030105 | A1 | 1/2022 | Zhou |
| 2022/0174143 | A1 | 6/2022 | Xu et al. |
| 2022/0229524 | A1 * | 7/2022 | Mckenzie ............. G06F 3/0484 |

FOREIGN PATENT DOCUMENTS

| | | |
|---|---|---|
| CN | 105740671 A | 7/2016 |
| CN | 105843383 A | 8/2016 |
| CN | 106557257 A | 4/2017 |
| CN | 106951093 A | 7/2017 |
| CN | 107608514 A | 1/2018 |
| CN | 107704086 A | 2/2018 |
| CN | 108196781 A | 6/2018 |
| CN | 108596061 A | 9/2018 |
| CN | 109814723 A | 5/2019 |
| CN | 110231963 A | 9/2019 |
| CN | 110442241 A | 11/2019 |
| CN | 110727380 A | 1/2020 |
| CN | 110825226 A | 2/2020 |
| CN | 111665938 A | 9/2020 |
| CN | 112507799 A | 3/2021 |
| CN | 112783330 A | 5/2021 |
| CN | 113645349 A | 11/2021 |
| CN | 113741681 A | 12/2021 |
| CN | 113903317 A | 1/2022 |
| CN | 113970965 A | 1/2022 |
| CN | 114115512 A | 3/2022 |
| CN | 114661401 A | 6/2022 |
| CN | 116027887 A | 4/2023 |
| EP | 2762997 A2 | 8/2014 |
| EP | 3511803 A1 | 7/2019 |
| KR | 20150093016 A | 8/2015 |

* cited by examiner

DISPLAY METHOD AND ELECTRONIC DEVICE

CROSS-REFERENCE TO RELATED APPLICATIONS

This application is a national stage of International Application No. PCT/CN2023/095379, filed on May 19, 2023, which claims priority to Chinese Patent Application No. 202210549604.6, filed on May 20, 2022, and Chinese Patent Application No. 202210764445.1, filed on Jun. 30, 2022. The disclosures of each of the aforementioned applications are hereby incorporated by reference in their entireties.

TECHNICAL FIELD

This application relates to the field of terminals, and in particular, to a display method and an electronic device.

BACKGROUND

With the rise of mobile terminals and the maturity of communication technologies, people began to explore new human-computer interaction manners without a mouse and a keyboard, such as voice control, gesture recognition control, and the like, to realize new human-computer interaction manners, provide users with more diversified and convenient interactive experience, and enhance user experience.

SUMMARY

Embodiments of this application provide a display method and an electronic device. By implementing the method, a terminal device equipped with a camera may determine an eyeball gaze position of a user through a camera module, and then determine whether the user is gazing at a preset area on a screen. When recognizing that the user is gazing at the preset area, the terminal device may display a notification interface associated with the preset area, so that the user can quickly obtain a notification without a touch operation of the user.

According to a first aspect, this application provides a display method, applied to an electronic device. The electronic device includes a screen, the screen of the electronic device includes a first preset area, and the method includes: displaying a first interface; and in response to a first operation of a user, displaying a second interface. If the second interface is a preset interface, when the second interface is displayed, the electronic device collects a first image within a first preset time period. A first eyeball gaze area of the user based on the first image is determined, and the first eyeball gaze area is a screen area that the user gazes at when the user gazes at the screen. When the first eyeball gaze area is within the first preset area, a third interface including one or more notifications is displayed.

The method provided in the first aspect is implemented, so that the electronic device can enable eyeball gaze recognition detection at a specific interface. Through eyeball gaze recognition detection, the electronic device can detect whether the user is gazing at a preset area on the screen. When it is detected that the user is gazing at the preset area, the electronic device can automatically display a notification interface that displays the notification. In this way, the user can control the electronic device to display the notification interface through a gaze operation, and then quickly obtain the notification, especially in a scene where it is inconvenient for the user to obtain the notification interface through a touch operation. The method provides another way for the user to obtain the notification, which is beneficial to improving user experience.

With reference to the method provided in the first aspect, in some embodiments, the second interface is any one of the following interfaces: a first desktop, a second desktop, and a leftmost home screen.

By implementing the method provided in the embodiment, the electronic device can detect whether the user is gazing at a preset area on the screen when displaying interfaces such as the first desktop, the second desktop and the leftmost home screen. Therefore, when the electronic device displays the first desktop, the second desktop or the leftmost home screen, the user can control the electronic device to display the notification interface through the gaze operation. The second interface for enabling eyeball gaze recognition detection determined based on a user's habit of obtaining a notification is not limited to the first desktop, the second desktop, and the leftmost home screen.

With reference to the method provided in the first aspect, in some embodiments, first preset time is N seconds before the second interface is displayed.

When the method provided by the embodiment is implemented, the electronic device does not always detect whether the user gazes at an area on the screen in the second interface, but detects it within a preset period of time, for example 3 seconds before the second interface is displayed, to save power consumption and avoid the abuse of the camera to affect information security of the user.

With reference to the method provided in the first aspect, in some embodiments, the first eyeball gaze area is a cursor point formed by a display unit on the screen, or the first eyeball gaze area is cursor points or a cursor area formed by a plurality of display units on the screen.

With reference to the method provided in the first aspect, in some embodiments, that the first eyeball gaze area is within the first preset area includes: A position of the first eyeball gaze area on the screen is included in the first preset area, or a position of the first eyeball gaze area on the screen intersects with the first preset area.

With reference to the method provided in the first aspect, in some embodiments, the first interface is a to-be-unlocked interface, and the first operation is an unlocking operation.

By implementing the method provided in the embodiment, the electronic device can display a first interface of the first desktop, the second desktop, the leftmost home screen and the like after successful unlocking. While displaying the interface, the electronic device can alternatively detect whether the user is gazing at the first preset area on the screen. In this way, the user can control the electronic device to display the notification interface through the gaze operation under a scene of unlocking and entering the second interface.

With reference to the method provided in the first aspect, in some embodiments, the first interface is an interface provided by a first application installed on the electronic device, and the first operation is an operation to exit the first application.

By implementing the method provided in the above embodiment, the electronic device can display the second interface after exiting a specific application. At this time, the electronic device can alternatively detect whether the user is gazing at the first preset area on the screen. In this way, after exiting the specific application, the user can immediately control the electronic device to display the notification interface through the gaze operation, and then process a to-be-processed task indicated by the notification.

With reference to the method provided in the first aspect, in some embodiments, the operation to exit the first application includes: an operation that is made by the user to indicate the electronic device to exit the first application and that is detected by the electronic device, and an operation to exit the first application that is detected by the electronic device and that is generated when the user does not apply an operation to the first application for a long time.

By implementing the method provided in the above embodiment, the electronic device can determine to exit the first application by the user's operation of exiting the first application, and can alternatively determine to exit the first application by the user's failure to apply an operation to the first application for a long time. In this way, the electronic device can provide users with a more convenient and automatic service of displaying notifications.

With reference to the method provided in the first aspect, in some embodiments, the electronic device includes a camera module. The camera module includes: at least one 2D camera and at least one 3D camera, where the 2D camera is configured to obtain a two-dimensional image, and the 3D camera is configured to obtain an image containing depth information. The first image includes the two-dimensional image and the image containing depth information.

The method provided in the above embodiment is implemented, the camera module of the electronic device may include a plurality of cameras, and the plurality of cameras include the at least one 2D camera and the at least one 3D camera. Therefore, the electronic device can obtain the two-dimensional image and a three-dimensional image indicating the eyeball gaze position of the user. The combination of the two-dimensional image and the three-dimensional image is beneficial to improve precision and accuracy of the electronic device to recognize the eyeball gaze position of the user.

With reference to the method provided in the first aspect, in some embodiments, that a first eyeball gaze area of the user based on the first image is determined specifically includes: determining feature data based on the first image, where the feature data includes one or more of a left-eye image, a right-eye image, a face image, and face grid data; and determining the first eyeball gaze area indicated by the feature data by using an eyeball gaze recognition model, and the eyeball gaze recognition model is established based on a convolution neural network.

By implementing the method provided in the above embodiment, the electronic device can separately obtain the left-eye image, the right-eye image, the face image and the face grid data from the two-dimensional image and the three-dimensional image collected by the camera module, to extract more features and improve recognition precision and accuracy.

With reference to the method provided in the first aspect, in some embodiments, the determining feature data based on the first image specifically includes: performing face correction on the first image, to obtain a first image with an upright face; and determining the feature data based on the first image with the upright face.

By implementing the method provided in the embodiment, before obtaining the left-eye image, the right-eye image and the face image, the electronic device can perform face correction on the image collected by the camera module, to improve accuracy of the left-eye image, the right-eye image and the face image.

With reference to the method provided in the first aspect, in some embodiments, the first image is stored in a secure data buffer. Before the first eyeball gaze area of the user based on the first image is determined, the method further includes: The first image is obtained from the secure data buffer in a trusted execution environment.

By implementing the method provided in the embodiment, the electronic device can store the image collected by the camera module in the secure data buffer before the electronic device processes the image collected by the camera module. Image data stored in the secure data buffer can only be transmitted to an eyeball gaze recognition algorithm through a secure transmission channel provided by a secure service, and this improves security of the image data.

With reference to the method provided in the first aspect, in some embodiments, the secure data buffer is disposed at a hardware layer of the electronic device.

According to a second aspect, this application provides an electronic device, and the electronic device includes one or more processors and one or more memories. The one or more memories are coupled to the one or more processors, the one or more memories are configured to store computer program code, the computer program code includes computer instructions, and when the one or more processors execute the computer instructions, the electronic device is enabled to perform the method according to the first aspect and any possible implementation in the first aspect.

According to a third aspect, an embodiment of this application provides a chip system, applied to an electronic device. The chip system includes one or more processors, and the processors are configured to invoke computer instructions to enable the electronic device to perform the method according to the first aspect and any possible implementation in the first aspect.

According to a fourth aspect, an embodiment of this application provides a computer-readable storage medium including instructions, and when the instructions are run on an electronic device, the electronic device is enabled to perform the method according to the first aspect and any possible implementation in the first aspect.

According to a fifth aspect, an embodiment of this application provides a computer program product including instructions, and when the computer program product is run on an electronic device, the electronic device is enabled to perform the method according to the first aspect and any possible implementation in the first aspect.

Understandably, the electronic device provided according to the second aspect, the chip system provided according to the third aspect, the computer storage medium provided according to the fourth aspect, and the computer program product provided according to the fifth aspect are all configured to perform the method provided in embodiments of this application. Therefore, for beneficial effects that can be achieved, reference may be made to the beneficial effects in the corresponding method. Details are not described herein again.

DETAILED DESCRIPTION OF ILLUSTRATIVE EMBODIMENTS

Terms used in the following embodiments of this application are only intended to describe particular embodiments, and are not intended to limit this application.

Figure 1A:
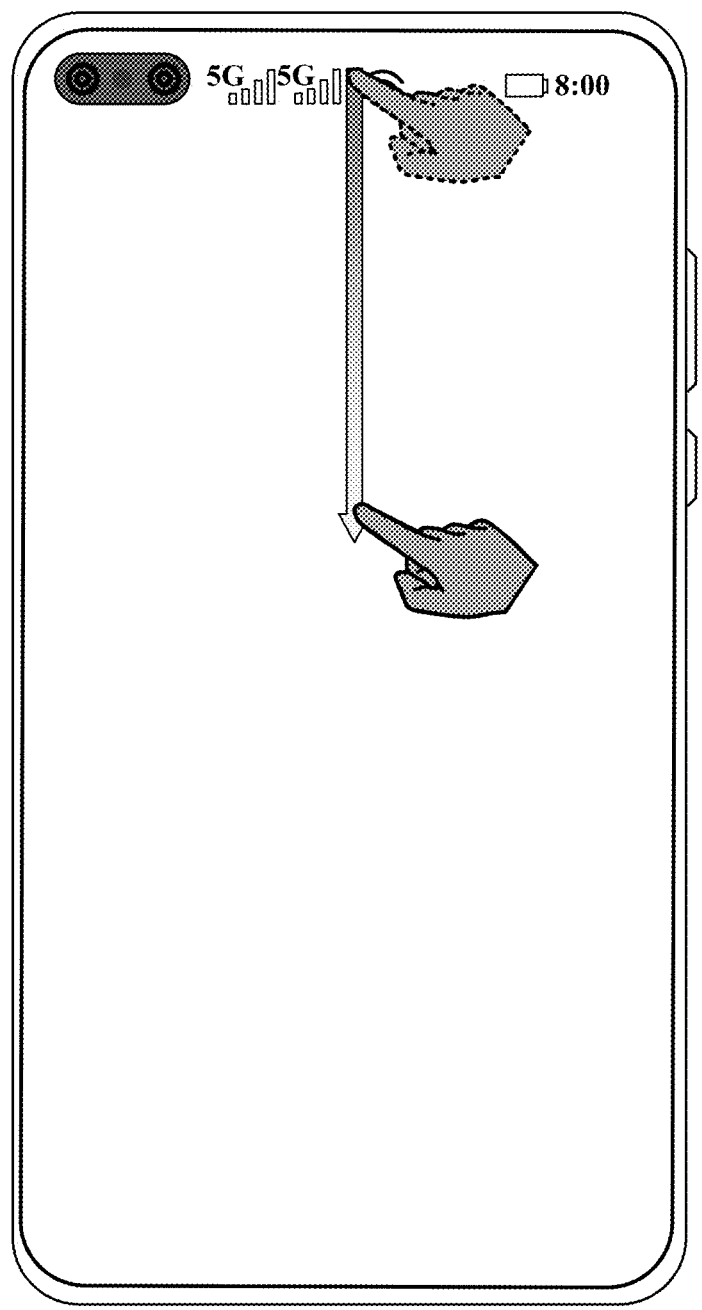
FIG. 1A to FIG. 1C are a group of user interfaces according to an embodiment of this application.

Taking a smartphone as an example, based on statistics, after the mobile phone is unlocked and displays a desktop, the mobile phone usually detects a pull-down operation performed by a user first. The above pull-down operation refers to a downward swiping operation that acts on the top of a screen. Refer to a user operation shown in FIG. 1A. In response to the operation, the mobile phone may display a notification interface. An interface shown in FIG. 1B may be referred to as the notification interface. The notification interface may display one or more notifications received by the mobile phone, such as a notification 121, a notification 122, and a notification 123. The one or more notification information comes from an operating system, a system application and/or a third-party application installed on the mobile phone.

In some scenarios, that the user first performs the pull-down operation to indicate that the mobile phone displays the notification interface is because: After turning on the mobile phone, the user usually first wants to check the notification to confirm whether there is an urgent to-be-processed item. In particular, in a scene where face unlocking is enabled, after the user picks up the mobile phone, the mobile phone can quickly detect whether a user's facial image matches, and then quickly complete face unlocking and display the desktop, and this makes it difficult for the user to carefully check and confirm the notification before unlocking. At this time, the user is more inclined to perform the pull-down operation after displaying the desktop, indicating the mobile phone to display the notification interface, to check and confirm the notification.

In other scenarios, the user is often unsure what to do after the mobile phone is unlocked and displays the desktop. At this time, the mobile phone displays the notification interface to give the user a prompt to indicate which operations the user may execute. For example, the notification interface may display a notification of software update, a notification of an incoming call or message received from a contact, and the like. After displaying the desktop, the mobile phone may first display the notification interface displaying the notification, so that the user may determine an operation such as updating software or replying a telephone or message to the contact, to provide the user with efficient notification reminder and improve user experience.

In view of this scenario, embodiments of this application provide a display method. This method can be applied to a terminal device such as a mobile phone or a tablet computer. The terminal device such as the mobile phone or the tablet computer implementing the above method may be referred to as a terminal 100. Subsequent embodiments use the terminal 100 to refer to the above terminal devices, such as the mobile phone and the tablet computer.

Not limited to the mobile phone and the tablet computer, the terminal 100 may alternatively be a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR)/virtual reality (virtual reality, VR) device, an artificial intelligence (artificial intelligence, AI) device, a wearable device, an in-vehicle device, a smart home device and/or a smart city device, and/or the like. A specific type of the terminal is not specially limited in embodiments of this application.

Specifically, the terminal 100 may detect that the user picks up the mobile phone for an unlocking operation. After detecting successfully unlocking, the terminal 100 may enable a 2D camera and a 3D camera to collect face data of the user, to further determine an eyeball gaze position of the user.

The above 2D camera refers to a camera that generates a two-dimensional image, for example, a camera that generates an RGB image commonly used on the mobile phone. The above 3D camera refers to a camera that can generate a three-dimensional image or a camera that can generate an image including depth information, such as a TOF camera. Compared with the 2D camera, the three-dimensional image generated by the 3D camera further includes the depth information, that is, position information of a photographed object and the 3D camera.

The eyeball gaze position of the user refers to a position where the sight is focused on a screen of the terminal 100 when the user gazes at the terminal 100. As shown in FIG. 1C, the screen of the terminal 100 may display a cursor point S. When the user gazes at the cursor point S, a focus position of the user's sight on the screen shown in FIG. 1C is the cursor point S, that is, the eyeball gaze position of the user is the cursor point S. The cursor point S may be any position on the screen, and the any position may correspond to an icon or a control of an application, or it may be a blank display area. That the user gazes at the cursor point S may be looking directly at the cursor point when facing the screen, or squinting at the cursor point when not facing the screen. In other words, the terminal 100 does not restrict a gesture that the user gazes at the screen and the terminal 100 may determine the eyeball gaze position of the user in a plurality of head gestures.

Figure 1B:
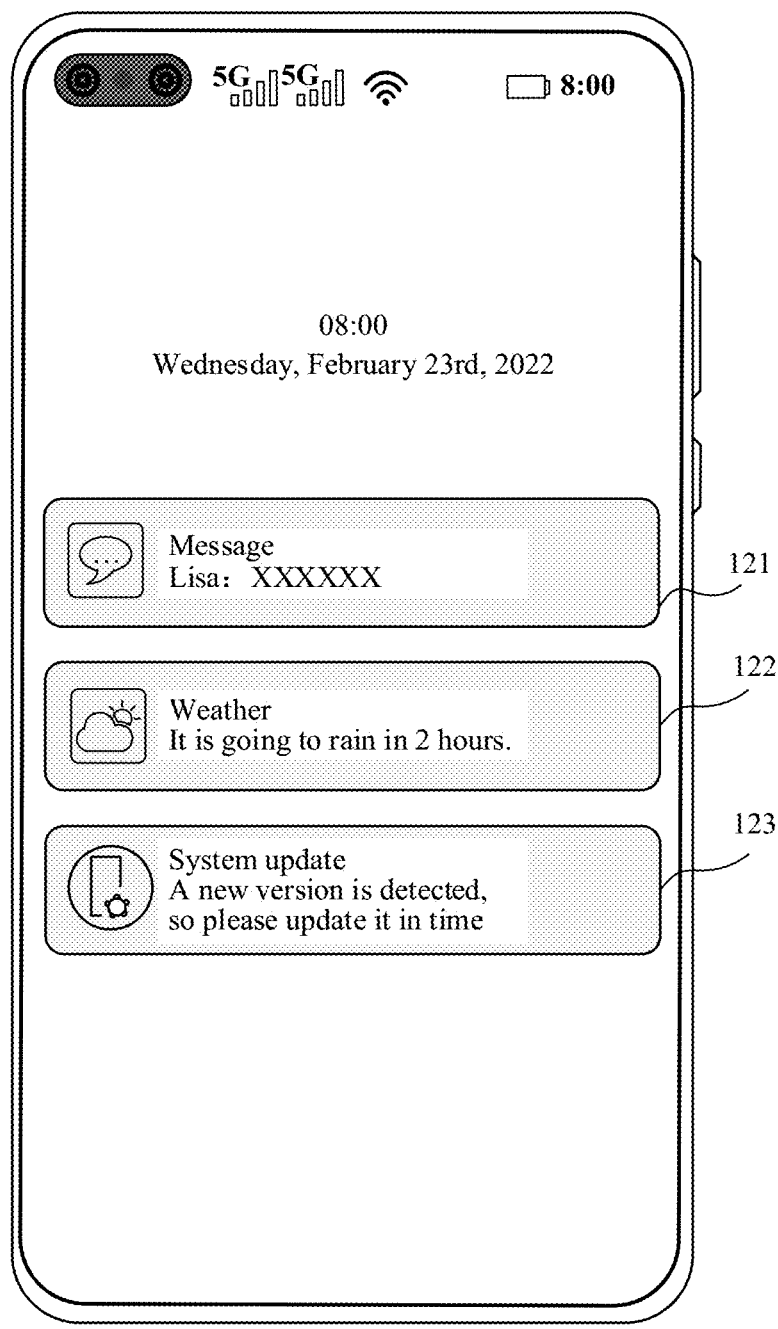
Figure 1C:
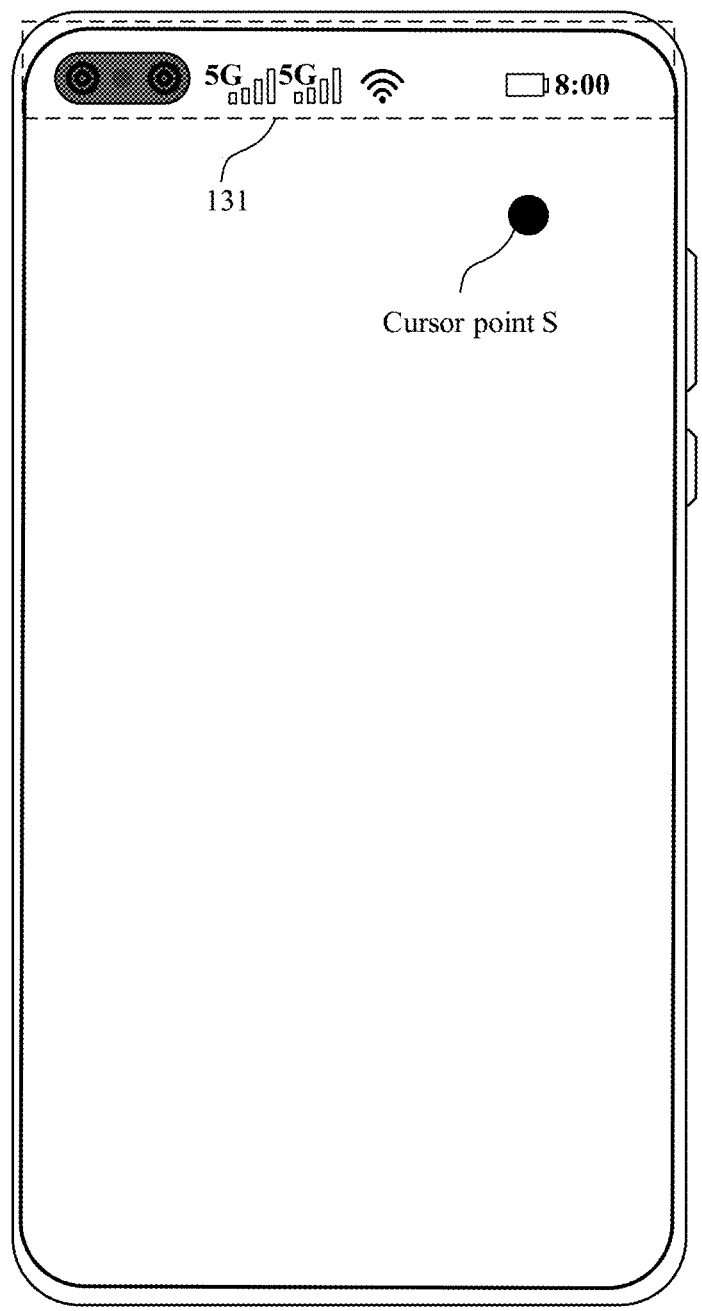

After determining the eyeball gaze position of the user, if it is determined that the eyeball gaze position is in a notification bar area of the terminal 100, the terminal 100 may display the notification interface shown in FIG. 1B. As shown in FIG. 1C, an area surrounded by a dashed box 131 may be referred to as the notification bar area. When the eyeball gaze position of the user is within the notification bar area of the terminal 100, it may indicate that the user is gazing at the notification bar.

In this embodiment of this application, the terminal 100 may determine whether the user is gazing at the notification bar within 3 seconds after successfully unlocking. Therefore, the terminal 100 can quickly determine whether to display the notification interface after completing the unlocking. This not only realizes interaction control through eyeball gaze, but also avoids affecting user experience caused by long interaction time.

In particular, in a scenario where the user intends to perform a pull-down operation (touch operation) to indicate the terminal 100 to display the notification interface, eyeball gaze can not only achieve a same control display effect as the touch operation, but also reduce use restriction of the user. For example, in scenarios in which it is inconvenient for the user to perform the touch action, such as cooking and cleaning, the eyeball gaze can provide the user with convenient interactive operation experience. In a scenario in which the user does not know what to do after unlocking the terminal 100, the eyeball gaze may indicate the terminal 100 to display the notification interface and prompt the user what operation can be performed next.

In some embodiments, when a plurality of notifications are displayed on the notification interface, the terminal 100 may further automatically display detailed information of another notification and prompt the user to process the notification after the user processes one notification. This saves a user operation and improves user experience.

A scenario in which the terminal 100 implements the interaction method based on eyeball gaze recognition is described in detail below.

Figure 2A:
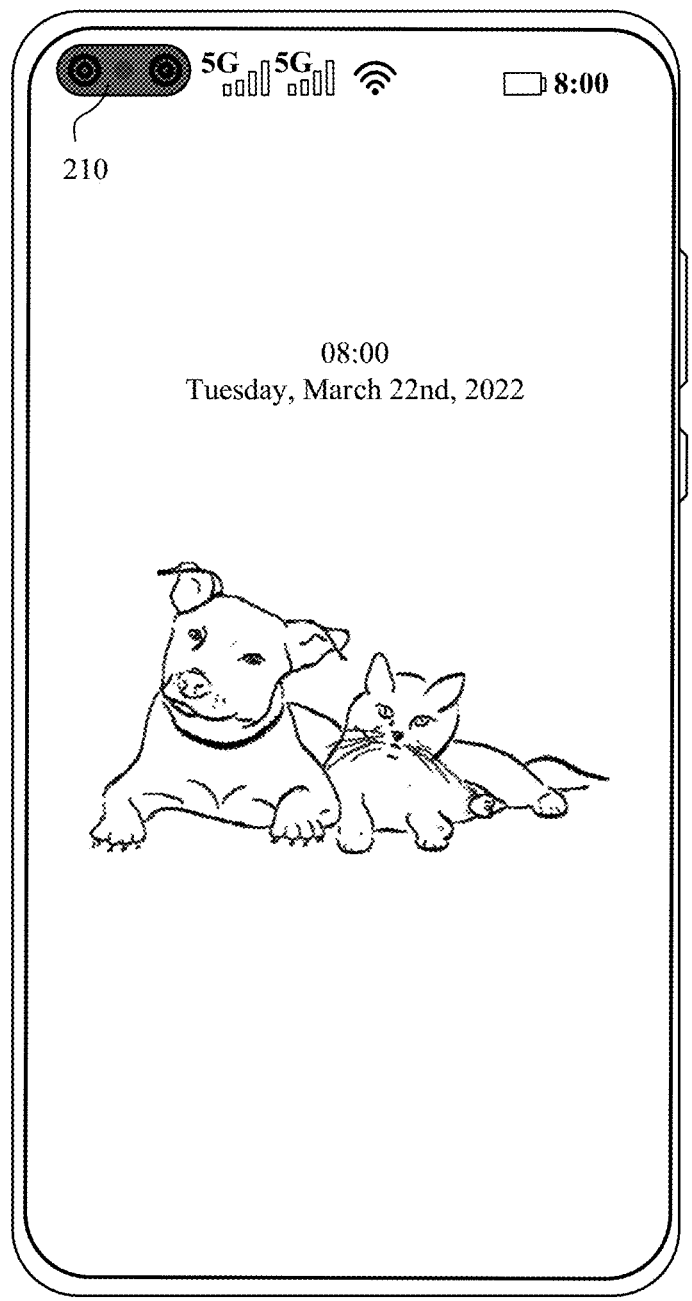
FIG. 2A to FIG. 2H are a group of user interfaces according to an embodiment of this application.

For example, FIG. 2A illustrates a user interface (to-be-unlocked interface) on which a terminal 100 is in a screen-on state but unlocked. The to-be-unlocked interface can display time and date for a user to view.

After displaying the user interface shown in FIG. 2A, the terminal 100 may enable a camera module 210 to collect and generate an image frame. The image frame may include a facial image of the user. Then, the terminal 100 may perform face recognition on the image frame and determine whether the facial image is a facial image of the owner, that is, determine whether a user performing an unlocking operation is the owner.

As shown in FIG. 2A, the camera module 210 may include a plurality of camera components. In an embodiment of this application, the camera module 210 of the terminal 100 includes at least a 2D camera and a 3D camera. Optionally, the camera module 210 may alternatively include a plurality of 2D cameras and a plurality of 3D cameras. This is not limited in this embodiment of this application. When a face unlocking test is performed, the terminal 100 uses one camera. Generally, this camera is the 3D camera.

Figure 2B:
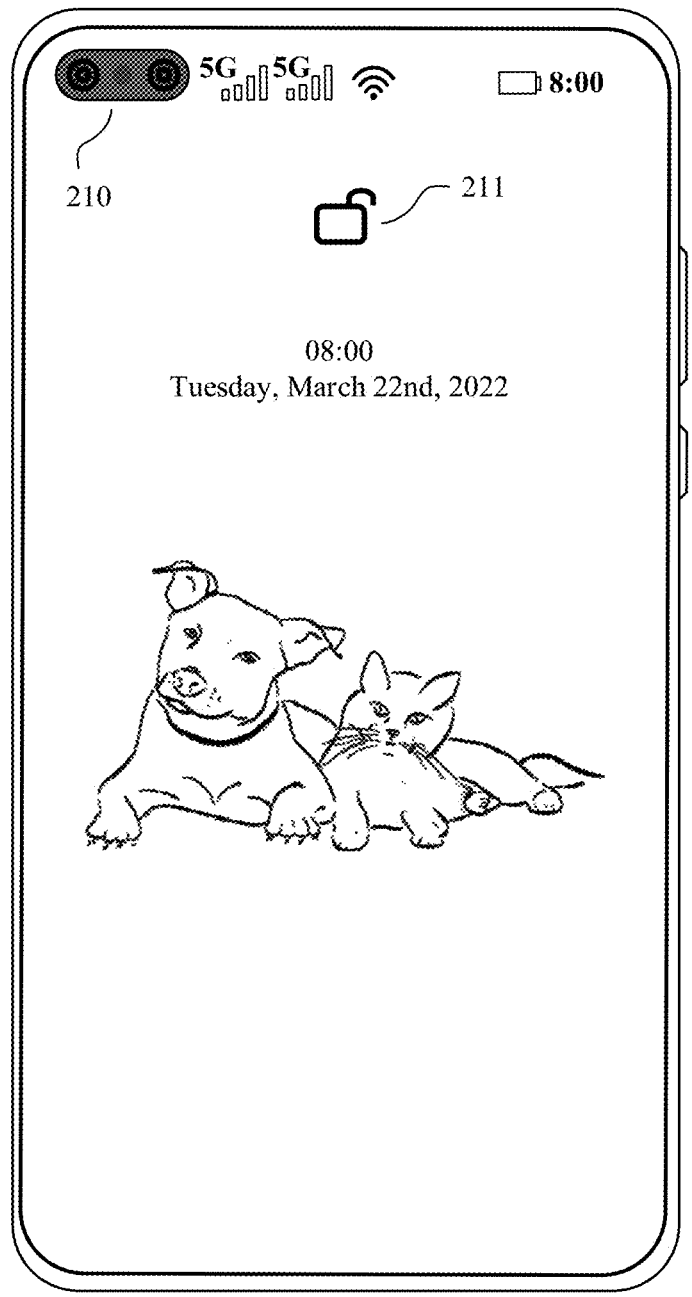
Figure 2C:
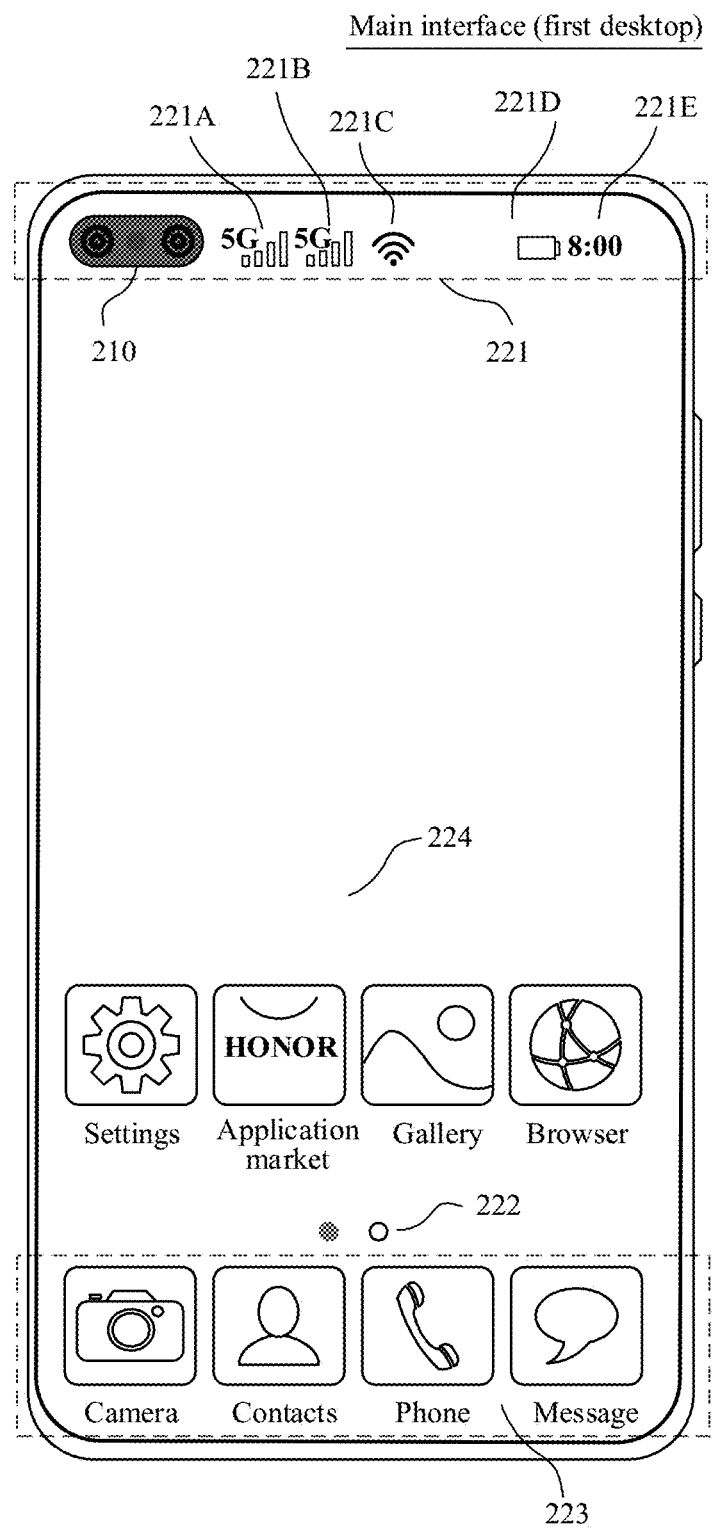

The terminal 100 may display user interfaces shown in FIG. 2B and FIG. 2C when the face unlocking is successful, that is, when the collected facial image matches the facial image of the owner. First, the terminal 100 may display a user interface (unlock success interface) shown in FIG. 2B. An icon 211 may be displayed on the unlock success interface. The icon 211 may be used to prompt a user that the face is successfully unlocked. Then, the terminal 100 may display a user interface shown in FIG. 2C. The interface may be referred to as a main interface of the terminal 100.

Not limited to the face unlocking described in the above embodiments, the terminal 100 may alternatively use password unlocking (a graphic password, or a digital password), fingerprint unlocking and other unlocking manner. After successful unlocking, the terminal 100 may likewise display the main interface shown in FIG. 2C.

The main interface may include a notification bar 221, a page indicator 222, a common application icon tray 223, and a plurality of other application icon trays 224.

The notification bar may include one or more signal strength indicators (for example, a signal strength indicator 221A, a signal strength indicator 221B), a wireless fidelity (wireless fidelity, Wi-Fi) signal strength indicator 221C, a battery status indicator 221D, and a time indicator 221E of a mobile communication signal (also referred to as a cellular signal).

The page indicator 222 may be used to indicate a position relationship between a currently displayed page and another page. Generally, the main interface of the terminal 100 may include a plurality of pages. The interface shown in FIG. 2C may be one of the above plurality of pages. The main interface of the terminal 100 further includes another page. The another page is not shown in FIG. 2C. The terminal 100 may display the another page, namely, a switching page, when a left sliding operation and a right sliding operation of the user are detected. At this time, the page indicator 222 also changes different forms to indicate different pages. Subsequent embodiments are described in detail.

The common application icon tray 223 may include a plurality of common application icons (for example, a camera application icon, a contacts application icon, a telephone application icon, an information application icon), and the common application icon remains displayed during page switching. The common application icons are optional. This is not limited in embodiments of this application.

The other application icon trays 224 may include a plurality of general application icons such as a setting application icon, an application marketplace application icon, a gallery application icon, and a browser application icon. The general application icons may be distributed in other application icon trays 224 of a plurality of pages of the main interface. The general application icons displayed in the other application icon trays 224 are changed accordingly during page switching. An icon of an application may be the general application icon or the common application icon. When the icons are placed on the common application icon tray 223, the icons are common application icons. When the icons are placed on the other application icon trays 224, the icons are general application icons.

It may be understood that, FIG. 2C only illustrates one main interface or one page of one main interface of the terminal 100 by way of example and should not constitute a limitation on embodiments of this application.

After displaying FIG. 2C, the terminal 100 may collect and generate an image frame including a user's face through the camera module 210. At this time, a quantity of cameras used by the terminal 100 is two, including one 2D camera and one 3D camera. Certainly, not limited to one 2D camera and one 3D camera, the terminal 100 may alternatively use more cameras to obtain more facial features of the user, especially an eye feature, to determine an eyeball gaze position of the user more quickly and accurately.

In a scenario in which face unlocking is used, the 3D camera of the terminal 100 is turned on, so that the terminal 100 only needs to turn on the 2D camera of the camera module 210. In a scenario in which password unlocking and fingerprint unlocking are used, the camera of the terminal 100 is turned off. At this time, the terminal 100 needs to turn on the 2D camera and the 3D camera in the camera module 210.

Preferably, time (denoted as gaze recognition time) at which the terminal 100 collects and generates an image frame gaze is the first 3 seconds of displaying the main interface shown in FIG. 2C. After 3 seconds, the terminal 100 may turn off the camera module 210 to reduce power consumption. If the gaze recognition time is set too short, for example, 1 second, an eyeball gaze recognition result may be inaccurate. On the other hand, it is difficult for the user to gaze at the notification bar immediately within 1 second after displaying the main interface. If the gaze recognition time is set too long, for example, 7 seconds and 10 seconds, it leads to excessive power consumption, and this is not conducive to endurance of the terminal 100. Certainly, not limited to 3 seconds, the gaze recognition time may alternatively be other values such as 2.5 seconds, 3.5 seconds, 4 seconds, and the like. This is not limited in embodiments of this application. Subsequent introductions take 3 seconds as an example.

Figure 2D:
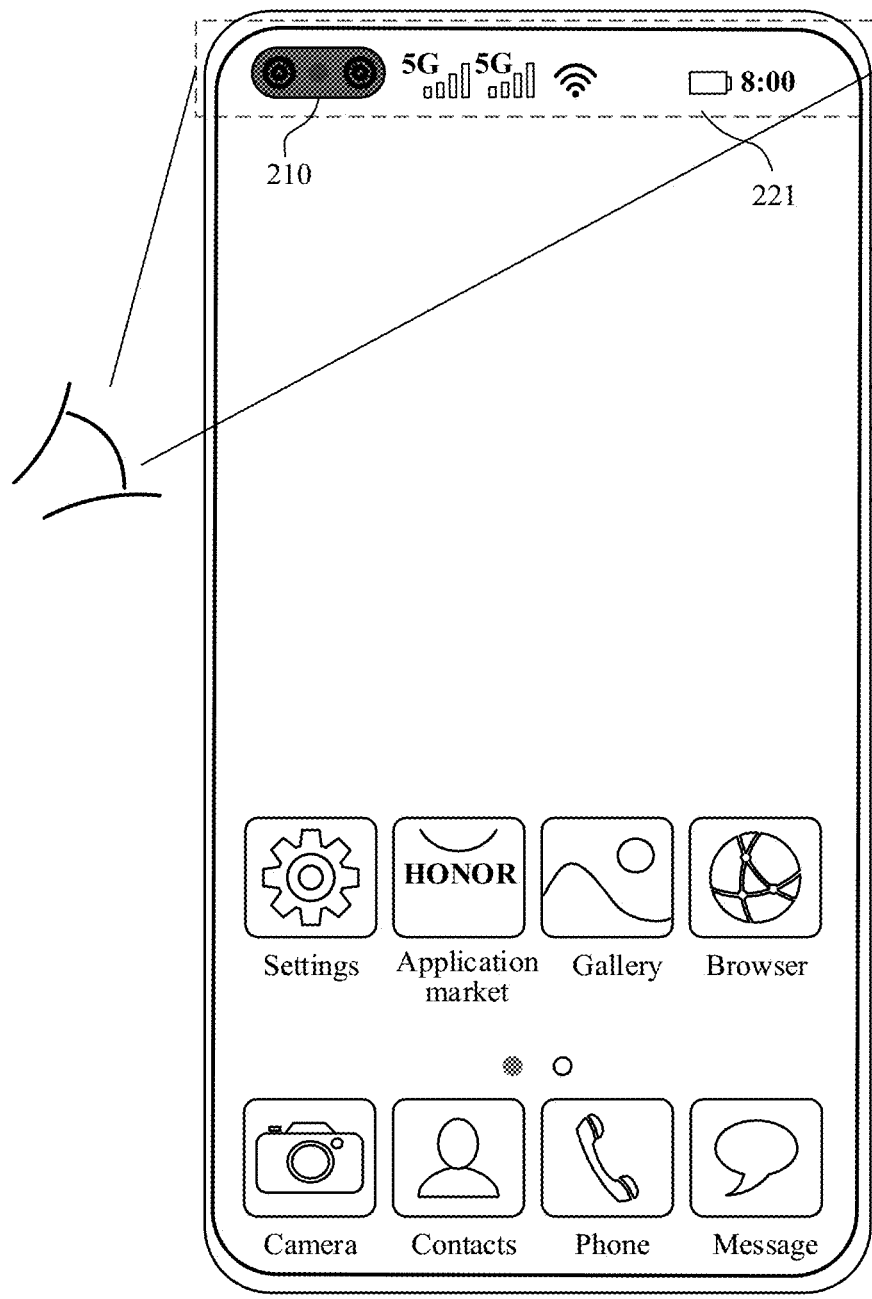
Figure 2E:
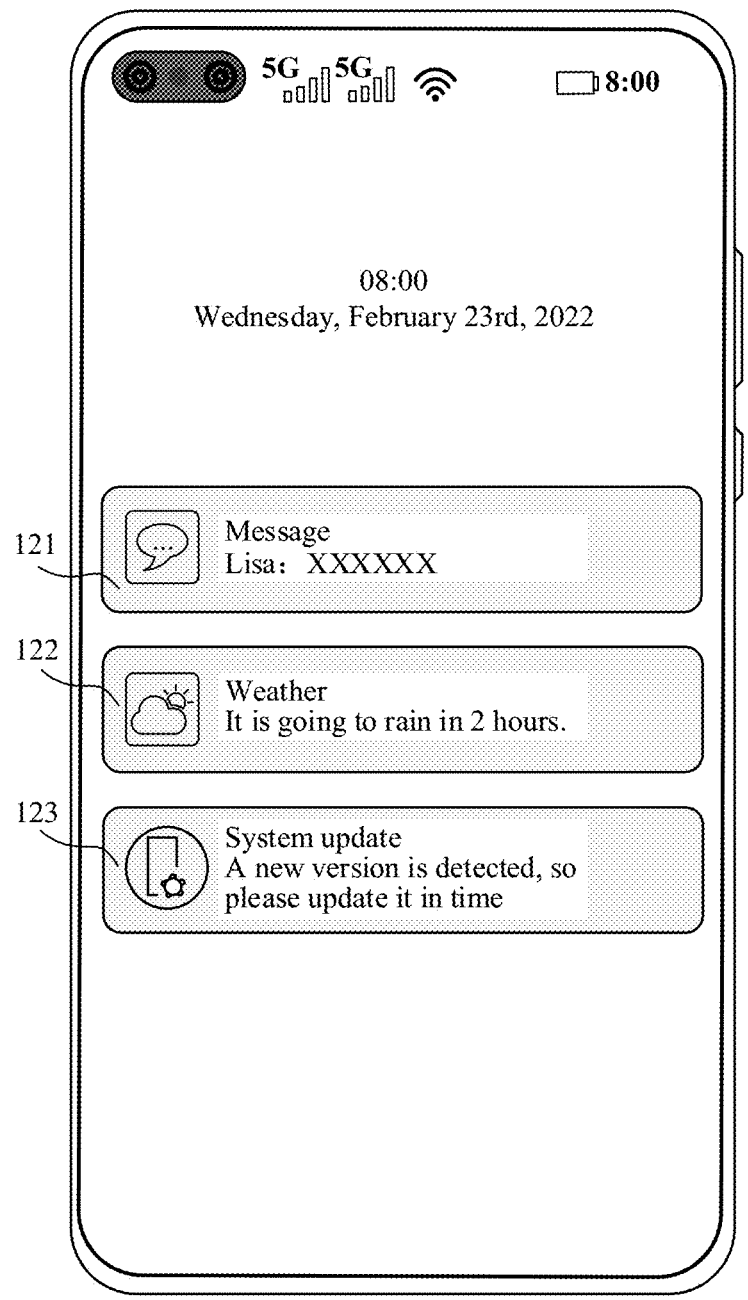

During the gaze recognition time described above, the camera module 210 may continuously collect and generate the image frame including the user's facial image. Then, the terminal 100 may recognize the eyeball gaze position of the user by using the above image frame. Refer to FIG. 2D. The terminal 100 may display a notification interface shown in FIG. 2E for the user to obtain notification information when it is recognized that the eyeball gaze position of the user is within the notification bar 221, that is, it is determined that the user is gazing at the notification bar 221. The notification interface shown in FIG. 2E is the same as that in FIG. 1B. Details are not described again.

At this time, the terminal 100 provides the user with an ability to control to display the notification interface through eyeball gaze. The user only needs to gaze at the notification bar 221 to obtain the notification interface without performing a pull-down operation, and this saves a user operation. Especially in scenes in which a touch operation is inconvenient to be performed, such as cooking, the interaction method based on eyeball gaze can provide great convenience for the user.

Further, through user behavior analysis, the terminal 100 may determine a scene in which the user needs to display the notification interface (a period of time before starting to display the main interface), and further provide an eyeball gaze recognition service for the user in a corresponding scene. This avoids a problem of resource waste caused by long-term turning on of the camera.

Figure 14A:
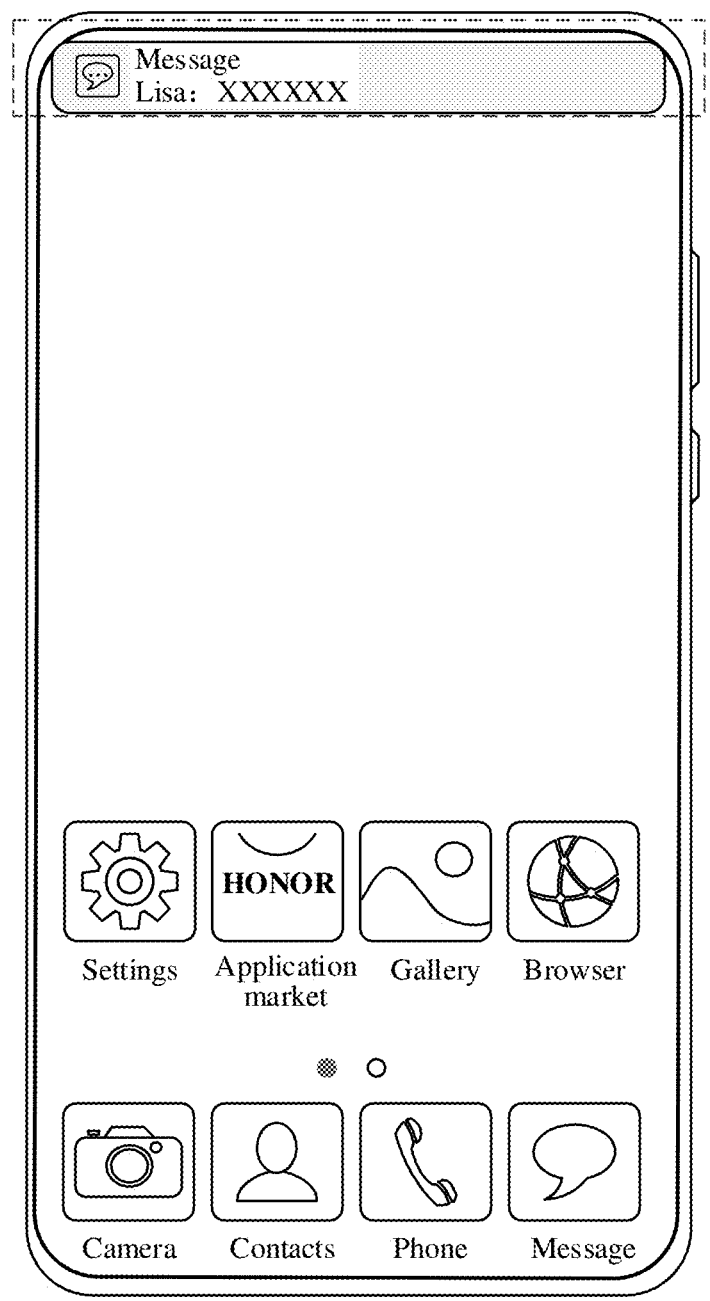
FIG. 14A-14C are a group of user interfaces according to an embodiment of this application.
Figure 14B:
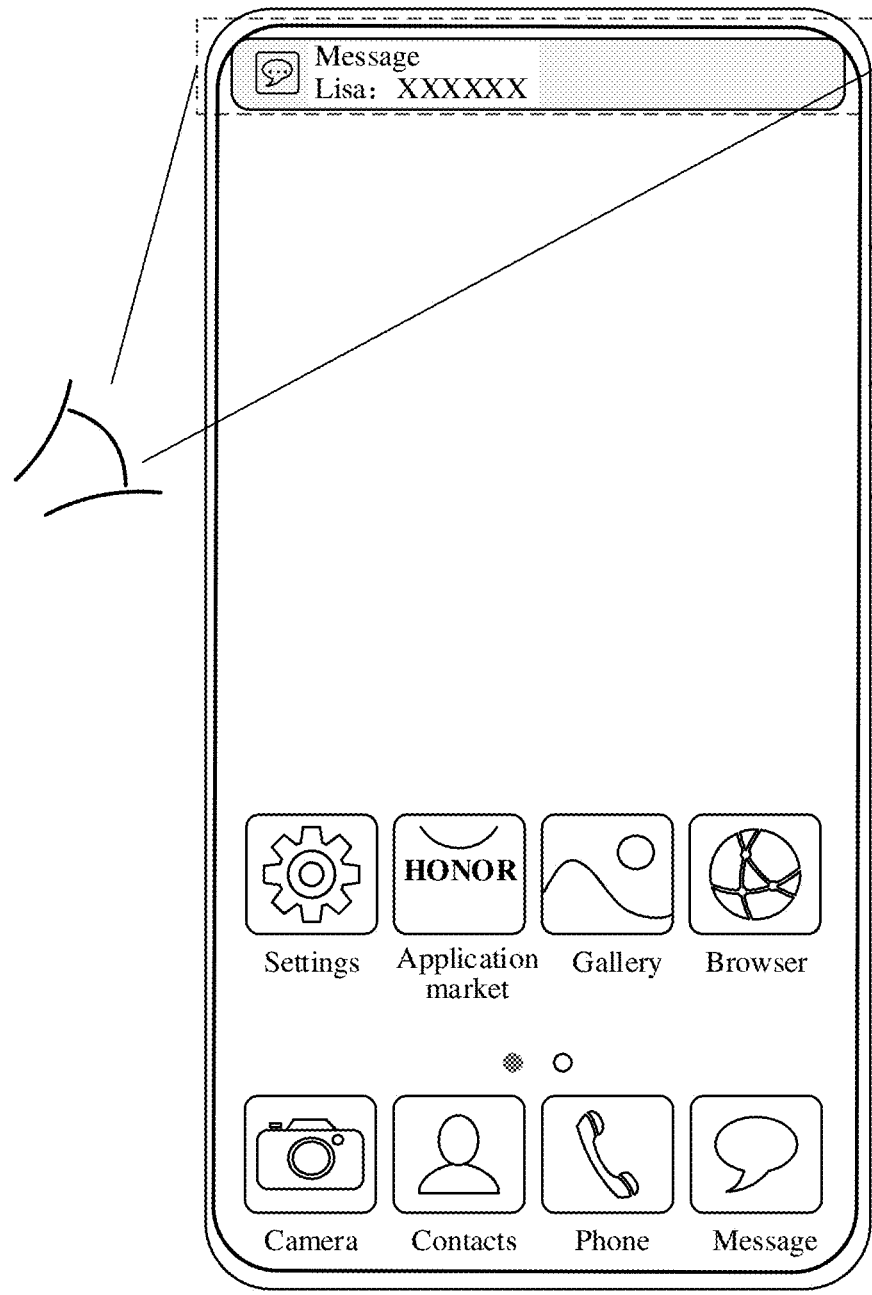
Figure 14C:
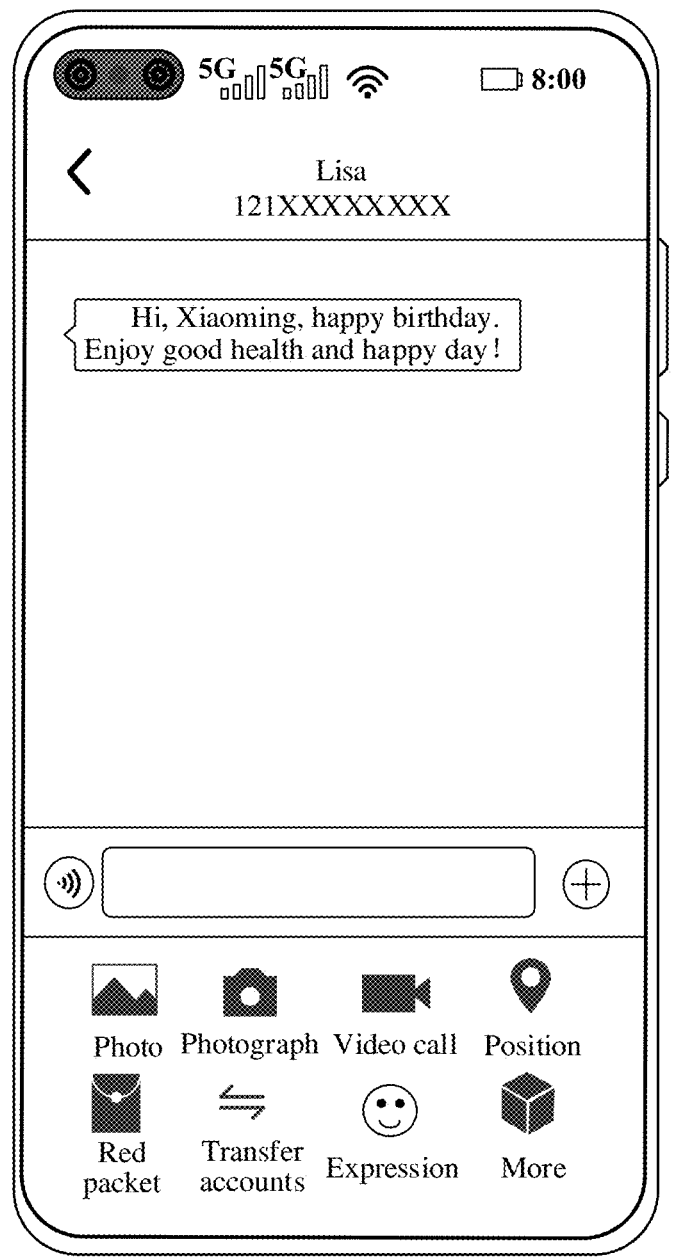

Optionally, the terminal 100 may alternatively enable eyeball gaze recognition when entering an application through a notification of a to-be-unlocked interface and displaying an interface of the application. Certainly, regardless of power consumption, the terminal 100 may turn on the camera in real time and obtain the eyeball gaze position of the user, to determine whether the user controls to display the notification interface through eyeball gaze. For example, in a video player, the terminal 100 may detect whether the user is gazing at the top of a screen or a popped-up banner notification (shown in FIGS. 14A and 14B). When it is detected that the user is gazing at the top of the screen or the popped-up banner notification, the terminal 100 may display the notification interface, an interface corresponding to the banner notification (shown in FIG. 14C), or the like.

Figure 2F:
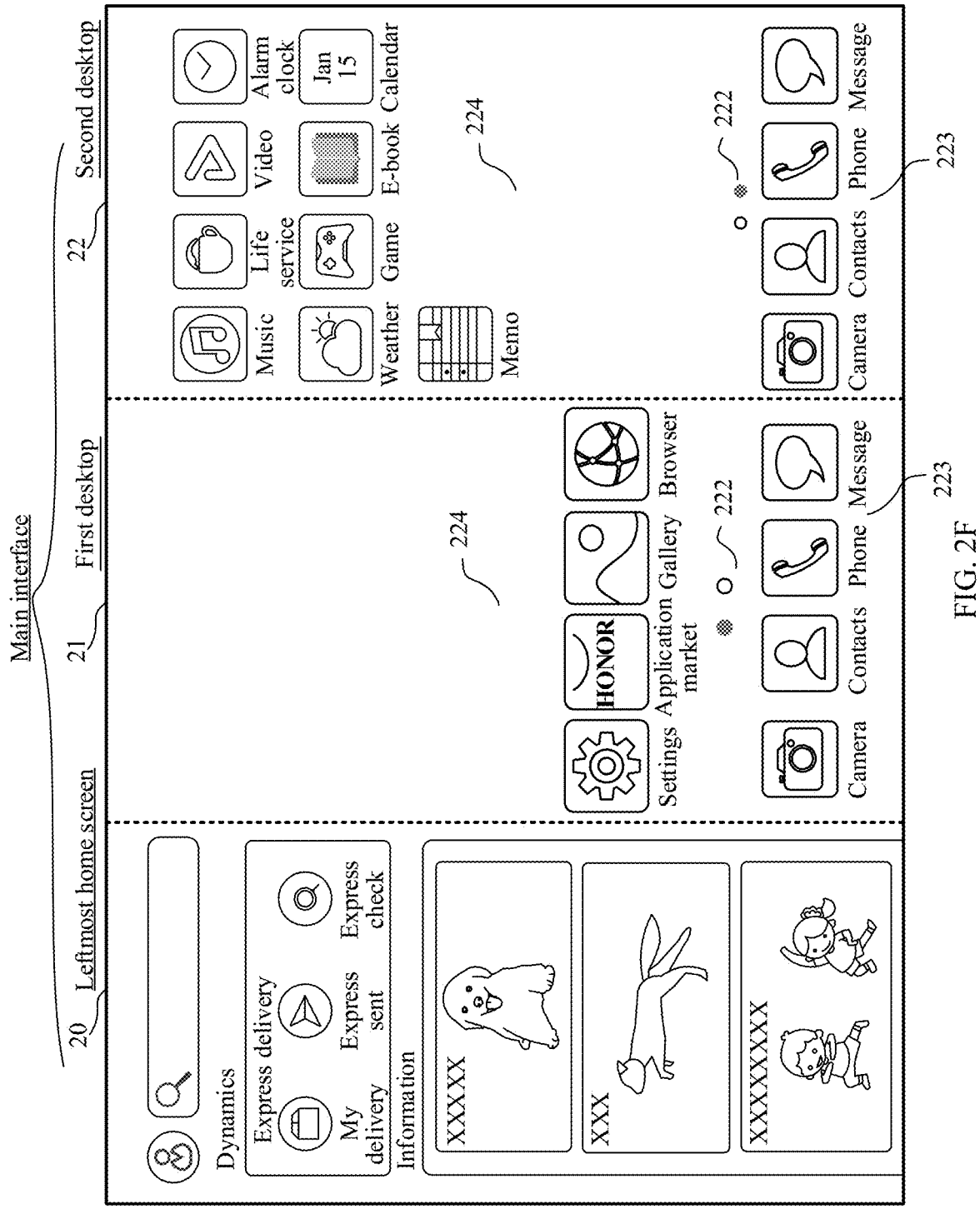

For example, FIG. 2F illustrates a main interface including a plurality of pages. Each page may be referred to as the main interface.

As shown in FIG. 2F, the main interface may include a page 20, a page 21 and a page 22. The page 21 may be referred to as a first desktop. The first desktop is also referred to as a homepage (homepage), a home screen, or a start screen. It may be understood that when there is only one application icon, a page indicator 222 has only one point on a desktop on which the application icon is located. The page 22 may be referred to as a second desktop. It may be understood that, the second desktop is a desktop that is adjacent to the first desktop and that is a right side of the first desktop. If the first desktop is displayed, a right-to-left sliding operation performed by a user is detected and the second desktop is displayed. The page 20 may be referred to as a leftmost home screen. It may be understood that, the leftmost home screen is an interface that is adjacent to the first desktop and that is a left side of the first desktop, which may be a functional page. For example, when the first desktop is displayed, a left-to-right sliding operation performed by the user is detected and the leftmost home screen is displayed. A page layout of the second desktop is the same as that of the first desktop. Details are not described again. A quantity of desktops on the main interface may be increased or decreased according to the user's settings and only the first desktop, the second desktop and the like are shown in FIG. 2F.

On the main interface shown in FIG. 2C, the main interface displayed by the terminal 100 is actually the first desktop on the main interface shown in FIG. 2F. In some embodiments, the terminal 100 first displays the first desktop after successfully unlocking. In other embodiments, after successfully unlocking, the terminal 100 may display the leftmost home screen, the first desktop or the second desktop. Optionally, which one in the leftmost home screen, the first desktop or the second desktop specifically displayed by the terminal 100 depends on a page that stays at the last exit.

Figure 2G:
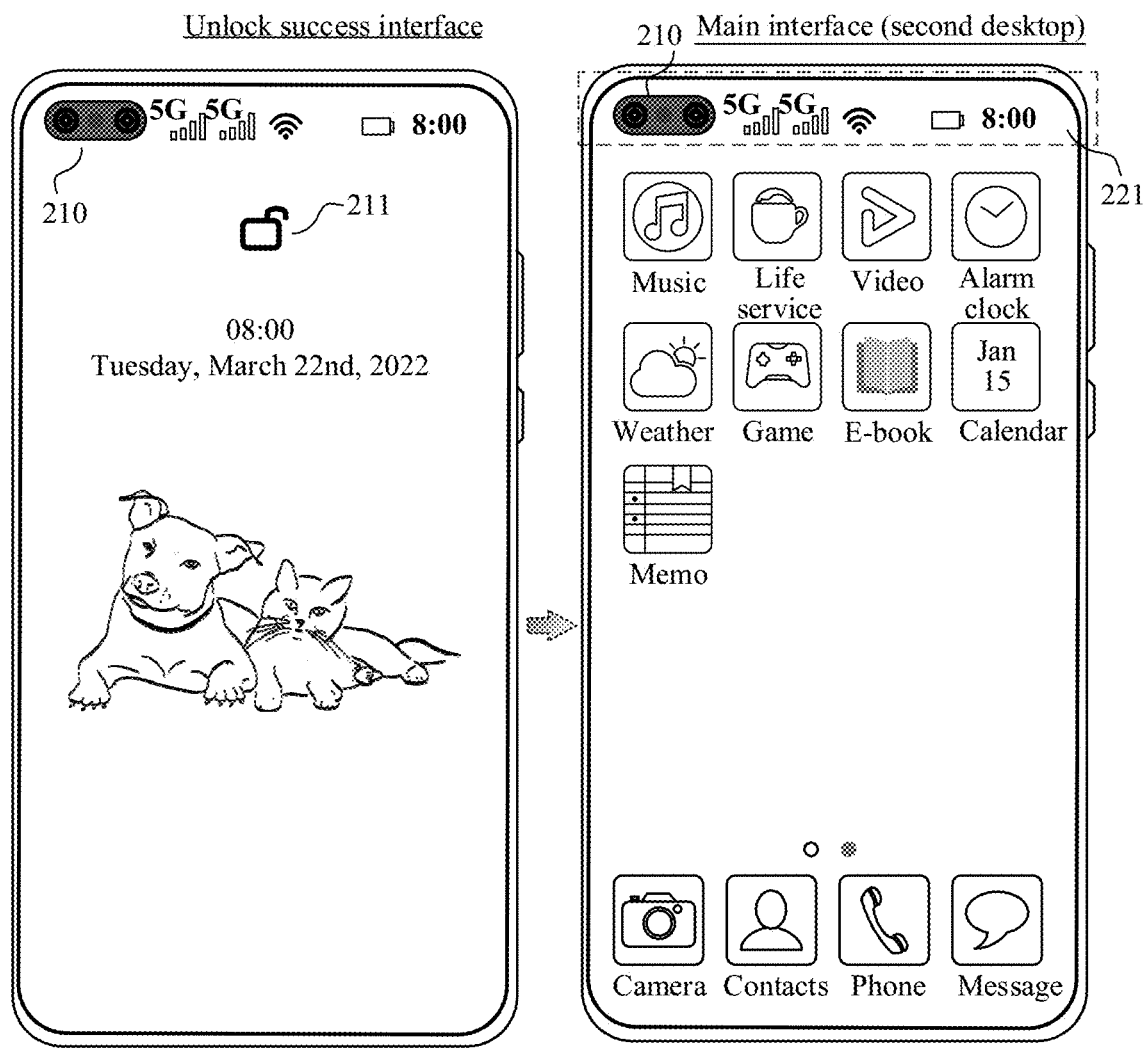
Figure 2H:

Therefore, after displaying the unlock success interface shown in FIG. 2B, the terminal 100 may alternatively display a main interface shown in FIG. 2G or FIG. 2H (a second desktop or a leftmost home screen of the main interface). Refer to the foregoing description in FIG. 2C. Within the first 3 seconds of displaying the second desktop or the leftmost home screen, the terminal 100 may alternatively collect and generate an image frame including a user's facial image through the camera module 210 and recognize whether the user is gazing at the notification bar 221. The terminal 100 may alternatively display a notification interface shown in FIG. 2E for the user to obtain notification information if it is recognized that the eyeball gaze position of the user is within the notification bar 221.

In this way, no matter which main interface is displayed by the terminal 100 after unlocking, the terminal 100 may detect an eyeball gaze position of the user within the first 3 seconds, to meet a requirement that the user wants to view the notification first after unlocking.

After the user unlocks and is not sure which operation is performed next, the user usually performs a left sliding operation and a right sliding operation to switch a page of the currently displayed main interface. At this time, after the page is switched, the user usually performs a pull-down operation to indicate the terminal 100 to display the notification interface. Therefore, in some embodiments, the terminal 100 may alternatively enable the camera module 210 to collect and generate the image frame including the user's facial image each time a page is switched, to recognize whether the user is gazing at the notification bar 221.

Figure 3A:
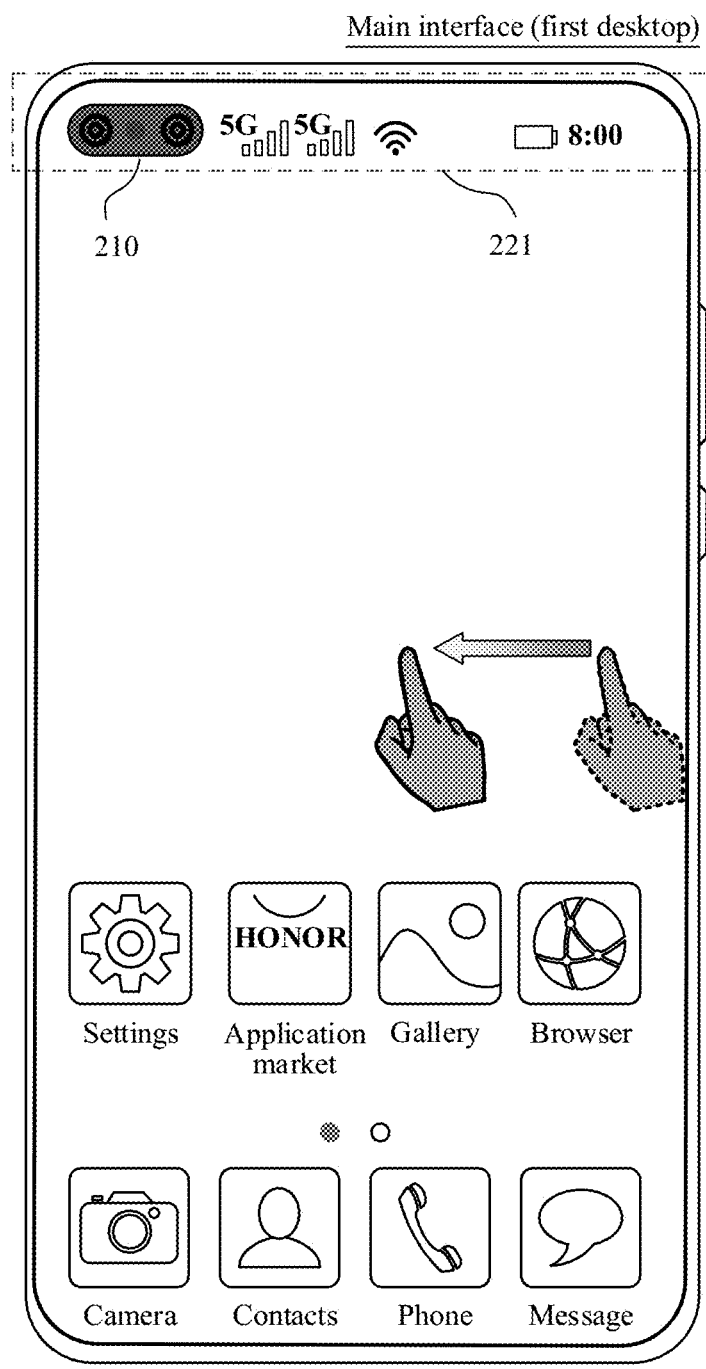
FIG. 3A to FIG. 3H are a group of user interfaces according to an embodiment of this application.

As shown in FIG. 3A, after successfully unlocking, the terminal 100 may first display the first desktop. First, within the first 3 seconds of displaying the first desktop, the terminal 100 may enable the camera module 210 to collect and generate the image frame including the user's facial image and recognize whether the user is gazing at the notification bar 221.

Figure 3B:
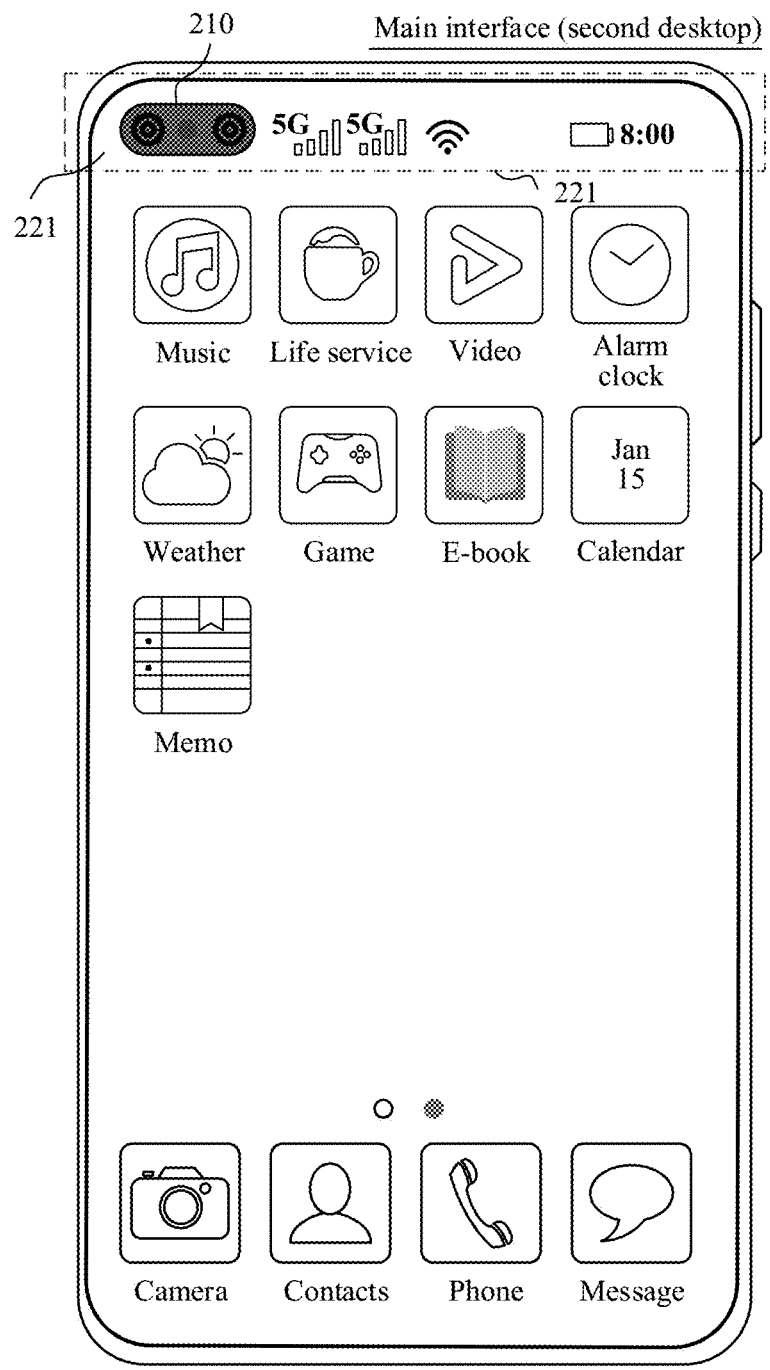
Figure 3C:
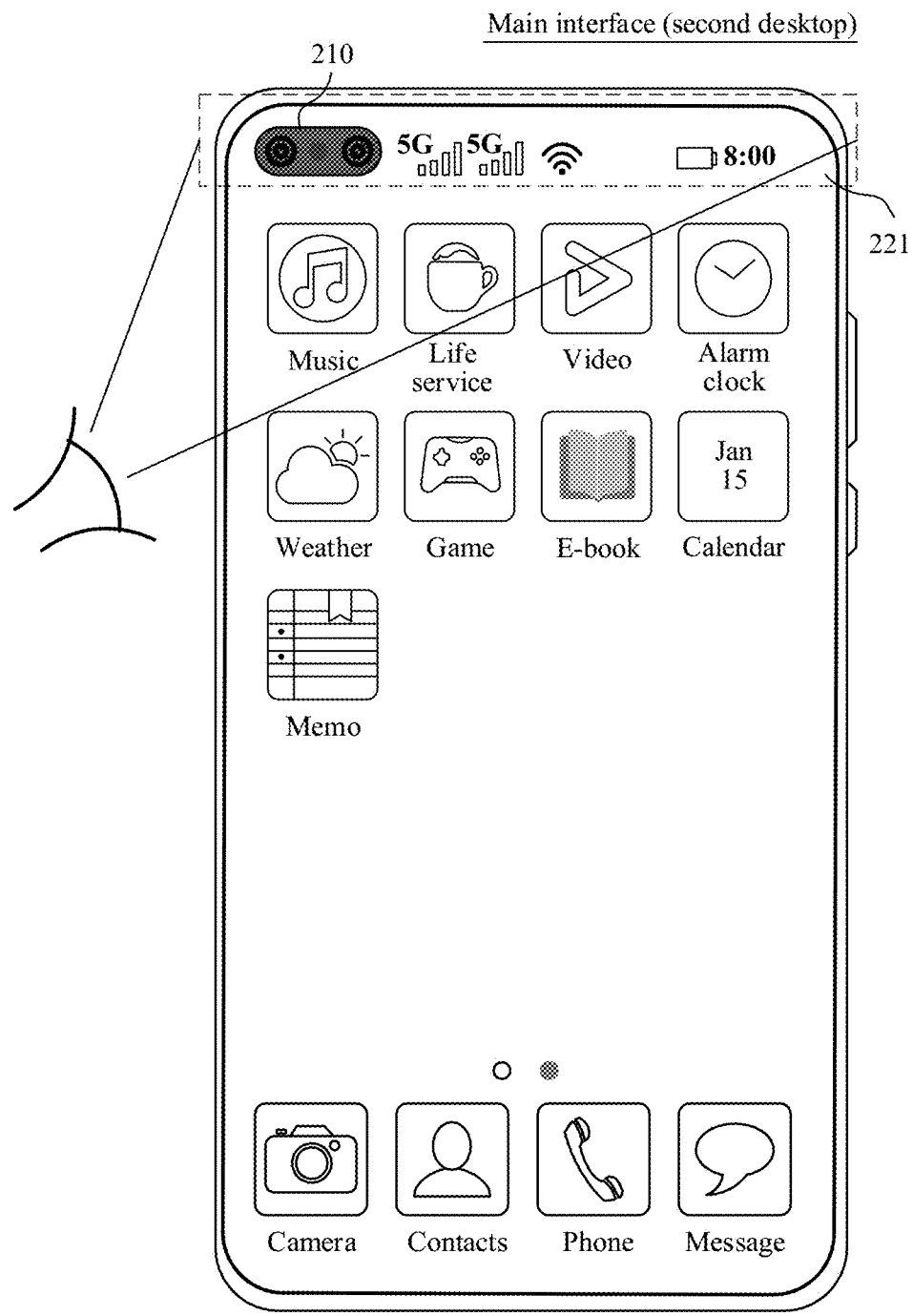
Figure 3D:
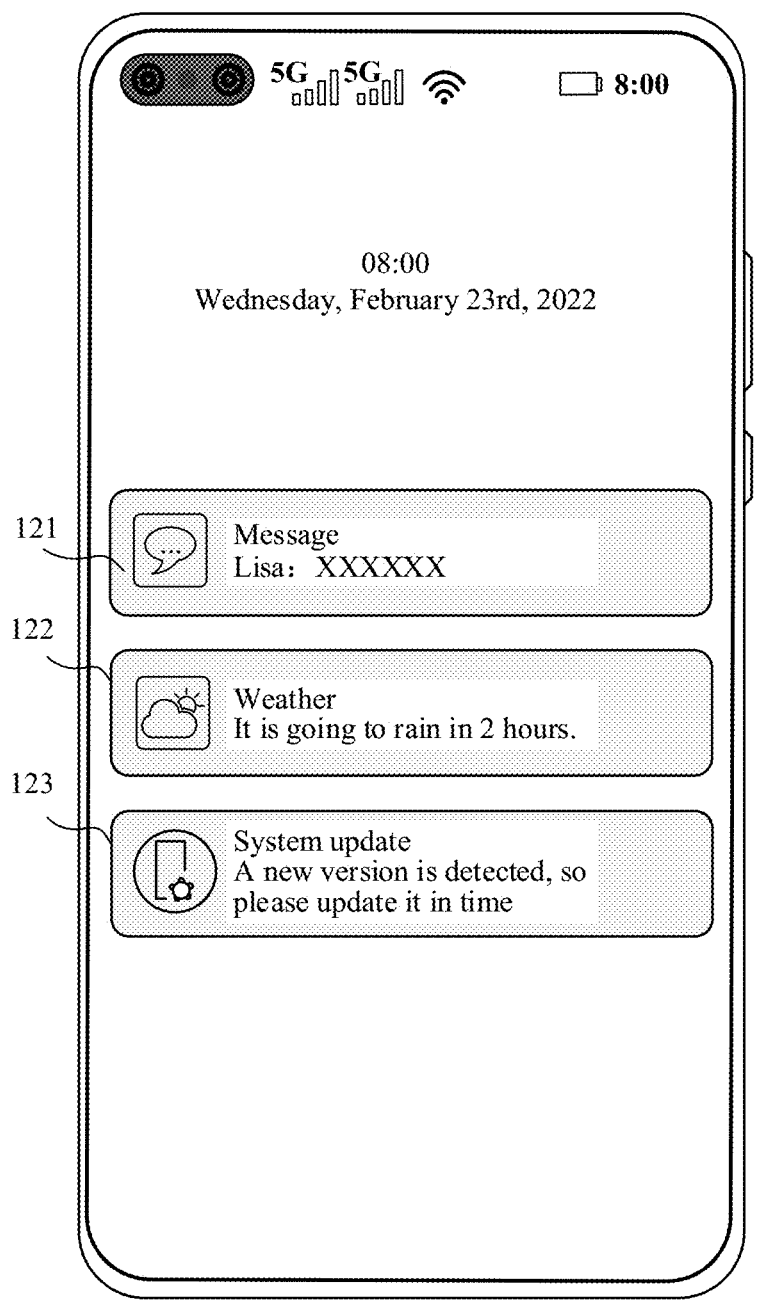

At a moment within the 3 seconds (or after 3 seconds and the user gazing at the notification bar is not recognized), the terminal 100 may detect the left sliding operation (an operation of sliding from a right side of a screen to a left side). In response to the operation, the terminal 100 may display the second desktop. Refer to FIG. 3B. At this time, within the first 3 seconds of displaying the second desktop, the terminal 100 may alternatively enable the camera module 210 to collect and generate the image frame including the user's facial image and recognize whether the user is gazing at the notification bar 221. As shown in FIG. 3C and FIG. 3D, the terminal 100 may alternatively display the notification interface when it is recognized that the user is gazing at the notification bar 221. The notification interface shown in FIG. 3D is the same as that in FIG. 1B. Details are not described again.

Figure 3E:
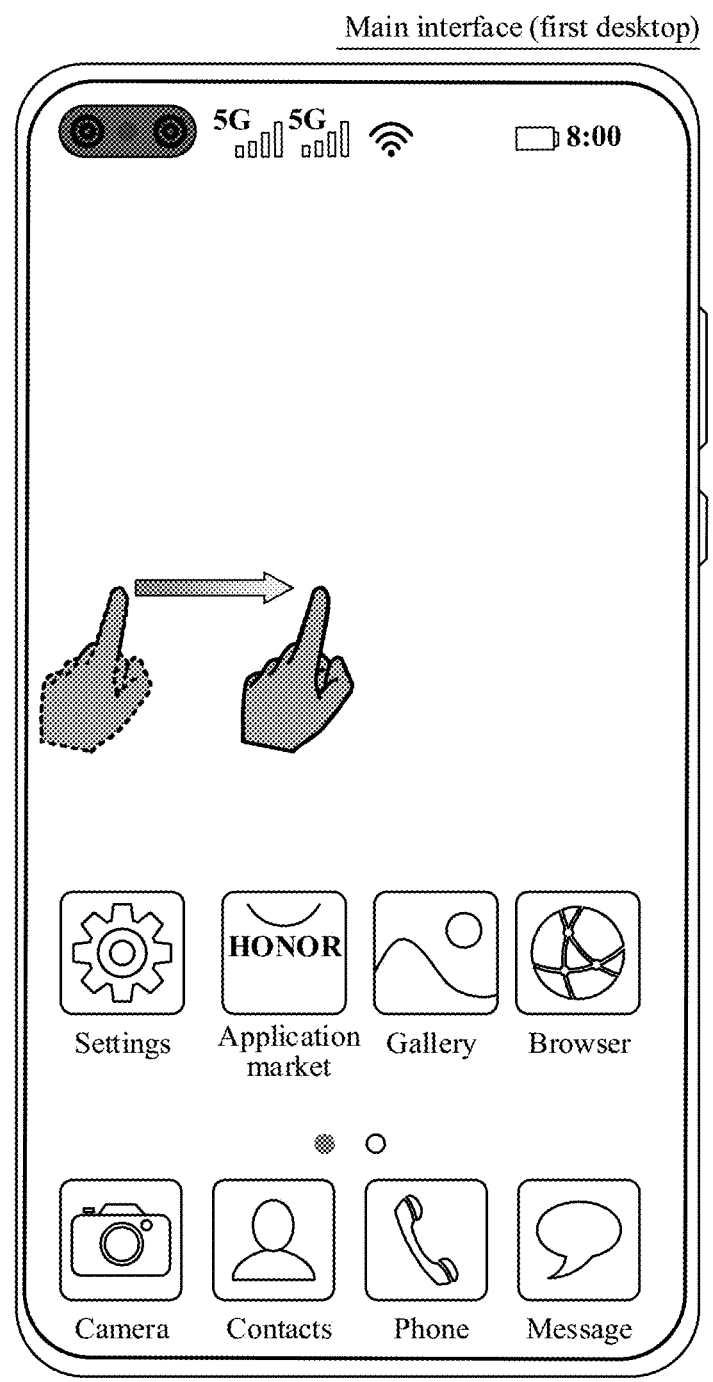
Figure 3F:
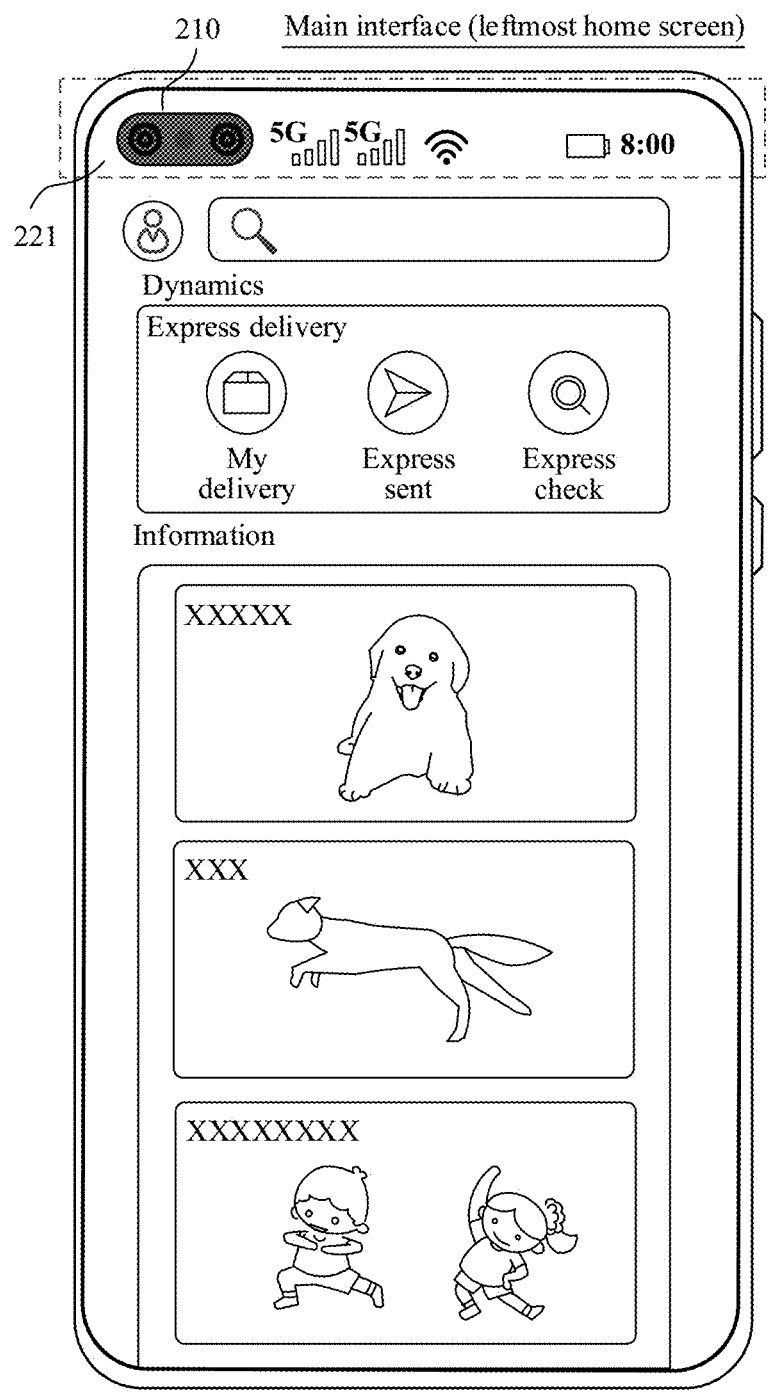
Figure 3G:
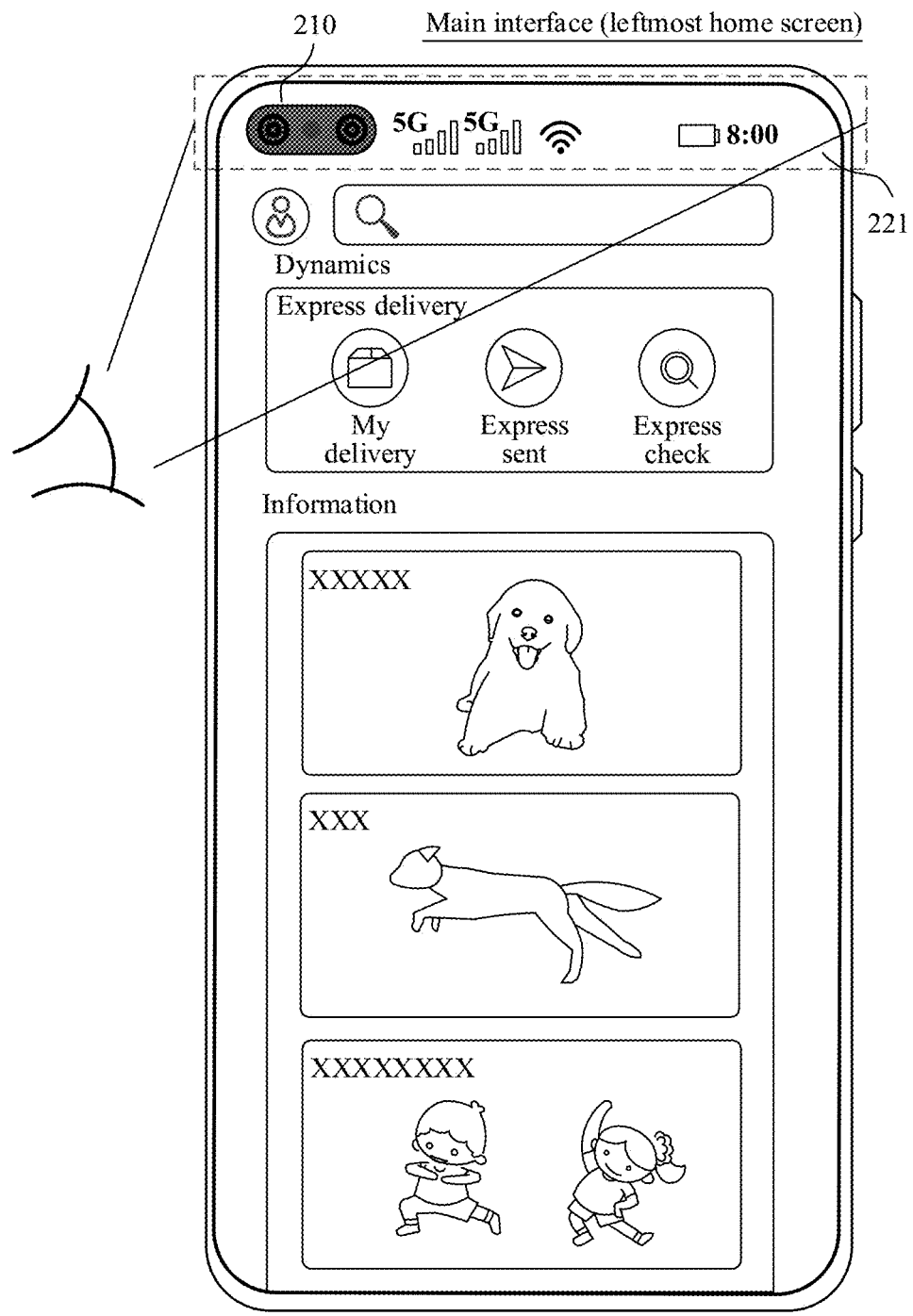
Figure 3H:
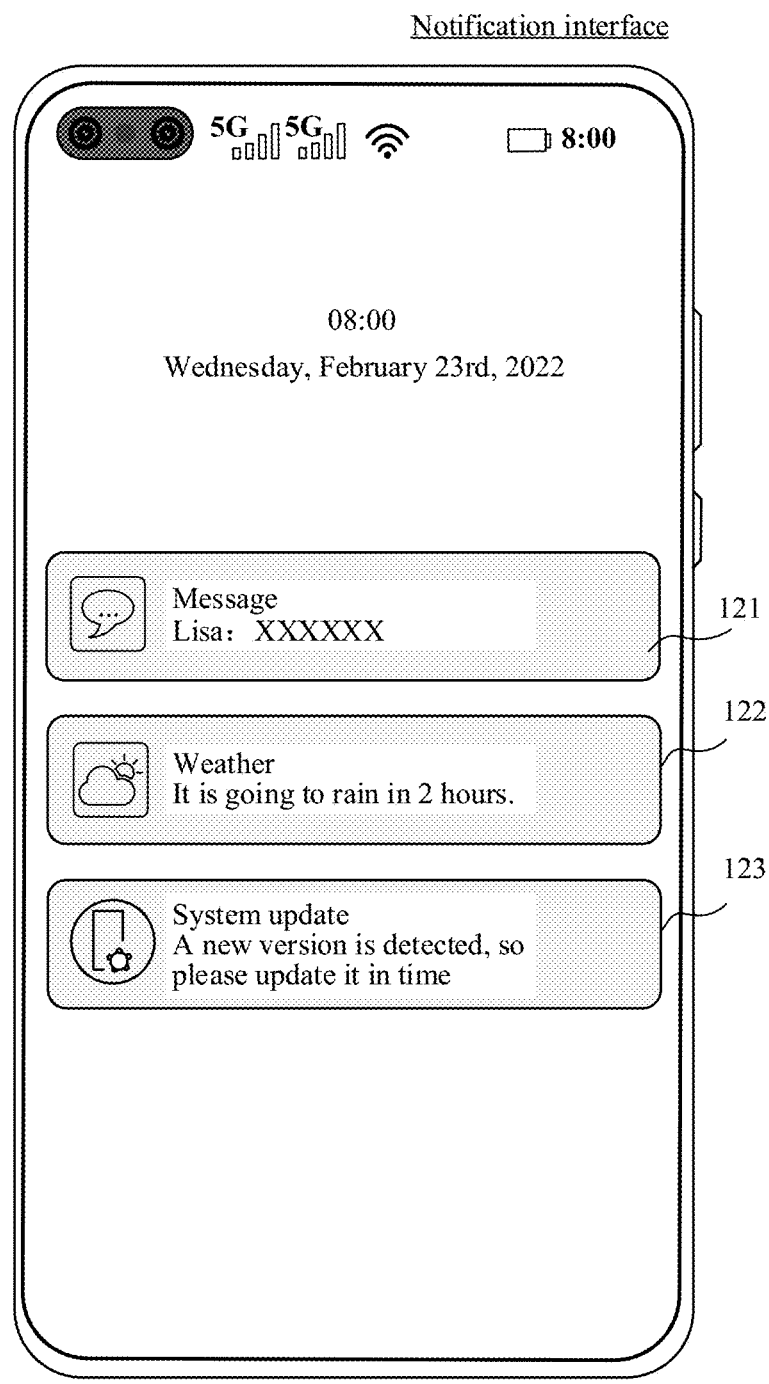

At a moment within the 3 seconds (or after 3 seconds and the user gazing at the notification bar is not recognized), the terminal 100 may alternatively detect the right sliding operation (an operation of sliding from a left side of the screen to a right side). Refer to FIG. 3E. In response to the above operation, the terminal 100 may display the leftmost home screen. Refer to FIG. 3F. Likewise, within the first 3 seconds of displaying the leftmost home screen, the terminal 100 may alternatively enable the camera module 210 to collect and generate the image frame including the user's facial image and recognize whether the user is gazing at the notification bar 221. As shown in FIG. 3G and FIG. 3H, the terminal 100 may alternatively display the notification interface when it is recognized that the user is gazing at the notification bar 221.

In this way, the terminal 100 may detect the eyeball gaze position of the user a plurality of times when the user performs page switching, to provide the user with opportunities of controlling to display through eyeball gaze for a plurality of times.

After detecting that the user exits from an application, the terminal 100 may display the main interface. At this time, the user often obtains the notification interface to view what other notifications are waiting to be processed. Therefore, in some embodiments, when returning to the main interface from a running application is detected, the terminal 100 may alternatively detect whether the user is gazing at the notification bar and further determine whether the notification interface is displayed.

Figure 4A:
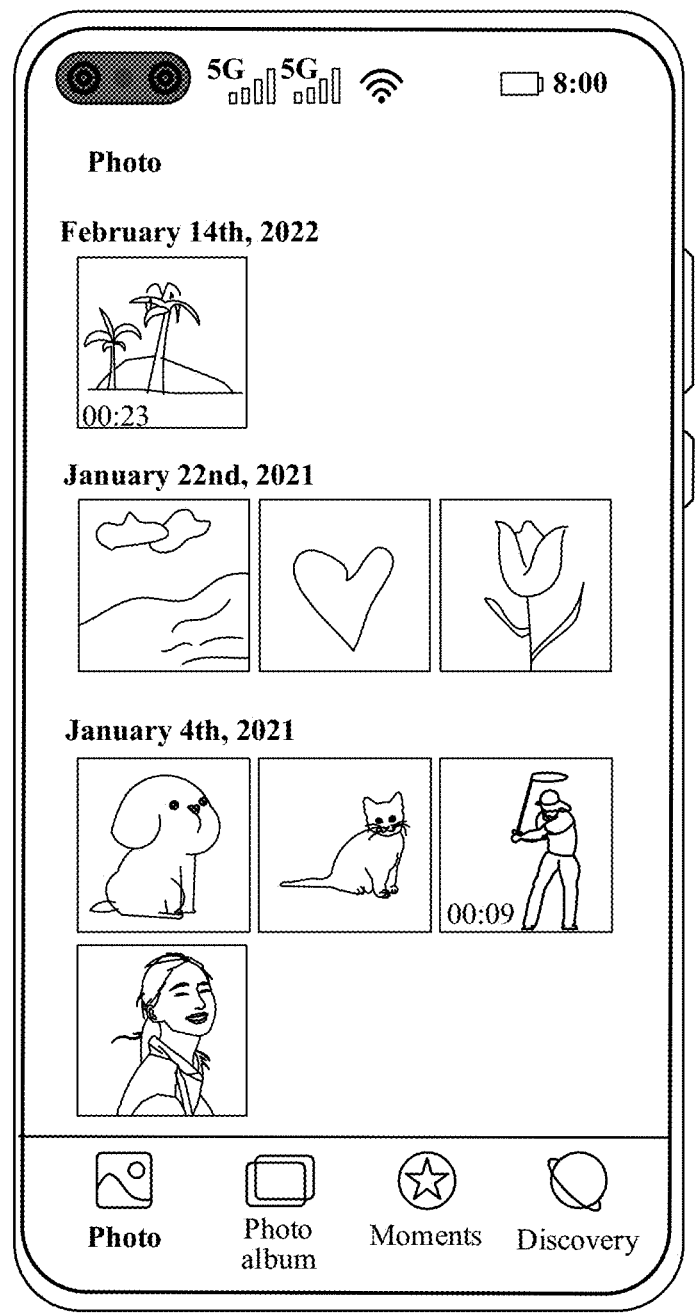
FIG. 4A to FIG. 4D are a group of user interfaces according to an embodiment of this application.
Figure 4B:
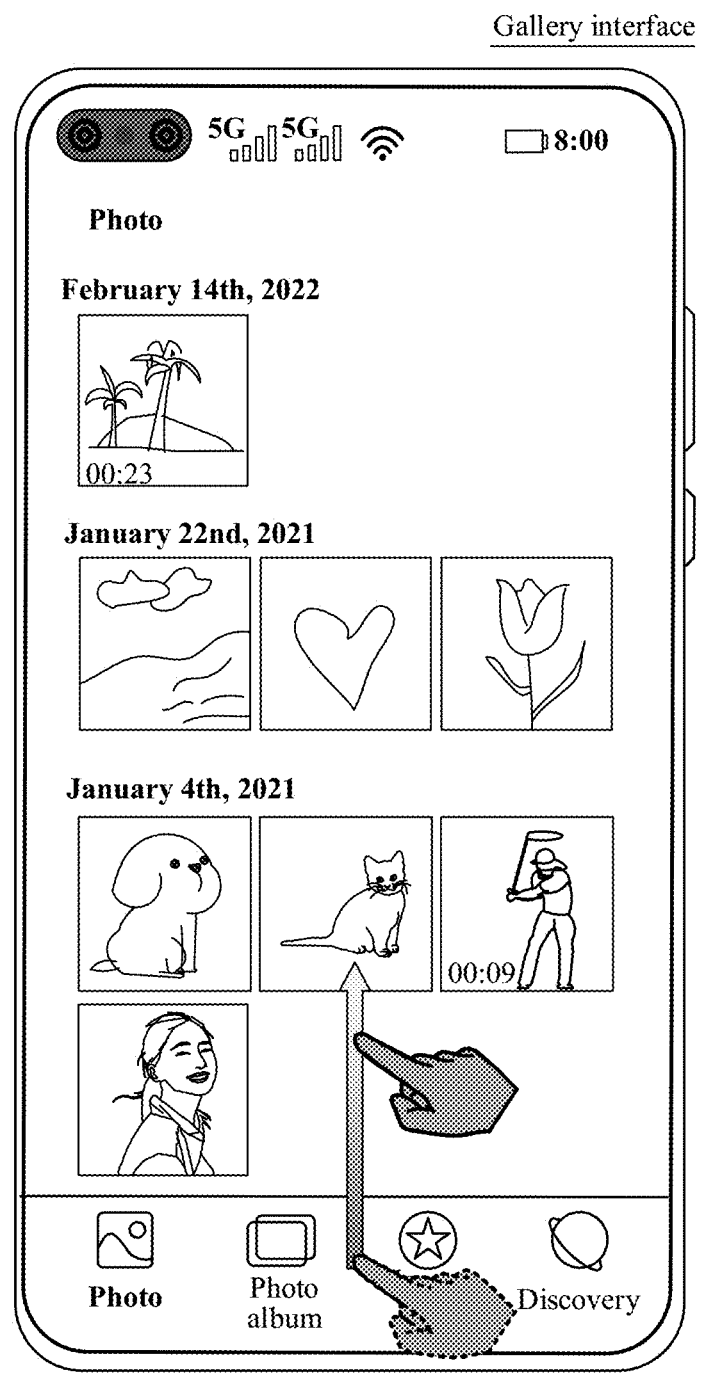
Figures 4C, 4D:
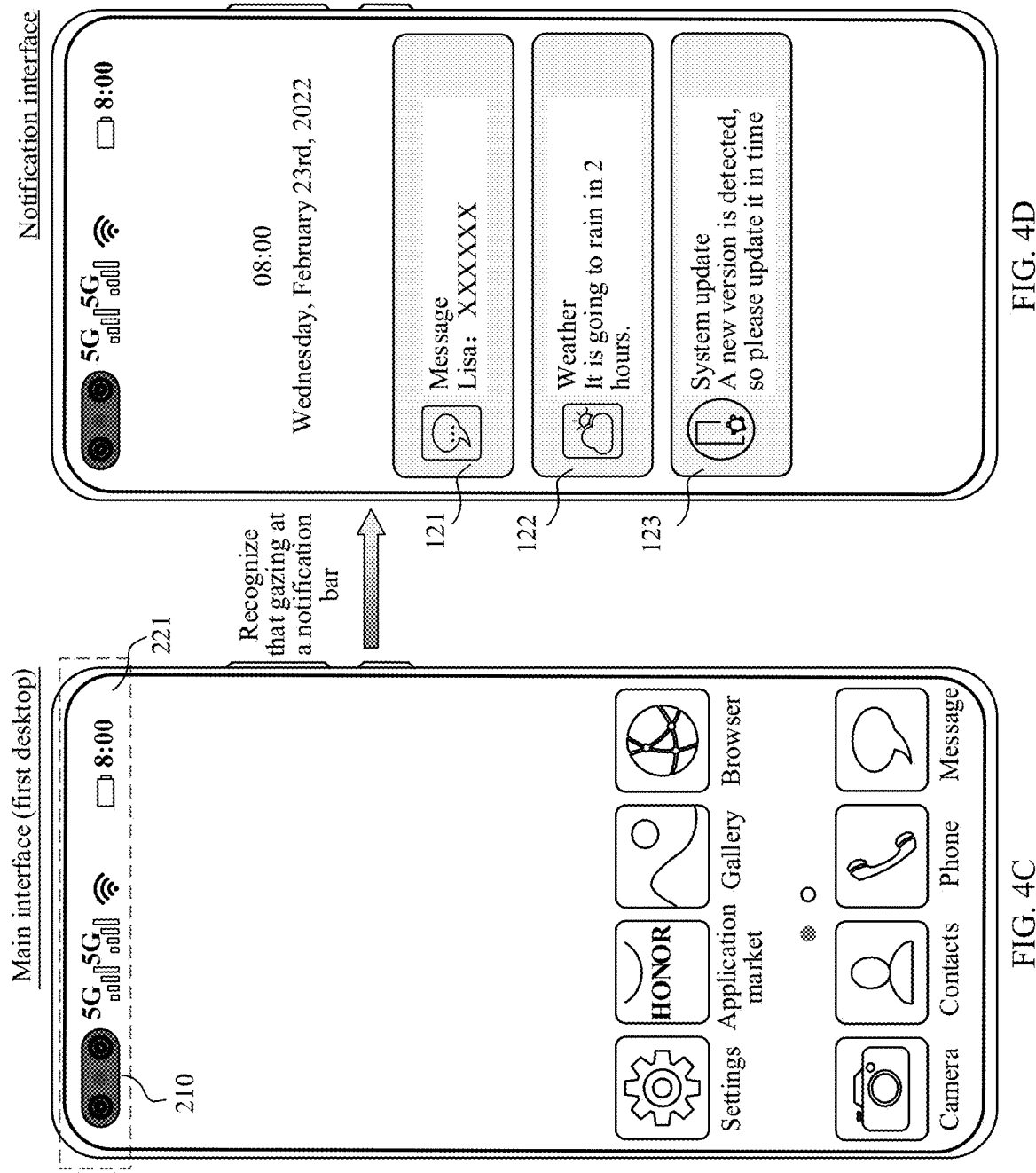

For example, FIG. 4A illustrates a user interface, denoted as a gallery interface, displayed by a terminal 100 when running a gallery application. A user may browse image resources such as a picture and a video stored in the terminal 100 through the gallery interface. The terminal 100 may detect a sliding up operation (an operation of sliding up from the bottom of a screen). Refer to FIG. 4B. In response to the sliding up operation, the terminal 100 may display a main interface. Refer to FIG. 4C. At this time, within the first 3 seconds of displaying the main interface, the terminal 100 may alternatively enable a camera module 210 to collect and generate an image frame including a user's facial image and recognize whether the user is gazing at a notification bar 221. The terminal 100 may alternatively display a notification interface when it is detected that an eyeball gaze position of the user is within the notification bar 221. Refer to FIG. 4D.

A gallery application is an application installed on the terminal 100 as an example. Not limited to the gallery application, the terminal 100 may enable the camera module 210 to collect and generate the image frame including the user's facial image, recognize whether the user is gazing at the notification bar 221, and further determine whether to display the notification interface when detecting an operation of returning to the main interface from another application.

In this way, the terminal 100 may alternatively detect the eyeball gaze position of the user when the user pushes out a currently running application and returns to the main interface. This meets a demand of the user to view a to-be-processed notification after using an application.

In some embodiments, after displaying the notification interface, the terminal 100 may alternatively confirm a quantity of notifications on the notification interface. If two or more notifications are displayed, the terminal 100 may automatically display another notification on the notification interface after the user processes one notification.

Figure 5A:
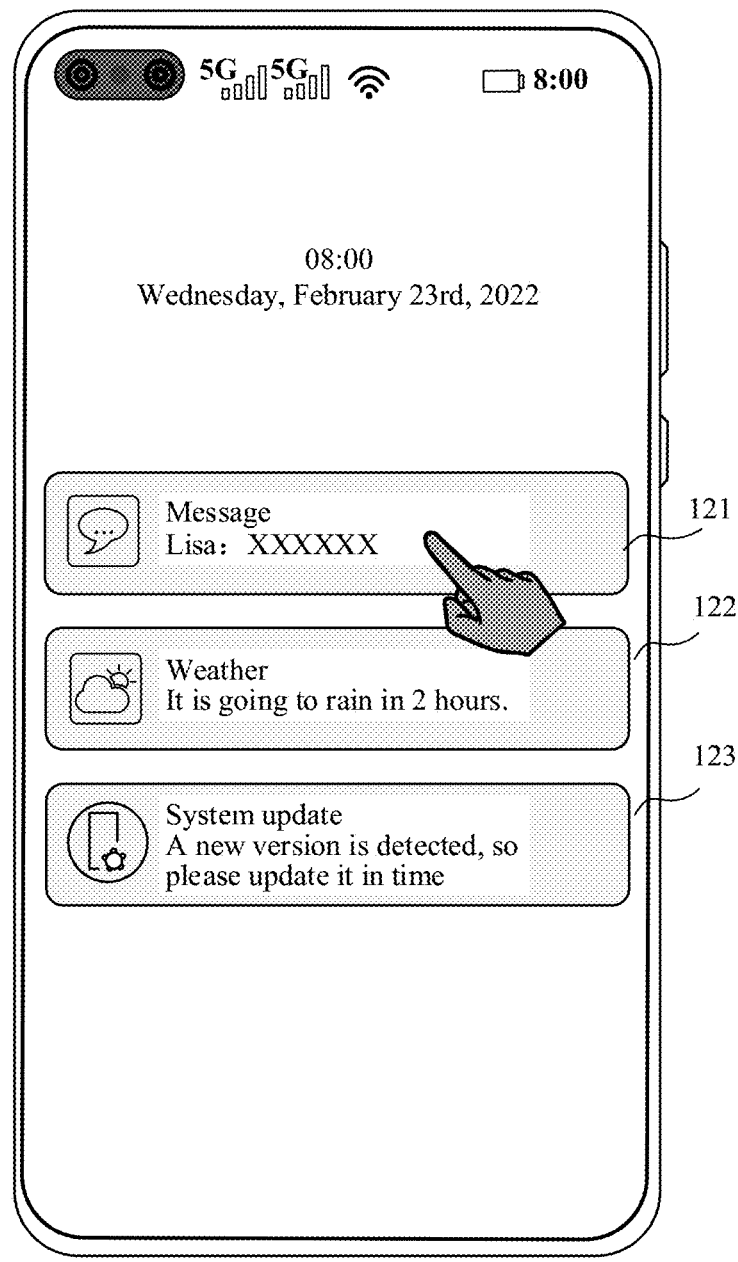
FIG. 5A to FIG. 5D are a group of user interfaces according to an embodiment of this application.

Refer to FIG. 5A. After displaying the notification interface, the terminal 100 may detect a user operation acting on a notification. In response to the operation, the terminal 100 may expand the notification and display detailed notification content corresponding to the notification.

For example, the terminal 100 may detect a user operation acting on a notification 121. The notification 121 is an information notification received by the terminal 100 as an example. In response to the operation, the terminal 100 can be referred to as an information interface as a user interface in which the terminal 100 performs information sending and receiving as shown in FIG. 5B.

The information interface may include a contact 511, information 512, and an input bar 513. The contact 511 may indicate a source of received information. For example, "Lisa" may indicate that a sender of the information displayed on the interface is "Lisa". The information 512 may show complete information content. The input bar 513 may be used to receive input information from a user of the terminal 100. When the user wants to reply to "Lisa", the user can click the input bar 513. In response to the click operation, the terminal 100 may display an input keyboard, receive the input information from the user and display the information in the input bar 513. After completing the input, the terminal 100 may send the information in the input bar 513 to "Lisa" in response to a sending operation performed by the user.

The information interface further includes a plurality of information type options. An information type option may be used to send one type of special information. For example, a photo option 514 may be used to send information about a photo type. The user may send a photo, an expression, a red envelope, a position and other special information to a contact through the plurality of information type options.

Figure 5B:
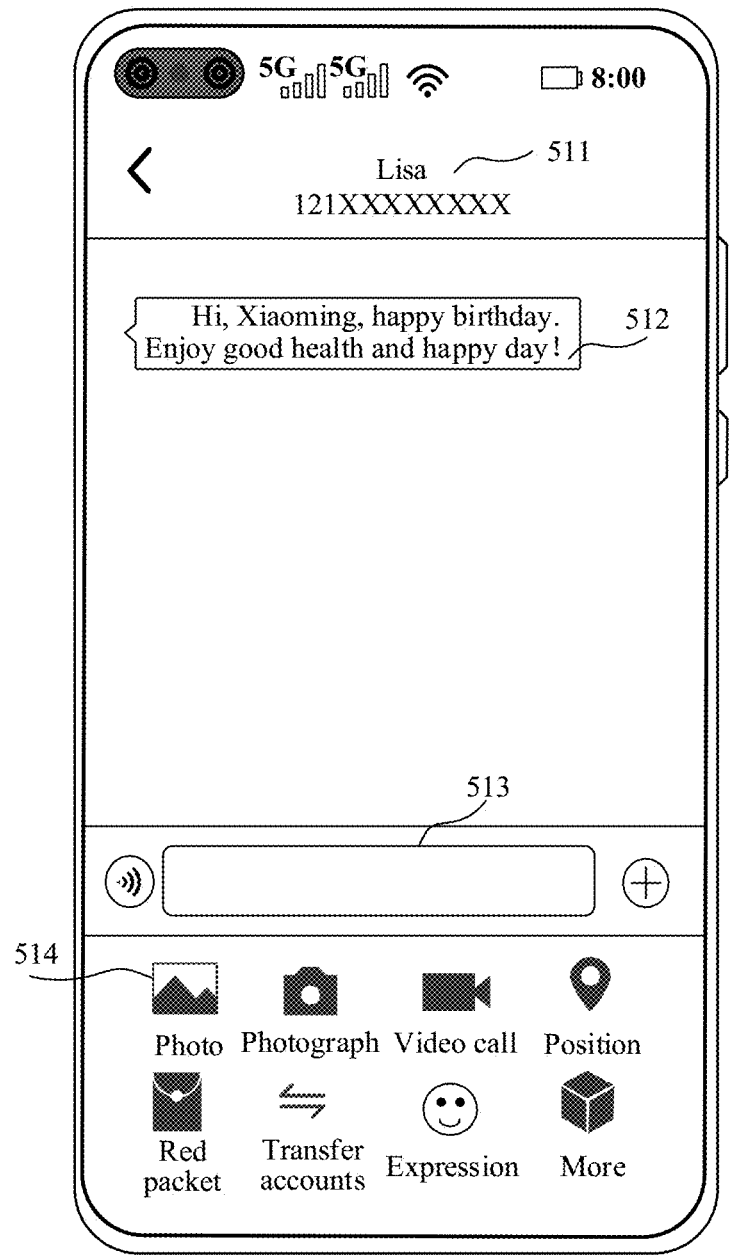

After displaying the information interface shown in FIG. 5B, the terminal 100 may monitor a user operation, and further determine whether the user finishes processing the notification. Specifically, after displaying the information interface shown in FIG. 5B, the terminal 100 may monitor whether a user operation acting on the information interface is detected within first waiting duration. If the user operation is not detected within the first waiting duration, the terminal 100 may determine that the user finishes processing the notification. If the user operation is detected within the first waiting duration, the terminal 100 may restart calculation of the first waiting duration at the moment when the user operation is detected, and detect a user operation within the first waiting duration after the above moment. If the user operation is not detected, the terminal 100 may determine that the user finishes processing the notification. Conversely, the terminal 100 continues to restart the calculation of the first waiting duration and detects the user operation. The first waiting duration is preset, for example, 5 seconds.

Figure 5C:
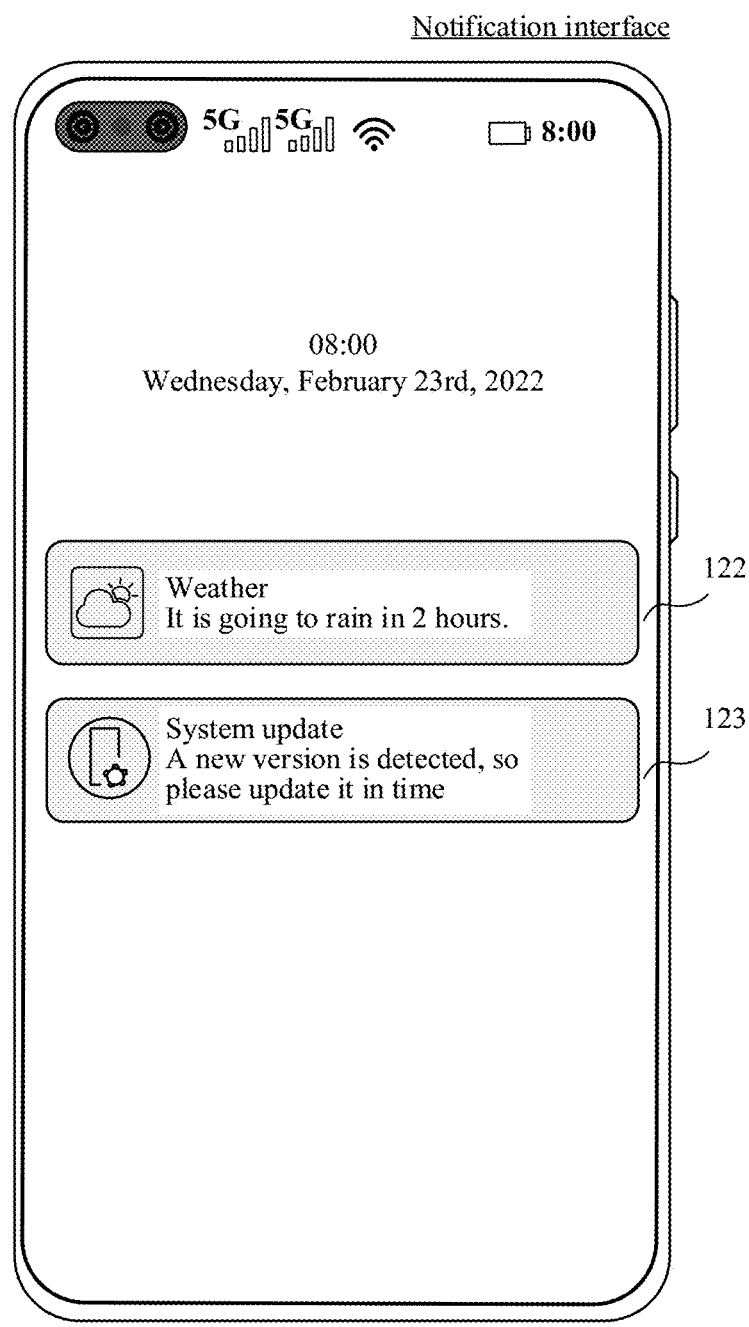

Taking 5 seconds as an example, if the terminal 100 does not detect any user operation acting on the information interface shown in FIG. 5B within 5 seconds after a user operation, the terminal 100 may determine that the user finishes processing the notification 121. Therefore, the terminal 100 may display the notification interface. Refer to FIG. 5C. At this time, the notification interface does not include the processed notification 121, but only a remaining notification 122 and notification 123.

Figure 5D:
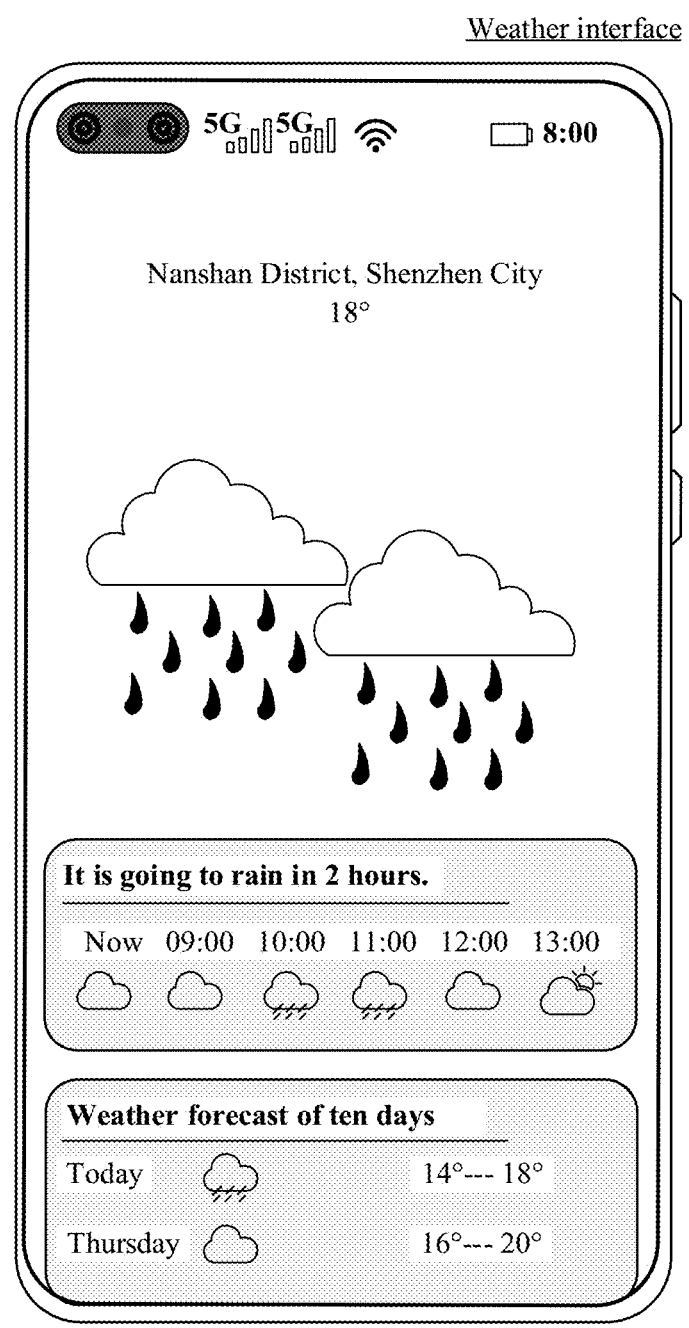

At this time, the user may choose to click the notification 122. The user may alternatively choose to click the notification 123, taking the notification 122 as an example. In response to a user operation of clicking the notification 122, the terminal 100 may display a page including detailed content of the notification 122. For example, the notification 122 may be a weather forecast notification. In response to an operation of clicking the weather forecast notification, the terminal 100 may display a user interface, which is denoted as a weather interface, showing current weather and weather forecast information as shown in FIG. 5D. Therefore, the user can quickly obtain weather information.

By implementing the method, after one notification is processed, the terminal 100 automatically displays the notification interface again to remind the user to process another unprocessed notification on the notification interface, and at the same time provides convenience for the user to process the notification without the need for the user to perform a pull-down operation every time.

The user may choose to enable or disable an eyeball gaze recognition function. In a scene in which eyeball gaze recognition is enabled, after unlocking is completed, the terminal 100 may collect and generate an image frame including a user's facial image, recognize the eyeball gaze position of the user, and then determine whether to display a notification bar, providing convenience for the user to view the notification. Conversely, in a scene in which eyeball gaze recognition is disabled, the terminal 100 does not collect the user's facial image for recognizing the eyeball gaze position of the user.

For example, FIG. 6A to FIG. 6D illustrate a group of user interfaces that are configured to enable or disable an eyeball gaze recognition function.

Figure 6A:
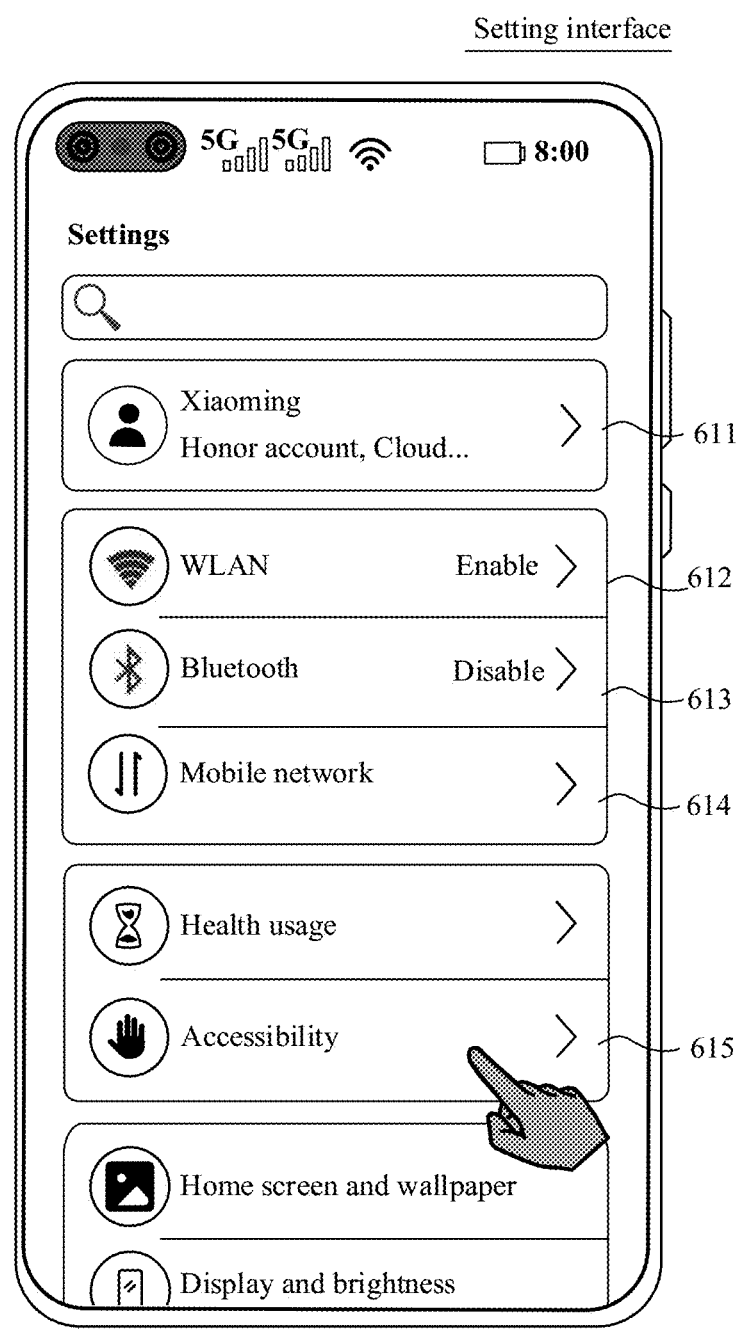
FIG. 6A to FIG. 6E are a group of user interfaces according to an embodiment of this application.
Figure 6B:
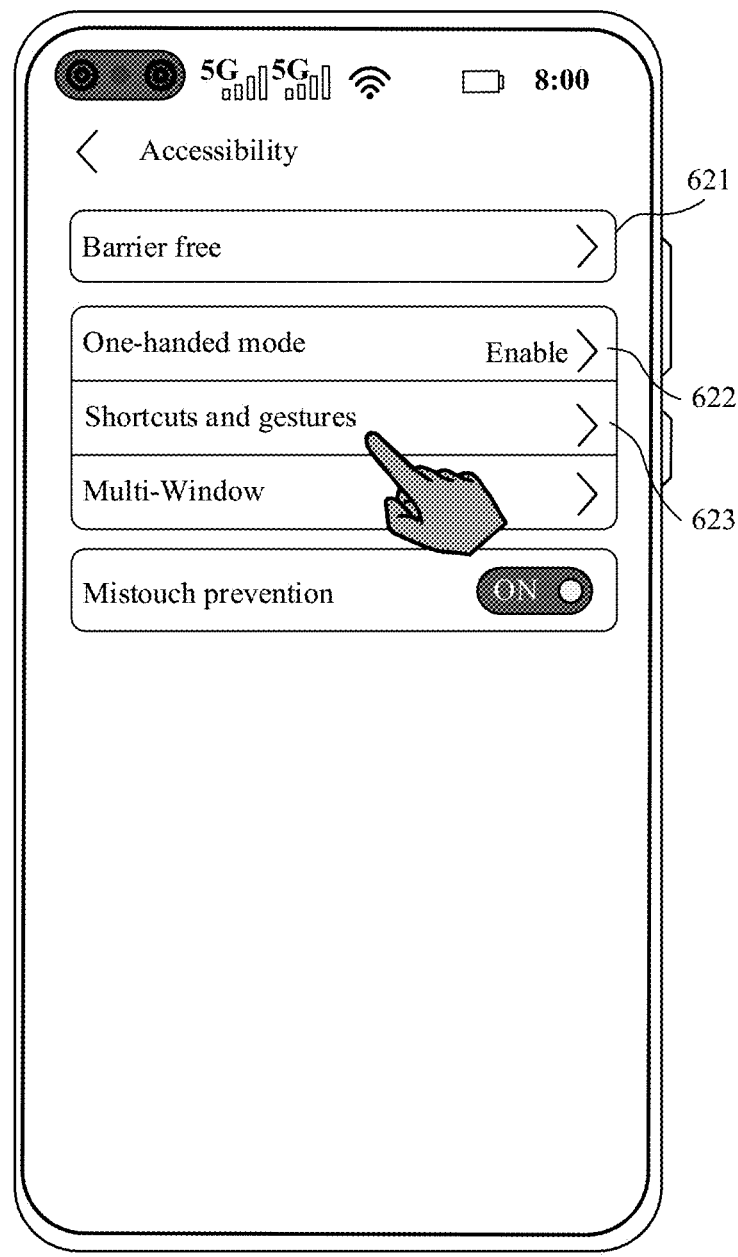
Figure 6C:
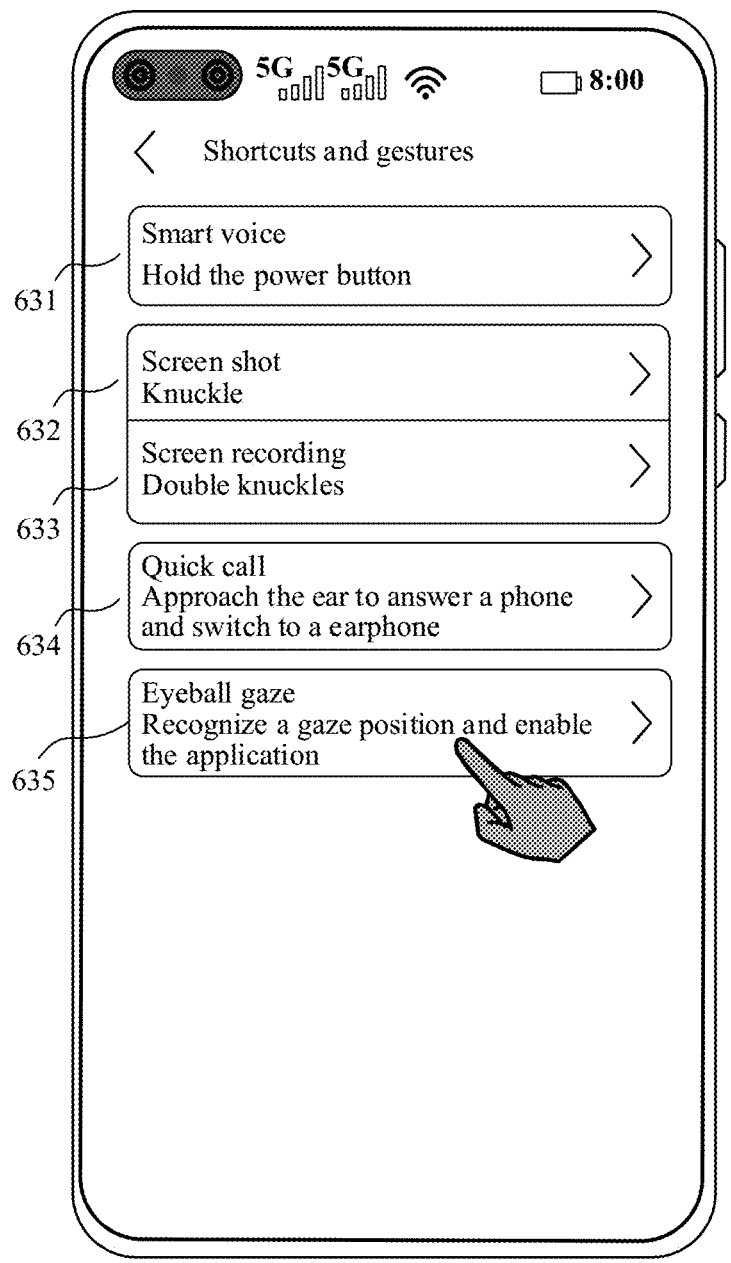

For example, FIG. 6A illustrates a setting interface on a terminal 100. The setting interface may display a plurality of setting options, such as an account setting option 611, a WLAN option 612, a Bluetooth option 613, a mobile network option 614, and the like. In this embodiment of this application, the setting interface further includes an accessibility option 615. The accessibility option 615 may be used to set some shortcut operations.

The terminal 100 may detect a user operation acting on the accessibility option 615. In response to the operation, the terminal 100 may display a user interface denoted as an accessibility setting interface shown in FIG. 6B. The interface may display a plurality of accessibility options such as a barrier free option 621, a single-hand mode option 622 and the like. In this embodiment of this application, the accessibility setting interface further includes a Shortcuts and gestures option 623. The Shortcuts and gestures option 623 may be used to set some gesture actions and eyeball gaze actions that control an interaction.

The terminal 100 may detect a user operation acting on the Shortcuts and gestures option 623. In response to the operation, the terminal 100 may display a user interface denoted as a Shortcuts and gestures setting interface shown in FIG. 6C. The interface may display a plurality of shortcuts and gestures setting options, such as a smart voice option 631, a screen capture option 632, a screen recording option 633, and a quick call option 634. In this embodiment of this application, the Shortcuts and gestures setting interface further includes an eyeball gaze option 635. The eyeball gaze option 635 may be used to set an area of eyeball gaze recognition and a corresponding shortcut operation.

The terminal 100 may detect a user operation acting on the eyeball gaze option 635. In response to the operation, the terminal 100 may display a user interface denoted as an eyeball gaze setting interface shown in FIG. 6D.

Figure 6D:
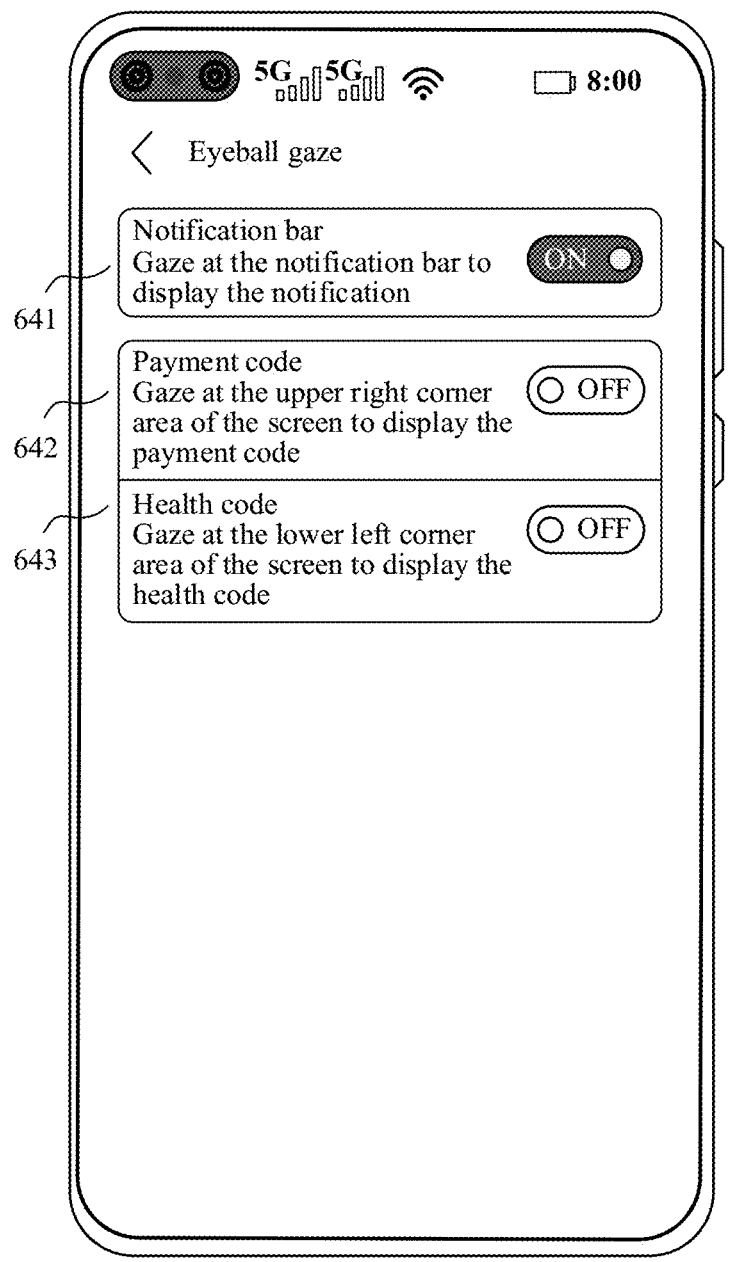

As shown in FIG. 6D, the interface may display a plurality of functional options based on eyeball gaze recognition, such as a notification bar option 641. When a switch in the notification bar option 641 is "ON", it means that the terminal 100 enables notification bar gaze recognition functions shown in FIG. 2A to FIG. 2H, FIG. 3A to FIG. 3D, and FIG. 4A to FIG. 4D. When the switch in the notification bar option 641 is "OFF", it means that the terminal 100 does not enable the notification bar gaze recognition function described above. Therefore, when unlocking is successful and a main interface is displayed, or when each page of a main interface is switched, or when a main interface is returned, the terminal 100 neither collects a user's facial image, nor determines whether the user is gazing at the notification bar.

The eyeball gaze setting interface may further include a payment code option 642 and a health code option 643.

Figure 6E:
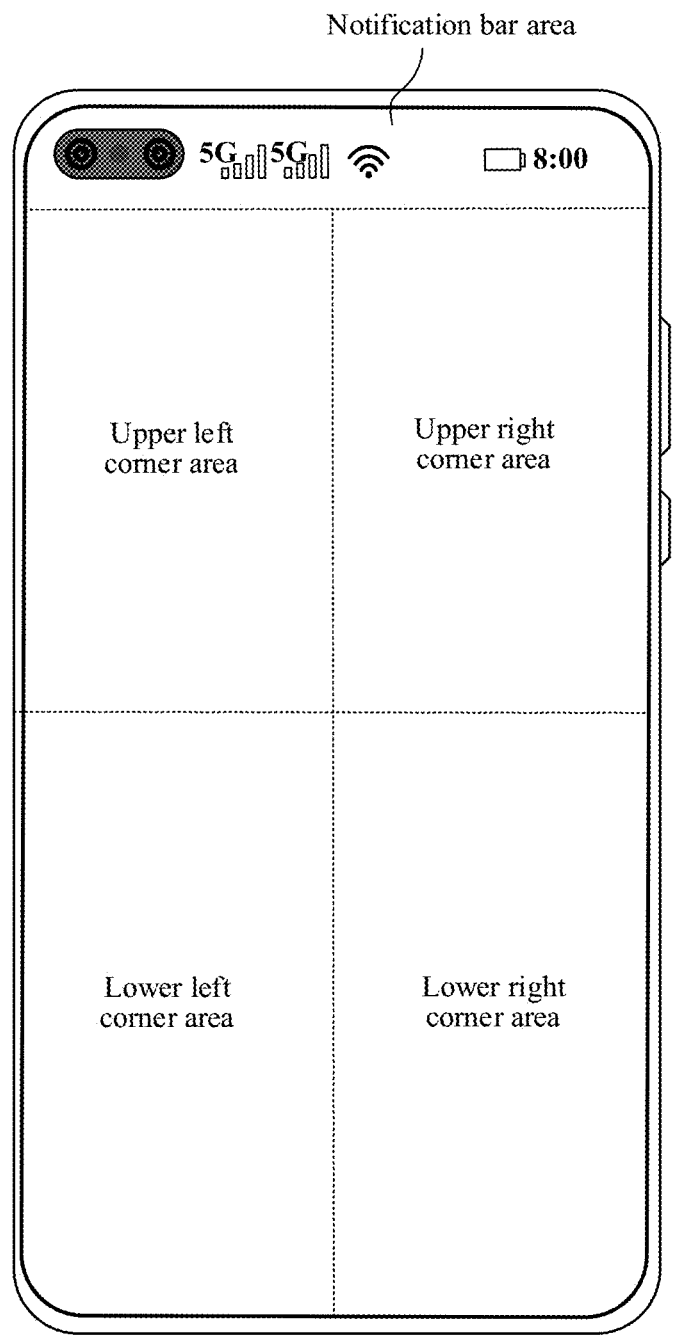

The payment code option 642 may be used to enable or disable an eyeball gaze control function of displaying the payment code. For example, in a scene in which the function is enabled, when the unlocking is successful and the main interface is displayed (or when each page of the main interface is switched, or when the main interface is returned), the terminal 100 may confirm whether the user is gazing at an upper right corner area of a screen by using the collected image frame including the user's facial image. The upper right corner area of the screen can refer to an upper right corner area shown in FIG. 6E. The terminal 100 may display a payment code when an action of the user gazing at the upper right corner area of the screen is detected. In this way, the user can quickly and conveniently obtain the payment code, and complete a payment behavior. This avoids a large quantity of tedious user operations, improves interaction efficiency and enhances user experience.

The health code option 643 may be used to enable or disable an eyeball gaze control function of displaying the health code. For example, in a scene in which the function is enabled, when the unlocking is successful and the main interface is displayed (or when each page of the main interface is switched, or when the main interface is returned), the terminal 100 may confirm whether the user is gazing at a lower left corner area of a screen by using the collected image frame including the user's facial image. Refer to a lower left corner area shown in FIG. 6E. The terminal 100 may display the health code when detecting an action of the user gazing at the lower left corner area of the screen. In this way, the user can quickly and conveniently obtain the health code and complete health examination.

A mapping relationship between the payment code and the upper right corner area, and a mapping relationship between the health code and the lower left corner area are provided by way of example. A developer or the user may alternatively set another mapping relationship. For example, when the user gazes at the upper left corner, display the payment code is displayed. This is not limited in embodiments of this application.

Figure 7:
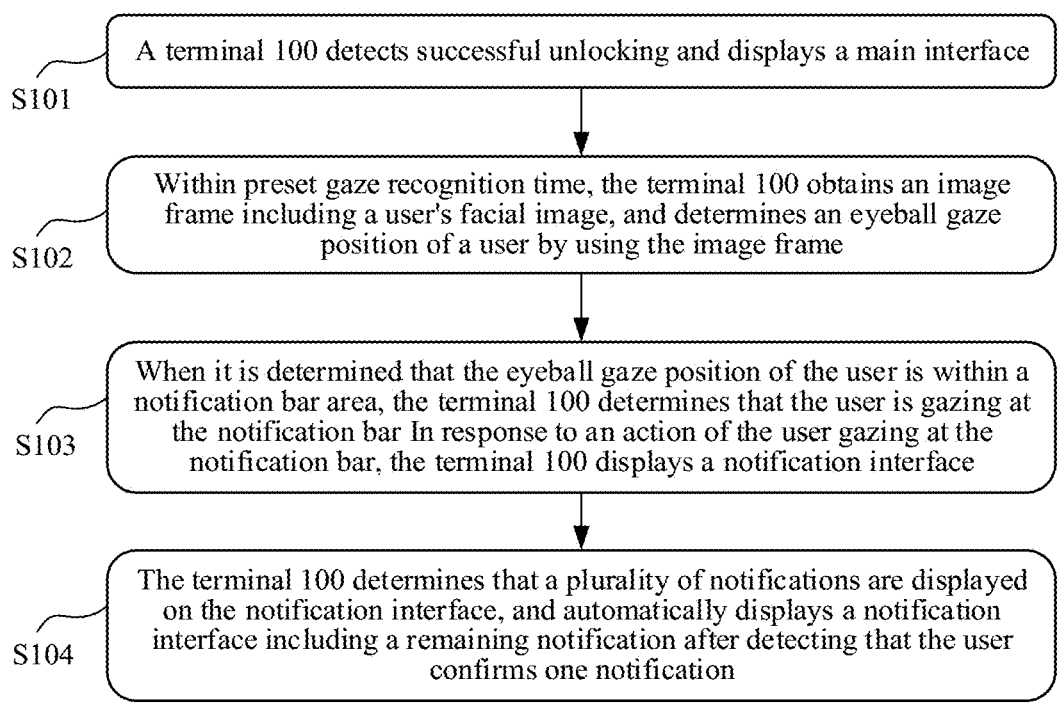
FIG. 7 is a schematic flowchart of a display method according to an embodiment of this application.

For example, FIG. 7 illustrates a schematic flowchart of a display according to an embodiment of this application. A process procedure of implementing the display method by a terminal 100 is described in detail with reference to the user interface shown in FIG. 7 and FIG. 2A to FIG. 2H.

S101: The terminal 100 detects successful unlocking and displays a main interface.

When a user does not use the terminal 100, the terminal 100 may be in a screen-off state or a screen-off AOD (Always on Display) state. When the terminal 100 is in the screen-off state, a display of the terminal 100 is dormant to be a black screen, but other components and programs work normally. The screen-off AOD state refers to a state of controlling a screen to local lighting without lighting up the entire screen of a mobile phone, that is, the state of controlling the screen to local lighting on the basis of the screen-off state.

When a user's action of picking up the mobile phone is detected, the terminal 100 may light up the entire screen displaying a to-be-unlocked interface as shown in FIG. 2A. After lighting the screen, the terminal 100 may enable a camera module 210 to collect and generate an image frame including a user's facial image. Refer to the introduction in FIG. 2A. In an embodiment of this application, the camera module 210 of the terminal 100 includes at least a 2D camera and a 3D camera. When a face unlocking test is performed, a camera used by the terminal 100 may be the 3D camera in the camera module 210.

After generating the image frame, the terminal 100 may input the image frame into a face recognition model. A facial image of the owner can be stored in the face recognition model. After receiving the image frame collected and generated by the camera module 210, the face recognition model can recognize whether a facial image in the image frame matches the facial image of the owner. The face recognition model is existing and is not be repeated here.

When the facial images are matched, the terminal 100 may confirm that the unlocking is successful. At this time, the terminal 100 may display an unlock success interface shown in FIG. 2B to prompt the user that unlocking is successful. Then, the terminal 100 may display a main interface shown in FIG. 2C.

Refer to the introduction in FIG. 2F. The main interface may include a plurality of pages. Herein, the terminal 100 displays the main interface, including displaying any page on the main interface, for example, displaying a first desktop, displaying a second desktop, or displaying a leftmost home screen. In some embodiments, the terminal 100 may fixedly display the first desktop. In some other embodiments, the terminal 100 may continue to display the leftmost home screen, the first desktop or the second desktop depending on a page that stays at the last exit. Therefore, after displaying the unlock success interface shown in FIG. 2B, the terminal 100 may alternatively display a main interface shown in FIG. 2G or FIG. 2H.

Certainly, after confirming the successful unlocking, the terminal 100 may alternatively directly display the main interface shown in FIG. 2C, FIG. 2G or FIG. 2H without displaying FIG. 2B. FIG. 2B is not necessary.

S102: Within preset gaze recognition time, the terminal 100 obtains the image frame including the user's facial image, and determines an eyeball gaze position of the user by using the image frame.

In order to avoid excessive power consumption and privacy security issues, the camera module 210 is not always in a working state. Therefore, the terminal 100 may set the gaze recognition time. During this time, the terminal 100 may collect and generate the image frame including the user's facial image through the camera module 210 during the gaze recognition time for recognizing the eyeball gaze position of the user.

The first period of time of displaying the main interface, usually the first few seconds, may be set as the gaze recognition time. For example, the first 3 seconds of displaying the main interface illustrated in FIG. 2C. The above time is summed up based on a behavior habit of the user controlling the display of the notification interface, and is preferred time to meet a requirement of the user wanting to view the notification interface.

Therefore, after confirming that the unlocking is successful, the terminal 100 also enables the camera module 210 to collect and generate the image frame including the user's facial image within the first period of time (the gaze recognition time) when the terminal 100 may display the main interface. An image frame collected and generated in this time period can be referred to as a target input image. The target input image may be used by the terminal 100 to determine whether the user is gazing at a notification bar area and further determine whether to display the notification interface.

In a scenario in which face unlocking is used, the 3D camera of the terminal 100 is turned on, so that the terminal 100 only needs to turn on the 2D camera of the camera module 210 in S102. In a scenario in which password unlocking and fingerprint unlocking are used, the camera of the terminal 100 is turned off. At this time, the terminal 100 needs to turn on the 2D camera and the 3D camera in the camera module 210.

Specifically, after obtaining the target input image, the terminal 100 may input the above image into the eyeball gaze recognition model. The eyeball gaze recognition model is a preset model in the terminal 100. The eyeball gaze recognition model may recognize the eyeball gaze position of the user in the input image frame, and further, the terminal 100 may determine whether the user is gazing at the notification bar based on the eyeball gaze position. A structure of the eyeball gaze recognition model used in this application is described in detail in FIG. 8 below and is not expanded here.

Optionally, the eyeball gaze recognition model may alternatively output an eyeball gaze area of the user. An eyeball gaze area can be contracted into an eyeball gaze position, and an eyeball gaze position may alternatively be expanded into an eyeball gaze area. In some examples, a cursor point formed by a display unit on the screen may be referred to as an eyeball gaze position. Correspondingly, cursor points or a cursor area formed by a plurality of display units on the screen may be referred to as an eyeball gaze area.

After outputting an eyeball gaze area, the terminal 100 may determine whether the user is gazing at the notification bar by determining a position of the eyeball gaze area in the screen, and further determine whether to display the notification interface.

S103: When it is determined that the eyeball gaze position of the user is within the notification bar area, the terminal 100 determines that the user is gazing at the notification bar.

In response to an action of the user gazing at the notification bar, the terminal 100 displays the notification interface.

When the eyeball gaze recognition model recognizes that the eyeball gaze position in the input image frame is within the notification bar area, the terminal 100 may determine to display the notification interface. Refer to the user interfaces shown in FIG. 2D to FIG. 2E, the terminal 100 may determine that the eyeball gaze position of the user is within the notification bar area 221. Therefore, the terminal 100 may display the notification interface.

If all the eyeball gaze positions in the image frame collected and generated during the gaze recognition time are not within the notification bar area, the terminal 100 does not display the notification interface. Certainly, preset eyeball gaze recognition time is not limited to the first period of time of displaying the main interface for the first time after successful unlocking. The terminal 100 is also provided with other eyeball gaze recognition time, for example, the first period of time of updating the main interface after detecting a user's page switching operation, and the first period of time of returning to the main interface after exiting an application. At this time, the terminal 100 may alternatively recognize whether the user is gazing at the notification bar, and further determine whether to display the notification interface, which is described in detail later, and is not expanded here first.

Within the preset gaze recognition time (3 seconds), the terminal 100 collects and generates the image frame including the user's facial image and recognizes the eyeball gaze position simultaneously. Therefore, before the gaze recognition time ends, if the terminal 100 recognizes the user gazing at the notification bar area, the terminal 100 may display the notification bar while the camera module 210 may stop collection and generation of image frames. After the gaze recognition time ends, if the terminal 100 still does not recognize the user gazing at the notification bar area, the terminal 100 also stops collection and generation of image frames, to reduce power consumption.

S104: The terminal 100 determines that a plurality of notifications are displayed on the notification interface, and automatically displays a notification interface including a remaining notification after detecting that the user confirms one notification. S104 is optional.

After displaying the notification interface, the terminal 100 may determine a quantity of notifications displayed on the notification interface. If there are a plurality of (two or more) notifications displayed on the notification interface, the terminal 100 may automatically display detailed content of the remaining notification after detecting that the user confirms one notification.

Refer to the introduction of FIG. 5A to FIG. 5D. After the user clicks the notification 121, the terminal 100 may display an information interface shown in FIG. 5B. After the information interface, the terminal 100 may monitor a user operation, and further determine whether the user finishes processing the notification.

Optionally, the terminal 100 may determine whether the user finishes processing a notification by using a preset user operation. The preset user operation is, for example, an operation of sliding up and returning to the main interface.

Optionally, the terminal 100 may alternatively monitor whether a user operation acting on the information interface is detected within first waiting duration. If the user operation is not detected within the first waiting duration, the terminal 100 may determine that the user finishes processing the notification. Refer to FIG. 5B. When the information sent by Lisa shown in FIG. 5B is displayed for a period of time and a user editing recovery operation is not detected, the terminal 100 may confirm that the user has processed the information notification. For another example, when it is detected that the user browses an interface corresponding to a notification, slides to a specific position of the interface, and stays for more than a period of time, the terminal 100 can confirm that the user has processed the notification. For another example, when it is detected that the user browses a video corresponding to a notification and plays the video repeatedly for a plurality of times, the terminal 100 may confirm that the user has processed the notification and the like.

After confirming whether or not the user has processed a notification, the terminal 100 can automatically display the notification interface. In this way, the user can get the notification interface without performing a pull-down operation, and then view a remaining unprocessed notification. The user can then continue to process the unprocessed notification. This not only realizes reminding the user to process the remaining unprocessed notification, but also provides convenience for the user to process the notification and saves the user operation.

Further, the terminal 100 may alternatively determine whether the details of the notification are automatically displayed based on a type of the notification. Notifications can be divided into a transactional notification and a recommended notification. The transactional notification includes, for example, an air ticket order notification, travel reminder notification, and the like sent after the user purchases an air ticket. The transactional notification needs to be confirmed by the user. The recommended notification includes, for example, a notification promoting an air ticket. The recommended notification can be ignored by the user. If the remaining notification is the recommended notification, the terminal 100 may not automatically display the detailed content of the notification, and this avoids disturbing the user and reducing the user experience.

In S103, after the gaze recognition time ends, if the terminal 100 still does not recognize the user gazing at the notification bar area, the terminal 100 also stops collecting and generating image frames. At this time, the user may switch the main interface currently displayed or open an application.

When the user is not sure which operation to be performed first after turning on a mobile phone, the user often slides left and right to switch the main interface, browse at will, and finally choose to view the notification to confirm whether there are an important unprocessed notification. Therefore, after detecting the switching of the currently displayed main interface, the terminal 100 may alternatively enable the camera module 210 to collect and generate an image frame before the first period of time displaying the switched main interface, determine whether the user gazing at the notification bar, and further determine whether the notification interface is displayed.

In view of the above scenarios, after detecting the user operation of switching the currently displayed main interface, the terminal 100 may alternatively set eyeball gaze recognition time and recognize whether or not the user is gazing at the notification bar within the eyeball gaze recognition time. After detecting the action of the user gazing at the notification bar, the terminal 100 also displays the notification interface.

With reference to the user interfaces shown in FIG. 3A to FIG. 3D, the terminal 100 may not recognize the user's action of gazing at the notification bar within the first 3 seconds of initially displaying a first desktop of the main interface. At this time, the terminal 100 does not display the notification interface. At the same time, after 3 seconds, the terminal 100 turns off the camera module 210 to reduce power consumption.

Thereafter, the terminal 100 may detect a left sliding operation (operation of switching the main interface). In response to the operation, the terminal 100 may display a second desktop of the main interface. At this time, the first 3 seconds of displaying the second desktop can also be set as the gaze recognition time. Therefore, the terminal 100 can enable the camera module 210 to collect and generate an image frame within the first 3 seconds of displaying the second desktop, determine whether the user is gazing at the notification bar, and further determine whether to display the notification interface.

Optionally, gaze recognition time of different pages of the main interface can also be different, for example, the first 2 seconds of the second desktop can be set as gaze recognition time of the second desktop.

In this way, the terminal 100 may detect the eyeball gaze position of the user a plurality of times when the user performs page switching, to provide the user with an opportunity of controlling to display through eyeball gaze for a plurality of times. At the same time, the terminal 100 also avoids keeping the camera in a working state all the time and avoids a problem of excessive power consumption.

After exiting an application, the user also tends to check the notification again to confirm whether there is an important unprocessed notification. In view of the above scenarios, after detecting the user operation of returning to the main interface, the terminal 100 may alternatively set eyeball gaze recognition time and recognize whether or not the user is gazing at the notification bar within the eyeball gaze recognition time. After detecting the action of the user gazing at the notification bar, the terminal 100 also displays the notification interface.

Refer to the user interfaces shown in FIG. 4A to FIG. 4D, in a scenario of running a gallery application, the terminal 100 may detect a slide-up operation, that is, an operation of exiting the gallery and returning to the main interface. In response to the operation, the terminal 100 may display the main interface. At this time, the first 3 seconds of displaying the main interface can also be set as the gaze recognition time. During this time, the camera module 210 of the terminal 100 may collect and generate an image frame. When detecting the action of the user gazing at the notification bar, the terminal 100 may alternatively display the notification interface.

By implementing the method, the scene in which the user controls to display the notification interface through eyeball gaze is not limited to fixed time after unlocking. The user can control to display the notification interface through eyeball gaze in more scenes, such as switching the main interface and returning to the main interface. At the same time, by implementing the method, the terminal 100 enables the camera only after recognizing a preset trigger scene, and recognizes the eyeball gaze position of the user, and this avoids problems of resource waste and large power consumption caused by the camera being in the working state for a long time.

Figure 8:
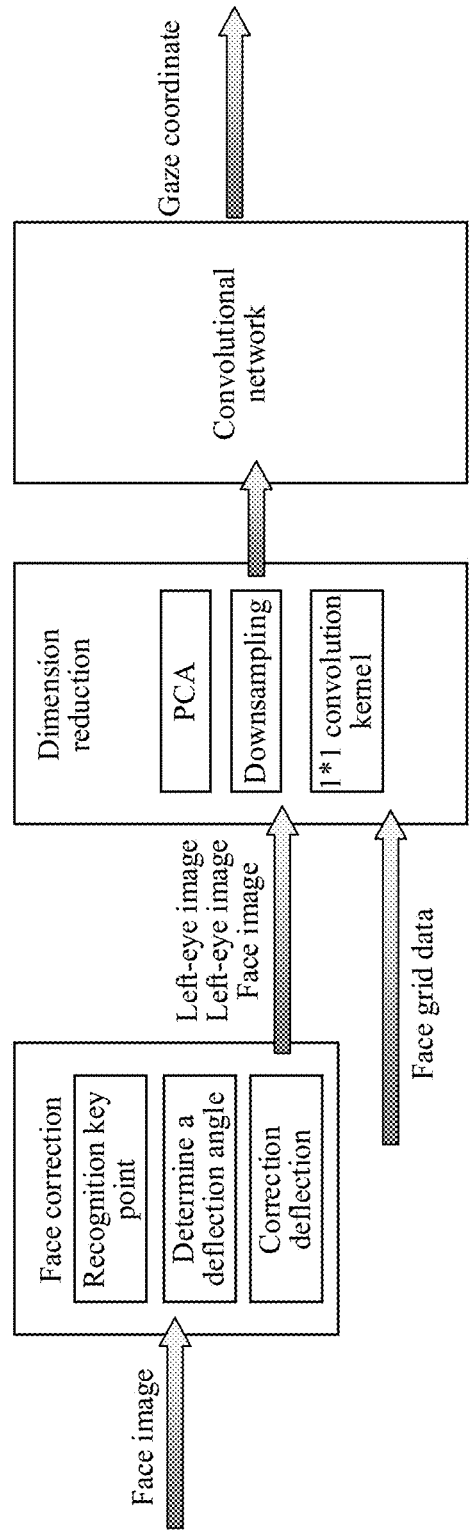
FIG. 8 is a schematic diagram of a structure of an eyeball gaze recognition model according to an embodiment of this application.

For example, FIG. 8 illustrates a structure of an eyeball gaze recognition model. The eyeball gaze recognition model used in the embodiment of this application is described in detail with reference to FIG. 8. In this embodiment of this application, the eyeball gaze recognition model is established based on a convolutional neural network (Convolutional Neural Network, CNN).

As shown in FIG. 8, the eyeball gaze recognition model may include: a face correction module, a dimension reduction module and a convolution network module.

(1) Face Correction Module

An image including a user's face collected by a camera module 210 may be first input into the face correction module. The face correction module can be used to recognize whether the facial image in an input image frame is upright. The face correction module can correct the image frame in which the facial image is not upright (e.g., the head tilts), to correct the image frame so that the facial image becomes upright, and further to avoid subsequent influence on an eyeball gaze recognition effect.

Figure 9A:
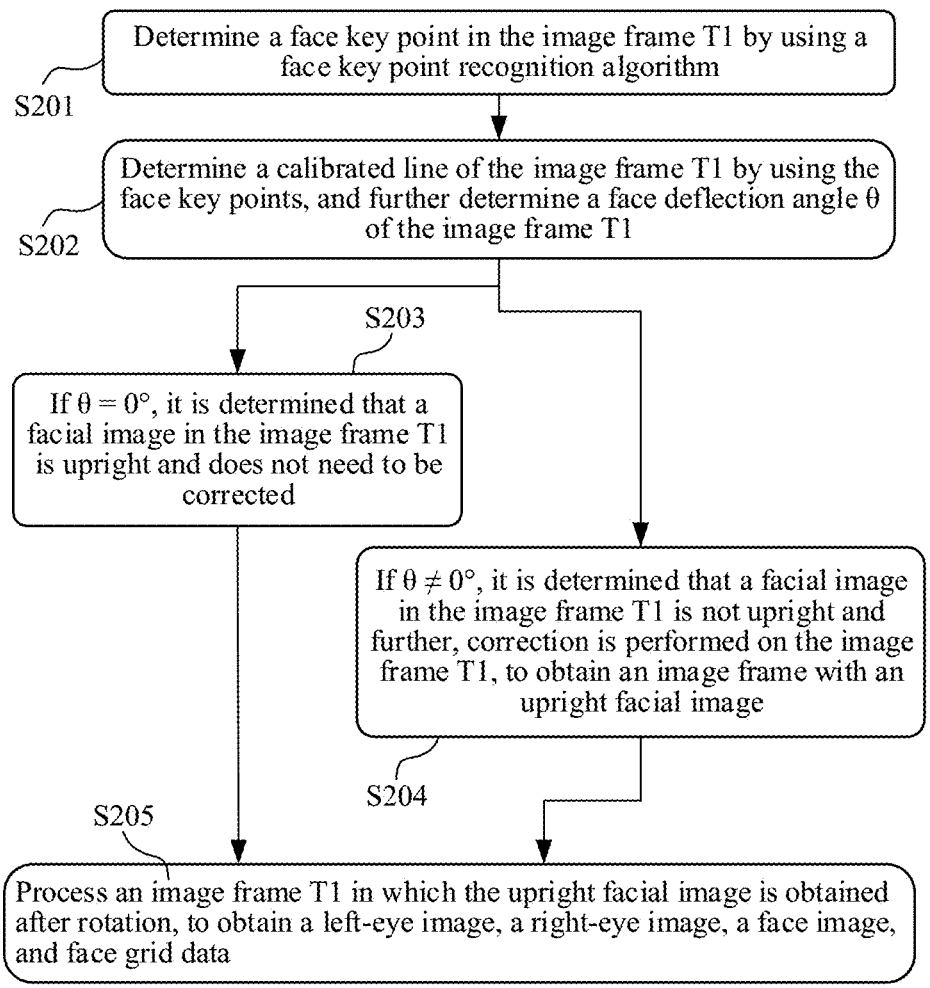
FIG. 9A is a schematic flowchart of face correction according to an embodiment of this application.

For example, FIG. 9A illustrates a correction process flow of an image frame including a user's facial image generated by a camera module 210 by a face correction module.

S201: Determine face key points in an image frame T1 by using a face key point recognition algorithm.

In this embodiment of this application, the face key points include a left eye, a right eye, a nose, a left labial angle and a right labial angle. The face key point recognition algorithm is an existing algorithm such as a Kinect-based face key point recognition algorithm. Details are not be repeated here.

Figure 9B:
FIG. 9B to FIG. 9D are a group of schematic diagrams of face correction according to an embodiment of this application.

Refer to FIG. 9B. For example, FIG. 9B shows an image frame including a user's facial image denoted as an image frame T1. The face correction module can determine, by using the face key point recognition algorithm, face key points in the image frame T1: a left eye a, a right eye b, a nose c, a left labial angle d, a right labial angle e, and determine coordinate positions of each key point. Refer to an image frame T1 in FIG. 9C.

S202: Determine a calibrated line of the image frame T1 by using the face key points, and further determine a face deflection angle $\theta$ of the image frame T1.

In the upright facial image, the left eye and the right eye are at a same horizontal line, so that a straight line connected by a key point of the left eye and a key point of the right eye (the calibrated line) is parallel to the horizontal line, that is, the face deflection angle (an angle formed by the calibrated line and the horizontal line) $\theta$ is 0.

Figure 9C:
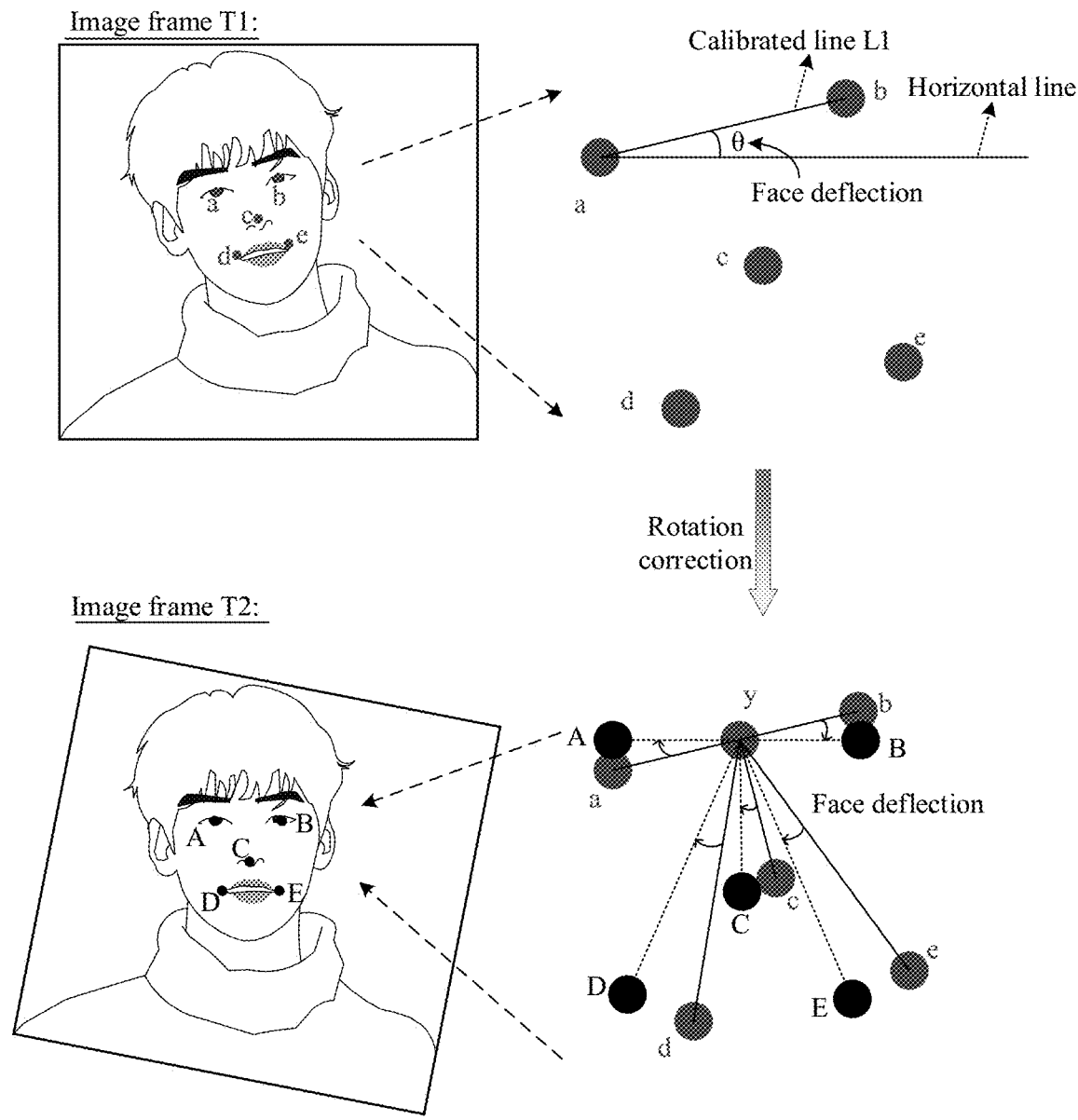

As shown in FIG. 9C, the face correction module may determine a calibrated line L1 by using recognized coordinate positions of the left eye a and the right eye b. Therefore, based on L1 and the horizontal line, the face correction module may determine the face deflection angle $\theta$ of the facial image in the image frame T1.

S203: If $\theta=0°$, it is determined that the facial image in the image frame T1 is upright and does not need to be corrected.

S204: If $\theta \neq 0°$, it is determined that the facial image in the image frame T1 is not upright, and further the image frame T1 is corrected to obtain an image frame with an upright facial image.

In FIG. 9C, $\theta \neq 0$, that is, the facial image in the image frame T1 is not upright. At this time, the face correction module can correct the image frame T1.

Specifically, the face correction module can first determine a rotation center point y by using the coordinate positions of the left eye a and the right eye b, and then rotate the image frame T1 $\theta°$ with y as a rotation center to obtain the image frame T1 with the upright facial image, which is denoted as an image frame T2. As shown in FIG. 9C, a point A may indicate a position of the left eye a after rotation, a point B may indicate a position of the right eye b after rotation, a point C may indicate a position of the nose c after rotation, a point D may indicate a position of the left labial angle d after rotation, and a point E may indicate a position of the right labial angle e after rotation.

It may be understood that each pixel point in the image is rotated when the image frame T1 is rotated. The above A, B, C, D, and E are only illustrative examples of a rotation process of key points in the image, and not only the rotation of the face key points.

S205: Process an image frame T1 in which the upright facial image obtained after rotation, to obtain a left-eye image, a right-eye image, a face image, and face grid data. The face grid data can be used to reflect a position of the face image in the whole image.

Specifically, the face correction module can clip the corrected image according to a preset size with the face key points as a center, to obtain the left-eye image, the right-eye image and the face image corresponding to the image. When determining the face image, the face correction module may determine the face grid data.

Figure 9D:
Figure 9D:
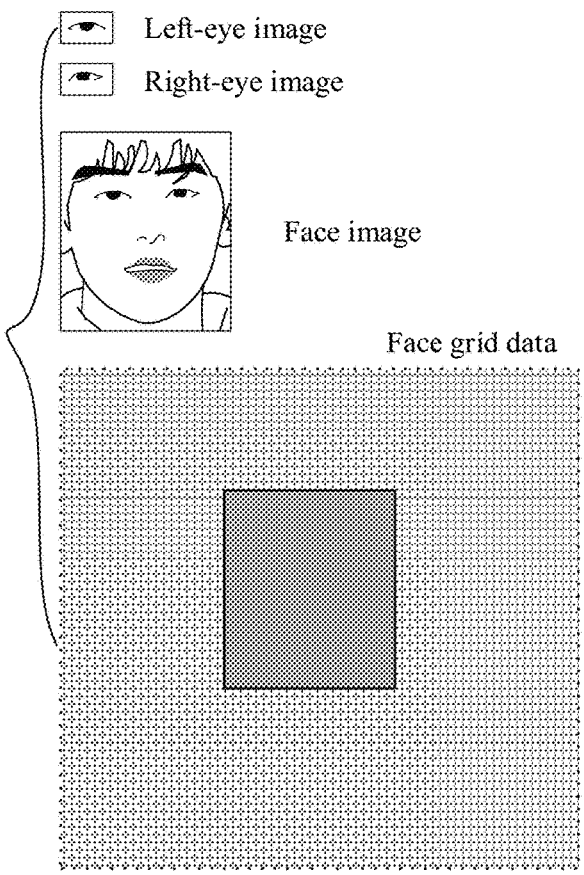

Refer to FIG. 9D. The face correction module may determine a rectangle with a fixed size with a left eye A as the center. An image covered by this rectangle is the left-eye image. According to the same method, the face correction module can determine the right-eye image with the right eye B as the center and the face image with the nose C as the center. A size of the left-eye image is the same as that of the right-eye image, and a size of the face image is different from that of the left-eye image. After determining the face image, the face correction module can obtain the face grid data accordingly, that is, the position of the face image in the whole image.

After face correction is completed, the terminal 100 can obtain the corrected image frame T1, and obtain the corresponding left-eye image, right-eye image, face image and face grid data based on the image frame T1.

(2) Dimension Reduction Module

The face correction module can input the left-eye image, right-eye image, face image and face grid data output by the face correction module into the dimension reduction module. The dimension reduction module can be used to reduce the dimension of the input left-eye image, right-eye image, face image and face grid data, to reduce computational complexity of the convolution network module and improve the speed of eyeball gaze recognition. Dimension reduction methods used in the dimension reduction module include but are not limited to principal components analysis (principal components analysis, PCA), downsampling, 1*1 convolution kernel and the like.

(3) Convolution Network Module

Each image after dimension reduction can be input into the convolution network module. The convolution network module can output an eyeball gaze position based on the input image. In this embodiment of this application, a structure of a convolution network in the convolution network module may refer to FIG. 10.

Figure 10:
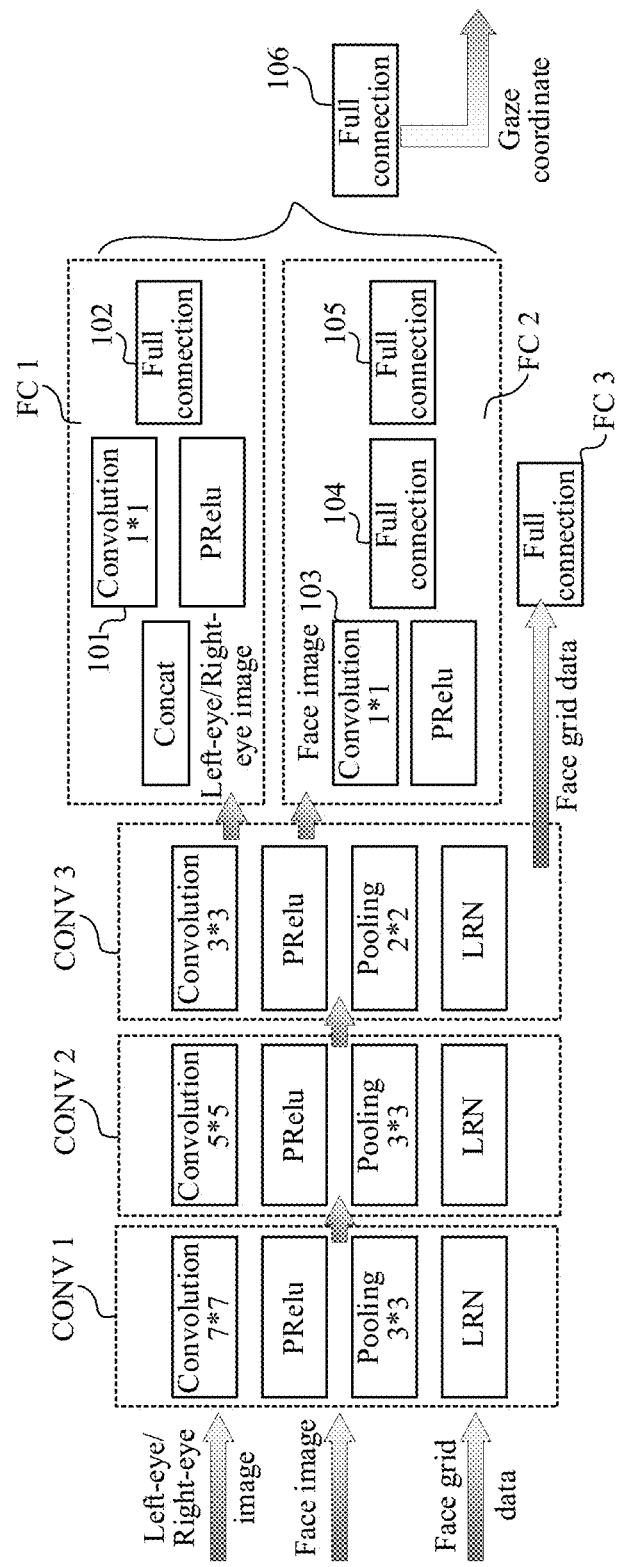
FIG. 10 is a schematic diagram of a structure of a convolutional network of an eyeball gaze recognition model according to an embodiment of this application.

As shown in FIG. 10, the convolution network may include a convolution group 1 (CONV1), a convolution group 2 (CONV2), and a convolution group 3 (CONV3). A convolution group includes: a convolution (Convolution) kernel, an activation function PRelu, a pooling (Pooling) kernel and a local response normalization (Local Response Normalization, LRN) layer. A convolution kernel of CONV 1 is a 7*7 matrix and a pooling kernel is a 3*3 matrix. A convolution kernel of CONV 2 is a 5*5 matrix, and a pooling kernel is a 3*3 matrix. A convolution kernel of CONV 3 is a 3*3 matrix, and a pooling kernel is a 2*2 matrix.

A separable convolution technology can reduce storage requirements of the convolution (Convolution) kernel and pooling (Pooling) kernel, and further reduce a demand for storage space of the whole model, so that the model can be deployed on a terminal device.

Specifically, the separable convolution technology is to decompose an n*n matrix into an n*1 column matrix and a 1*n row matrix for storage, to reduce a demand for storage space. Therefore, the eyeball gaze module shown in this application has advantages of small volume and easy deployment, to be suitable for being deployed on electronic devices such as a terminal.

Figure 11:
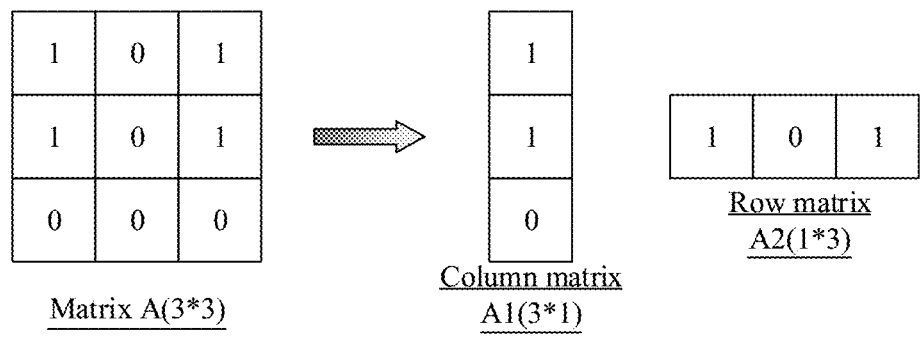
FIG. 11 is a schematic diagram of a separable convolutional technology according to an embodiment of this application.

Specifically, refer to FIG. 11. A matrix A may represent a 3*3 convolution kernel. Assuming that the matrix A is stored directly, the matrix A needs to occupy 9 storage units. The matrix A can be split into a column matrix A1 and a row matrix A2 (column matrix A1×row matrix A2=matrix A). The column matrix A1 and the row matrix A2 need only 6 storage units.

After being processed by CONV 1, CONV 2 and CONV 3, different images can be input into different connection layers for full connection. As shown in FIG. 10, the convolution network may include a connection layer 1 (FC 1), a connection layer 2 (FC 2), and a connection layer 3 (FC 3).

The left-eye image and the right-eye image can be input into the FC 1 after passing through CONV 1, CONV 2, CONV 3. The FC 1 may include a concatenation module (concat), a convolution kernel 101, PRelu, and a full connection module 102. The concat can be configured to concatenate the left-eye image and the right-eye image. The face image can be input into the FC 2 after passing through CONV 1, CONV 2 and CONV 3. The FC 2 may include a convolution kernel 103, PRelu, a full connection module 104, and a full connection module 105. The FC 2 can perform full connection on the face image twice. Face grid data can be input into the FC 3 after passing through CONV 1, CONV 2 and CONV 3. The FC 3 includes a full connection module.

Connection layers with different structures are constructed for different types of images (such as a left eye image, a right eye image and a face image). This can better obtain features of various images, and further improve accuracy of a model, and enable the terminal 100 to more accurately recognize an eyeball gaze position of the user.

Then, a full connection module 106 can fully connect the left-eye image, the right-eye image, the face image and the face grid data again, and finally output the eyeball gaze position. The eyeball gaze position indicates a specific position of the focus of the user's eyes on a screen, that is, the user's gaze position. Refer to a cursor point S shown in FIG. 1C. Further, when the eyeball gaze position is within a notification bar area, the terminal 100 may determine that the user is gazing at a notification bar.

In addition, parameters of the convolution neural network set by the eyeball gaze model used in this application are small. Therefore, time required to calculate and predict the user's eyeball gaze position by using the eyeball gaze model is small, that is, the terminal 100 can quickly determine whether the user is gazing at a specific area such as the notification bar.

In this embodiment of this application, a first preset area may be a notification bar 221 in the interface shown in FIG. 2C.

A first interface may be a to-be-unlocked interface shown in FIG. 2A or an interface to exit an application and display the application as shown in FIG. 5B.

A second interface may be any one of main interfaces such as a first desktop, a second desktop and a leftmost home screen shown in FIG. 2F.

A third interface may be a third interface shown in FIG. 2E.

Figure 12:
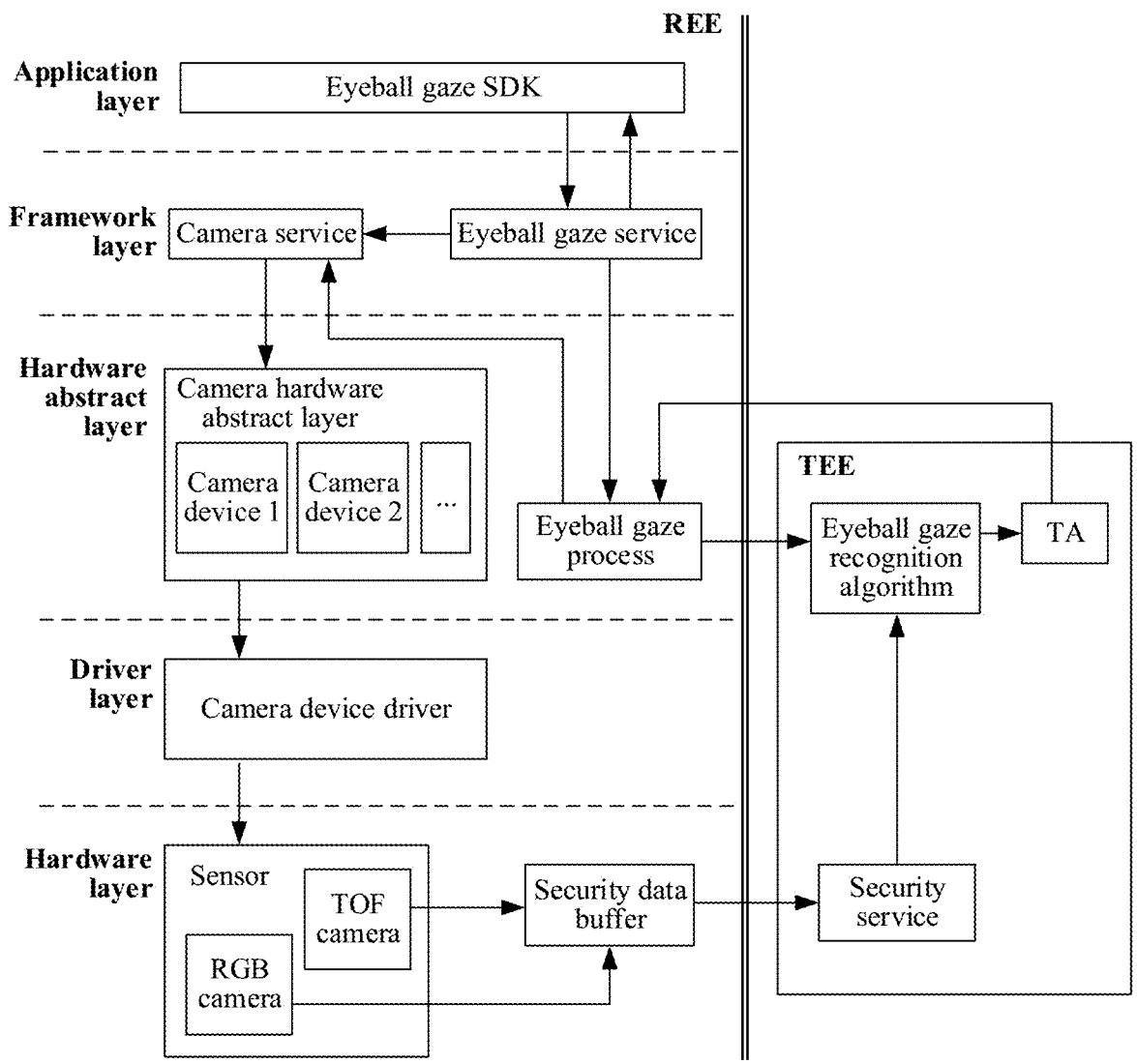
FIG. 12 is a schematic diagram of a system structure of a terminal 100 according to an embodiment of this application.

FIG. 12 is a schematic diagram of a system structure of a terminal 100 according to an embodiment of this application.

In a layered architecture, a system is divided into several layers, and each layer has a clear role and task. The layers communicate with each other through a software interface. In some embodiments, the system is divided into five layers that are respectively an application layer, an application framework layer, a hardware abstraction layer, a kernel layer, and a hardware layer from top to bottom.

The application layer may include a plurality of applications, such as a dial-up application, and a gallery application. In this embodiment of this application, the application layer further includes an eyeball gaze SDK (software development kit, software development kit). The system of the terminal 100 and a third application installed on the terminal 100 can recognize a user's eyeball gaze position by invoking the eyeball gaze SDK.

The framework layer provides an application programming interface (application programming interface, API) and a programming framework for the applications at the application layer. The framework layer includes some pre-defined functions. In this embodiment of this application, the frame layer may include a camera service interface and an eyeball gaze service interface. The camera service interface is used to provide an application programming interface and a programming framework using a camera. The eyeball gaze service interface provides an application programming interface and a programming framework using an eyeball gaze recognition model.

The hardware abstraction layer is an interface layer between the framework layer and a driver layer, which provides a virtual hardware platform for an operating system. In this embodiment of this application, the hardware abstraction layer may include a camera hardware abstraction layer and an eyeball gaze process. The camera hardware abstraction layer can provide virtual hardware for a camera device 1 (an RGB camera), a camera device 2 (a TOF camera), or more camera devices. The calculation process of recognizing the user's eyeball gaze position by using the eyeball gaze recognition module is performed during the eyeball gaze process.

The driver layer is a layer between hardware and software. The driver layer includes drivers of various hardware. The driver layer may include a camera device driver. The camera device driver is used to drive a sensor of a camera to collect an image and drives an image signal processor to preprocess the image.

The hardware layer includes a sensor and a security data buffer. The sensor includes an RGB camera (namely, a 2D camera) and a TOF camera (namely, a 3D camera). The RGB camera may collect and generate a 2D image. The TOF camera is a depth camera and can collect and generate a 3D image with depth information. Data collected by the camera is stored in the security data buffer. When any upper process or reference obtains the image data collected by the camera, it needs to be obtained from the security data buffer, but cannot be obtained through another manner, so that the security data buffer can also avoid the abuse of the image data collected by the camera.

The software layers described above and the modules or interfaces included in each layer run in a runnable executive environment (Runnable executive environment, REE). The terminal 100 further includes a trust executive environment (Trust executive environment, TEE). Data communication in the TEE is more secure than that in the REE.

The TEE may include an eyeball gaze recognition algorithm module, a trust application (Trust Application, TA) module and a security service module. The eyeball gaze recognition algorithm module stores executable code of the eyeball gaze recognition model. TA can be used to securely send a recognition results output by the above model to the eyeball gaze process. The security service module is used to securely input image data stored in the security data buffer to the eyeball gaze recognition algorithm module.

The following is a detailed description of the interaction method based on eyeball gaze recognition in this embodiment of this application in combination with the hardware structure and system structure.

The terminal 100 determines to perform an eyeball gaze recognition operation. After recognizing unlocking successfully or after switching a page after unlocking or after returning to a main interface, the terminal 100 may determine that the eyeball gaze recognition operation is performed within eyeball gaze recognition time.

The terminal 100 invokes an eyeball gaze service through the eyeball gaze SDK.

On the one hand, the eyeball gaze service can invoke a camera service of the framework layer, and collect and obtain an image frame including a user's facial image through the camera service. The camera service can send instructions to start the RGB camera and the TOF camera by invoking the camera device 1 (RGB camera) and the camera device 2 (TOF camera) in the camera hardware abstraction layer. The camera hardware abstraction layer sends the instruction to the camera device driver of the driver layer. The camera device driver can start the camera based on the instruction. The instruction sent by the camera device 1 to the camera device driver can be used to start the RGB camera. The instruction sent by the camera device 2 to the camera device driver can be used to start the TOF camera. After the RGB camera and the TOF camera are started, an optical signal is collected, and a 2D or 3D image of an electrical signal is generated by using an image signal processor. On the other hand, the eyeball gaze service can create an eyeball gaze process and initialize an eyeball recognition model.

The image generated by the image signal processor may be stored in the secure data buffer. After the creation and initialization of the eyeball gaze process, the image data stored in the security data buffer can be transmitted to the eyeball gaze recognition algorithm through a secure transmission channel (TEE) provided by the security service. After receiving the image data, the eyeball gaze recognition algorithm can input the image data into the eyeball gaze recognition model based on CNN, to determine the eyeball gaze position of the user. Then, TA securely transmits the eyeball gaze position back to the eyeball gaze process, and then returns to the eyeball gaze SDK at the application layer through the camera service and the eyeball gaze service.

Finally, the eyeball gaze SDK can determine whether the user is gazing at the notification bar based on the received eyeball gaze position, and then determine whether to display the notification interface.

Figure 13:
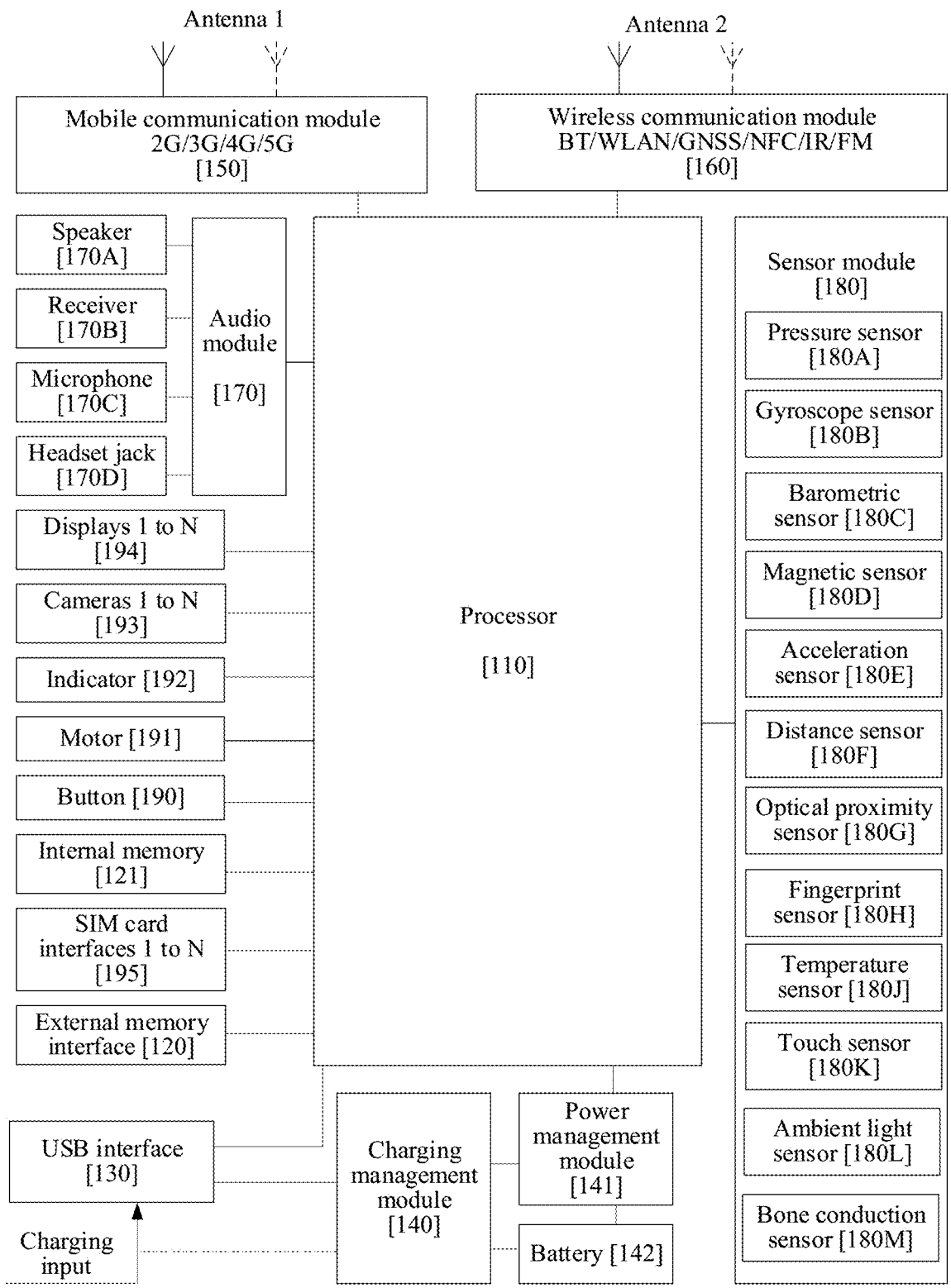
FIG. 13 is a schematic diagram of a hardware structure of a terminal 100 according to an embodiment of this application.

FIG. 13 is a schematic diagram of a hardware structure of a terminal 100.

The terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of the present invention does not constitute a specific limitation to the terminal 100. In some other embodiments of this application, the terminal 100 may include more or fewer components than those shown in the figure, or combine some components, or split some components, or have different component arrangements. The components in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be separate devices, or may be integrated into one or more processors.

The controller may generate an operation control signal based on instruction operation code and a time-sequence signal, and control obtaining and executing of instructions.

A memory may also be disposed in the processor 110, configured to store instructions and data. In some embodiments, the memory in processor 110 is a cache memory. The memory may store instructions or data recently used or cyclically used by the processor 110. If the processor 110 needs to use the instruction or the data again, the processor 110 may directly call the instruction or the data from the memory. Repeated access is avoided, and waiting time of the processor 110 is reduced, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules in this embodiment of the present invention is merely an example for description, and does not constitute a limitation on the structure of the terminal 100. In some other embodiments of this application, the terminal 100 may alternatively use an interface connection manner different from that in the foregoing embodiment, or use a combination of a plurality of interface connection manners.

The charging management module 140 is configured to receive charging input from the charger. The power management module 141 is configured to be connected to the battery 142, the charging management module 140, and the processor 110.

A wireless communication function of the terminal 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. The mobile communication module 150 can provide a solution for wireless communication including 2G/3G/4G/5G and the like to be applied to the terminal 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and send the electromagnetic wave to the modem processor for demodulation. The mobile communication module 150 may further amplify a signal modulated by the modem processor, and convert the signal into an electromagnetic wave through the antenna 1 for radiation.

The modem processor may include a modulator and a demodulator. The modulator is configured to modulate a low frequency baseband signal to be sent into a medium and high frequency signal. The demodulator is configured to demodulate the received electromagnetic wave signal into a low-frequency baseband signal.

The wireless communication module 160 may provide a solution to wireless communication applied to the terminal 100, for example, a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communication module 160 receives an electromagnetic wave through the antenna 2, performs frequency modulation on and filters the electromagnetic wave signal, and sends a processed signal to the processor 110. The wireless communication module 160 may further receive a to-be-sent signal from the processor 110, perform frequency modulation on and amplify the to-be-sent signal, and convert the to-be-sent signal into an electromagnetic wave through the antenna 2 for radiation.

In some embodiments, in the terminal 100, the antenna 1 is coupled to the mobile communication module 150, and the antenna 2 is coupled to the wireless communication module 160, so that the terminal 100 can communicate with a network and another device by using a wireless communication technology. The wireless communication technology may specifically include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation system, SBAS).

In embodiments of this application, some notifications received by the terminal 100 are sent by an application server corresponding to an application installed on the terminal 100. The terminal 100 implements a wireless communication function through the antenna 1, the antenna 2, the mobile communication module 150, the wireless communication module 160, the modem processor, and the baseband processor to receive the notification, and then displays the notification.

The terminal 100 implements a display function by using the GPU, the display 194, the application processor, and the like. The GPU is a microprocessor for image processing and connects the display 194 and the application processor. The GPU is configured to perform mathematical and geometric calculations, and is configured to render graphics. The processor 110 may include one or more GPUs that execute a program instruction to generate or change display information.

The display 194 is configured to display an image, a video, and the like. The display 194 includes a display panel. The display 194 includes a display panel. A liquid crystal display (liquid crystal display, LCD) may be used in the display panel. The display panel may be an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini LED, a micro-LED, a micro-OLED, a quantum dot light emitting diode (quantum dot light emitting diode, QLED), or the like. In some embodiments, the terminal 100 may include 1 or N displays 194. N is a positive integer greater than 1.

In this embodiment of this application, the terminal 100 displays user interfaces shown in FIG. 2A to FIG. 2H, FIG. 3A to FIG. 3H, FIG. 4A to FIG. 4D, FIG. 5A to FIG. 5D, and FIG. 6A to FIG. 6E through display functions provided by the GPU, the display 194, the application processor, and the like.

The terminal 100 can implement a photographing function by using the ISP, the camera 193, the video codec, the GPU, the display 194, the application processor, and the like. In this embodiment of this application, the camera 193 includes an RGB camera (2D camera) that generates a two-dimensional image and a TOF camera (3D camera) that generates a three-dimensional image.

The ISP is configured to process data fed back by the camera 193. For example, during photographing, a shutter is opened, light is transmitted to a photosensitive element of the camera by using a lens, an optical signal is converted into an electrical signal, and the photosensitive element of the camera transmits the electrical signal to the ISP for processing, and converts the electrical signal into an image visible to naked eyes. The ISP can also perform algorithm optimization on image noise, and luminance. The ISP can also perform parameter optimization on exposure and color temperature of a shooting scene. In some embodiments, the ISP may be disposed in the camera 193.

The camera 193 is configured to capture a still image or video. An object is projected to the photosensitive element by generating an optical image through the lens. The photosensitive element may be a charge coupled device (charge coupled device, CCD) or a complementary metal-oxide-semiconductor (complementary metal-oxide-semiconductor, CMOS) phototransistor. The photosensitive element converts the optical signal into an electrical signal, and then transmits the electrical signal to the ISP to convert it into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process digital signals, and may process other digital signals in addition to digital image signals. The video codec is used to compress or decompress digital video. The terminal 100 may support one or more video encoders and decoders.

The NPU is a neural network (neural network, NN) computing processor, quickly processes input information by referring to a structure of a biological neural network, for example, by referring to a mode of transmission between human brain neurons, and may further continuously perform self-learning. The NPU may be used to implement an application such as intelligent cognition of the terminal 100, for example, image recognition, facial recognition, voice recognition, and text understanding.

In the embodiment of this application, the terminal 100 collects and generates an image frame through a shooting capability provided by the ISP and the camera 193. The terminal 100 may perform an eyeball gaze recognition algorithm through the NPU, further to recognize the eyeball gaze position of the user through the collected image frame.

The internal memory 121 may include one or more random access memories (random access memories, RAMs) and one or more non-volatile memories (non-volatile memories, NVMs).

The random access memories may include a static random access memory (static random access memory, SRAM), a dynamic random access memory (dynamic random access memory, DRAM), a synchronous dynamic random access memory (synchronous dynamic random access memory, SDRAM), double data rate synchronous dynamic random access memory (double data rate synchronous dynamic random access memory, DDR SDRAM, for example, a fifth generation DDR SDRAM is generally referred to as DDR5 SDRAM), and the like. The non-volatile memories may include a magnetic disk storage device and a flash memory (flash memory).

The random access memory may be directly read and written by the processor 110, may be configured to store executable programs (for example, machine instructions) of an operating system or other running programs, or may be configured to store data of users and applications. The non-volatile memory may also store the executable programs, the data of the users and the applications, and the like, and may be loaded into the random access memory in advance for the processor 110 to perform direct reading and writing.

The application code of the eyeball gaze SDK can be stored in the non-volatile memory. The application code of the eyeball gaze SDK can be loaded into the random access memory when the eyeball gaze SDK is run to invoke the eyeball gaze service. The data generated when running the above code can also be stored in the random access memory.

The external memory interface 120 may be configured to connect to an external non-volatile memory, to expand a storage capability of the terminal 100. The external non-volatile memory communicates with the processor 110 by using the external memory interface 120, to implement a data storage function, for example storing a file such as a music or a video in the external non-volatile memory.

The terminal 100 can implement an audio function, for example, music playing and recording, and the like by using the audio module 170, the speaker 170A, the receiver 170B, the microphone 170C, the headset jack 170D, the application processor, and the like.

The audio module 170 is configured to convert digital audio information into analog audio signal output, and is also configured to convert analog audio input into a digital audio signal. The speaker 170A, also referred to as "horn", is configured to convert an electrical audio signal into a sound signal. The terminal 100 may be used to listen to music or listen to a hands-free call through the speaker 170A. The receiver 170B, also referred to as "handset", is configured to convert an electrical audio signal into a sound signal. When the terminal 100 answers a call or a voice message, the receiver 170B may be brought close to a human ear for listening. The microphone 170C, also referred to as "voice tube" or "mike", is configured to convert a sound signal into an electrical signal. When making a call or sending voice information, a user may make a sound approaching the microphone 170C through the mouth of the user, to input a sound signal into the microphone 170C. The headset jack 170D is configured to be connected to a wired headset.

The pressure sensor 180A is configured to sense a pressure signal, and can convert the pressure signal into an electrical signal. The gyroscope sensor 180B can be used to determine angular velocities of the terminal 100 around three axes (namely, the x, y, and z axes), and then determine a motion posture of the terminal 100. The acceleration sensor 180E may detect an acceleration value of the terminal 100 in each direction (generally three axes). Therefore, the acceleration sensor 180E can be used to recognize the posture of the terminal 100. In the embodiment of this application, the terminal 100 can detect whether the user picks up the mobile phone through the acceleration sensor 180E and the gyroscope sensor 180B in a screen-off or screen-off AOD state, and then determine whether the screen is lit.

The biometric pressure sensor 180C is configured to measure an atmospheric pressure. The magnetic sensor 180D includes a Hall sensor. The terminal 100 may detect opening and closing of a flip leather cover by using the magnetic sensor 180D. Therefore, in some embodiments, when the terminal 100 is a clamshell phone, the terminal 100 can detect the opening and closing of the clamshell phone according to the magnetic sensor 180D, and then determine whether the screen is lit.

The distance sensor 180F is configured to measure a distance. The optical proximity sensor 180G may include, for example, a light-emitting diode (LED) and an optical detector. The terminal 100 can use the optical proximity sensor 180G to detect a scenario in which the user holds the terminal 100 to approach the user, such as a handset call. The ambient light sensor 180L is configured to perceive ambient light brightness. The terminal 100 may adaptively adjust a luminance of the display 194 according to perceived brightness of the ambient light.

The fingerprint sensor 180H is configured to collect a fingerprint. The terminal 100 may implement fingerprint unlocking, application lock access, and the like by using features of the collected fingerprint. The temperature sensor 180J is configured to detect temperature. The bone conduction sensor 180M may collect a vibration signal.

The touch sensor 180K is also referred to as a "touch device". The touch sensor 180K may be disposed on the display 194. The touch sensor 180K and the display 194 form a touchscreen, which is also referred to as a "touch-screen". The touch sensor 180K is configured to detect a touch operation on or near the touch sensor 180K. The touch sensor may transfer the detected touch operation to the application processor, to determine a touch event type. The display 194 may provide a visual output related to the touch operation. In some other embodiments, the touch sensor 180K may be alternatively disposed on a surface of the terminal 100, and is located on a position different from that of the display 194.

In the embodiment of this application, the terminal 100 detects whether or not there is a user operation acting on the screen such as a click operation, a left sliding operation, a right sliding operation or the like through the touch sensor 180K. Based on the user operation acting on the screen detected by the touch sensor 180K, the terminal 100 is able to determine an action to be performed subsequently such as running an application, and displaying an interface of the application.

The button 190 includes a power-on button, a volume button, and the like. The button 190 may be a mechanical button, or can be a touch button. The motor 191 may generate a vibration prompt. The motor 191 may be configured to provide an incoming call vibration prompt and a touch vibration feedback. The indicator 192 may be an indicator light, may be configured to indicate a charging state and a battery change, and may be further configured to indicate a message, a missed call, a notification, and the like.

The SIM card interface 195 is configured to connect to a SIM card. The terminal 100 may support one or N SIM card interfaces.

The term "user interface (user interface, UI)" in the description, claims and the accompanying drawings of this application is a medium interface for interaction and information exchange between an application or operating system and a user, and implements the conversion between an internal form of information and a form of the information acceptable to the user. The user interface of the application is source code written in a specific computer language such as java, the extensible markup language (extensible markup language, XML), and the like. The interface source code is parsed and rendered on a terminal device, and is finally presented as content that can be recognized by the user, such as a picture, a text, a button and other controls. A control (control), also referred to as a widget (widget), is a basic element of the user interface. Typical controls include a toolbar (toolbar), a menu bar (menu bar), a text box (text box), a button (button), a scrollbar (scrollbar), a picture, and a text. The attributes and content of the controls in the interface are defined by tags or nodes. For example, XML specifies the controls included in the interface through nodes such as <Textview>, <ImgView>, and <VideoView>. One node corresponds to one control or attribute in the interface, and the node is parsed and rendered, and is then presented as user-visible content. In addition, interfaces of many applications, such as hybrid applications (hybrid application), usually further include web pages. A web page, also referred to as a page, may be understood as a special control embedded in an application interface. The web page is source code written in a specific computer language, such as hypertext markup language (hypertext markup language, HTML), cascading style sheets (cascading style sheets, CSS), and java scripts (JavaScript, JS). The source code of the web page may be loaded and displayed by a browser or a web page display component with similar functions to the browser as content that can be recognized by the user. The specific content included in the web page is also defined by tags or nodes in the source code of the web page. For example, GTML defines elements and attributes of the web page through <p>, <img>, <video>, and <canvas>.

A graphic user interface (graphic user interface, GUI) is a common form of a user interface, which is a user interface related to a computer operation displaying through a graphic manner. It can be an icon, a window, a control and other interface elements displayed in a display of the terminal device, where the control may include an icon, a button, a menu, a tab, a text box, a dialog box, a status bar, a navigation bar, Widget and other visual interface elements.

As used in this specification and the claims of this application, a singular expression form, "one", "a", "said", "foregoing", "the", or "this", is intended to also include a plural expression form, unless clearly indicated to the contrary in the context. It should be further understood that the term "and/or" used in this application indicates and includes any or all possible combinations of one or more listed items. As used in the foregoing embodiments, based on the context, the term "when" may be interpreted as a meaning of "if", "after", "in response to determining . . . ", or "in response to detecting . . . ". Similarly, based on the context, the phrase "if determining" or "if detecting (a stated condition or event)" may be interpreted as a meaning of "if determining . . . ", "in response to determining . . . ", "when detecting (a stated condition or event)", or "in response to detecting . . . (a stated condition or event)".

All or some of the foregoing embodiments may be implemented by using software, hardware, firmware, or any combination thereof. When the software is used for implementation, implementation may be entirely or partially performed in the form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium that can be accessed by the computer, or a data storage device, such as a server or a data center in which one or more usable mediums are integrated. The usable medium may be a magnetic medium (for example, a soft disk, a hard disk, or a magnetic tape), an optical medium (for example, a DVD), a semiconductor medium (for example, an SSD), or the like.

A person of ordinary skill in the art may understand that all or some of the procedures in the methods in the embodiments may be implemented by using a computer program instructing relevant hardware. The program may be stored in a computer-readable storage medium. When the program is executed, the procedures in the foregoing method embodiments may be performed. The storage medium includes: any medium that can store program code, such as a ROM, a RAM, a magnetic disk, or an optical disc.

The invention claimed is:

1. A display method, applied to an electronic device, wherein the electronic device comprises a screen and a camera module, wherein the method comprises:
    displaying a first interface on the screen, wherein the first interface comprises a banner notification message, and the banner notification message is displayed in a first area of the screen;
    determining an eyeball gaze position based on a first input of the camera module;
    displaying a first icon on the screen to indicate the determined eyeball gaze position of a user;
    determining the eyeball gaze position of the user is the first area, and the first area is a local area where the banner notification message is popped up and displayed on the screen; and
    in response to the eyeball gaze position of the user is the first area, displaying a second interface corresponding to the banner notification message.

2. The method according to claim 1, wherein
    the camera module comprises at least a first camera and a second camera, wherein the first camera is configured to obtain a two-dimensional image, and the second camera is configured to obtain an image comprising depth information; and
    the first input is a first image, and the first image comprises the two-dimensional image and the image comprising the depth information.

3. The method according to claim 2, wherein
    the first camera is a camera that generates an RGB image, and the second camera is a TOF camera.

4. The method according to claim 2, wherein the determining an eyeball gaze position based on a first input of the camera module comprises:
    determining an eyeball gaze position of the user based on the first image.

5. The method according to claim 4, wherein the determining the eyeball gaze position of the user is the first area comprises:
    the eyeball gaze position of the user is comprised in the first area, or the eyeball gaze position of the user intersects with the first area.

6. The method according to claim 4, wherein the determining an eyeball gaze position of the user based on the first image specifically comprises:
    determining feature data based on the first image, wherein the feature data comprises one or more of a left-eye image, a right-eye image, a face image, and face grid data; and
    determining the eyeball gaze position of the user indicated by the feature data by using an eyeball gaze recognition model, wherein the eyeball gaze recognition model is established based on a convolutional neural network.

7. The method according to claim 6, wherein the determining feature data based on the first image specifically comprises:
    performing face correction on the first image, to obtain a first image with an upright face; and
    determining the feature data based on the first image with the upright face.

8. The method according to claim 7, wherein the obtaining a first image with an upright face specifically comprises:

determining a calibrated line of the first image, wherein the calibrated line is a straight line connected by a key point of a left eye and a key point of a right eye;

determining a face deflection angle of the first image, wherein the face deflection angle is an included angle between the calibrated line and a horizontal line;

determining that the face deflection angle is equal to 0 degrees and the first image is the first image with the upright face; and determining that the face deflection angle is not equal to 0 degrees, and a rotation center point is determined based on a left-eye coordinate position and a right-eye coordinate position, and the first image is rotated around the rotation center point by a first angle to obtain the first image with the upright face, wherein the first angle is equal to the face deflection angle.

9. The method according to claim 1, wherein the method further comprises:

displaying the first icon in the first area.

10. The method according to claim 9, wherein the first icon is a cursor point formed by a display unit on the screen, or the first icon is cursor points or a cursor area formed by a plurality of display units on the screen.

11. The method according to claim 1, wherein the first interface is an interface provided by a first application installed on the electronic device.

12. The method according to claim 1, wherein the first interface is any one of the following interfaces:

a first desktop, a second desktop, and a leftmost home screen.

13. The method according to claim 12, wherein the method further comprises:

displaying a to-be-unlocked interface; and in response to an unlocking operation of the user, displaying the first interface.

14. An electronic device, comprising one or more processors and one or more memories, wherein the one or more memories are coupled to the one or more processors, the one or more memories are configured to store computer program code, the computer program code comprises computer instructions, and when the one or more processors execute the computer instructions, cause the electronic device to perform:

displaying a first interface on a screen, wherein the first interface comprises a banner notification message, and the banner notification message is displayed in a first area of the screen;

determining an eyeball gaze position based on a first input of a camera module;

displaying a first icon on the screen to indicate the determined eyeball gaze position of a user;

determining the eyeball gaze position of the user is the first area, and the first area is a local area where the banner notification message is popped up and displayed on the screen; and in response to the eyeball gaze position of the user is the first area, displaying a second interface corresponding to the banner notification message.

15. The electronic device according to claim 14, wherein the camera module comprises at least a first camera and a second camera, wherein the first camera is configured to obtain a two-dimensional image, and the second camera is configured to obtain an image comprising depth information; and the first input is a first image, and the first image comprises the two-dimensional image and the image comprising the depth information.

16. The electronic device according to claim 15, wherein the determining an eyeball gaze position based on a first input of the camera module comprises:

determining an eyeball gaze position of the user based on the first image.

17. The electronic device according to claim 16, wherein the determining an eyeball gaze position of the user based on the first image specifically comprises:

determining feature data based on the first image, wherein the feature data comprises one or more of a left-eye image, a right-eye image, a face image, and face grid data; and determining the eyeball gaze position of the user indicated by the feature data by using an eyeball gaze recognition model, wherein the eyeball gaze recognition model is established based on a convolutional neural network.

18. The electronic device according to claim 17, wherein the determining feature data based on the first image specifically comprises:

performing face correction on the first image, to obtain a first image with an upright face; and determining the feature data based on the first image with the upright face.

19. The electronic device according to claim 18, wherein the obtaining a first image with an upright face specifically comprises:

determining a calibrated line of the first image, wherein the calibrated line is a straight line connected by a key point of a left eye and a key point of a right eye;

determining a face deflection angle of the first image, wherein the face deflection angle is an included angle between the calibrated line and a horizontal line;

determining that the face deflection angle is equal to 0 degrees and the first image is the first image with the upright face; and determining that the face deflection angle is not equal to 0 degrees, and a rotation center point is determined based on a left-eye coordinate position and a right-eye coordinate position, and the first image is rotated around the rotation center point by a first angle to obtain the first image with the upright face, wherein the first angle is equal to the face deflection angle.

20. A non-transitory computer-readable storage medium, comprising instructions, wherein when the instructions are run on an electronic device, the electronic device performs to:

display a first interface on a screen, wherein the first interface comprises a banner notification message, and the banner notification message is displayed in a first area of the screen;

determine an eyeball gaze position based on a first input of a camera module;

display a first icon on the screen to indicate the determined eyeball gaze position of a user;

determine the eyeball gaze position of the user is the first area, and the first area is a local area where the banner notification message is popped up and displayed on the screen; and in response to the eyeball gaze position of the user is the first area, display a second interface corresponding to the banner notification message.

* * * * *